(12) United States Patent
Fields

(10) Patent No.: US 7,254,837 B2
(45) Date of Patent: Aug. 7, 2007

(54) APPARATUS AND METHOD FOR STORING AND DISTRIBUTING ENCRYPTED DIGITAL CONTENT

(76) Inventor: Daniel M. Fields, 717 S. Pines Rd., Spokane, WA (US) 99206

( * ) Notice: Subject to any disclaimer, the term of this patent is extended or adjusted under 35 U.S.C. 154(b) by 0 days.

(21) Appl. No.: 11/181,621

(22) Filed: Jul. 13, 2005

(65) Prior Publication Data

US 2006/0015945 A1    Jan. 19, 2006

Related U.S. Application Data

(60) Provisional application No. 60/587,529, filed on Jul. 13, 2004, provisional application No. 60/587,531, filed on Jul. 13, 2004.

(51) Int. Cl.
*H04L 9/32* (2006.01)
(52) U.S. Cl. .................. 726/27; 726/30; 713/153; 709/104; 709/203
(58) Field of Classification Search .............. None
See application file for complete search history.

(56) References Cited

U.S. PATENT DOCUMENTS

| | | | |
|---|---|---|---|
| 4,375,579 A | 3/1983 | Davida et al. | |
| 5,712,912 A | 1/1998 | Tomko et al. | |
| 6,006,332 A | 12/1999 | Rabne et al. | |
| 6,385,596 B1 | 5/2002 | Wiser et al. | |
| 6,671,687 B1 * | 12/2003 | Pederson et al. | 707/9 |
| 6,728,729 B1 | 4/2004 | Jawa et al. | |
| 6,731,312 B2 | 5/2004 | Robbin | |
| 6,874,139 B2 | 3/2005 | Krueger et al. | |
| 6,886,098 B1 | 4/2005 | Benaloh | |

(Continued)

OTHER PUBLICATIONS

Anane, R., et al, 'A Distributed Scheme for Secure Data Access', Dept. of CS and Network Systems, AINA '06, entire document, http://ieeexplore.ieee.org/iel5/10777/33944/01620389.pdf.*

(Continued)

*Primary Examiner*—Nasser Moazzami
*Assistant Examiner*—Ronald Baum
(74) *Attorney, Agent, or Firm*—Charles A. Lemaire; Lemaire Patent Law Firm, P.L.L.C.

(57) ABSTRACT

The present invention provides for a method and system for providing a type of Managed/Secured File Transfer between one or more computers arraigned in server-client or peer-to-peer configuration. This method and system takes digital content in the form of a file, shreds this file into separate pieces and encrypts each piece separately. Once encrypted, each piece is stored into a database. Client applications can then access these pieces of digital content over a network, decrypt and reassemble each piece to be played in the case of audio/video content, or viewed in the case of visual content. In some embodiments, the content requested by the client application is stored into a second database in a shredded and encrypted format, whereas in other embodiments the content is reassembled into the original non-encrypted and non-shredded file format. This method and system can reside on a computer system, hand held device, or other device.

26 Claims, 29 Drawing Sheets

U.S. PATENT DOCUMENTS

| | | | |
|---|---|---|---|
| 6,978,376 B2 * | 12/2005 | Giroux et al. | 713/189 |
| 6,983,278 B1 * | 1/2006 | Yu et al. | 707/9 |
| 2005/0117746 A1 | 6/2005 | Benaloh | |
| 2005/0147240 A1 | 7/2005 | Agrawal et al. | |
| 2005/0193210 A1 | 9/2005 | Benaloh | |

OTHER PUBLICATIONS

Chang, Chin-Chen, et al., "A Database Record Encryption Scheme Using the RSA Public Key Cryptosystem and Its Master Keys", *Proceedings of the 2003 International Converence on Computer Networks and Mobile Computing*, (2003).

Digital Content Protection LLC, "High-bandwidth Digital Content Protection System", Web address: http://www.digital-cp.com/home/HDCPSpecificationRev1_1.pdf, (Jun. 9, 2003), 1-85.

European Committee, for Standardization (CEN—ISSS), "Digital Rights Management Final Report", web address: http://europa.eu.int/comm/enterprise/ict/policy/doc/drm.pdf, (Sep. 30, 2003), 1-257.

Hitachi, Intel, Matsushita Electric Industrial, Sony, Toshiba, "5C Digital Transmission Content Protection WhitePaper", Web address: http://www.dtcp.com/data/wp_spec.pdf, (Jul. 14, 1998), i-ii + 1-13.

Microsoft Corporation, "Architecture of Windows Media Rights Manager", web address: http://www.microsoft.com/windows/windowsmedia/howto/articles/drmarchitecture.aspx, (May 2004), 1-3.

Stamp, Mark, "Digital Rights Management: The Technology Behind the Hype", *Journal of Electronic Commerce Research*, vol. 4, No. 3, (2003), 102-112.

Yeung, Siu F., et al., "A Multikey Secure Multimedia Proxy Using Asymmetric Reversible Parametric Sequences: Theory, Design, and Implementation", *IEEE Transactions on Multimedia*, vol. 7, No. 2, (Apr. 2005), 330-338.

* cited by examiner

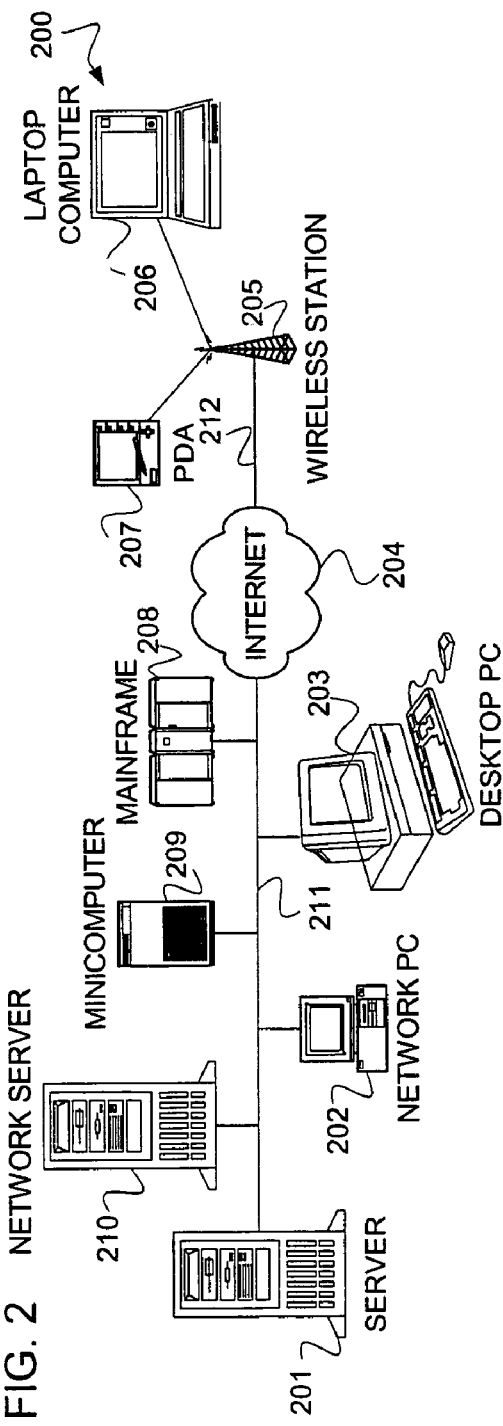
FIG. 2 NETWORK SERVER
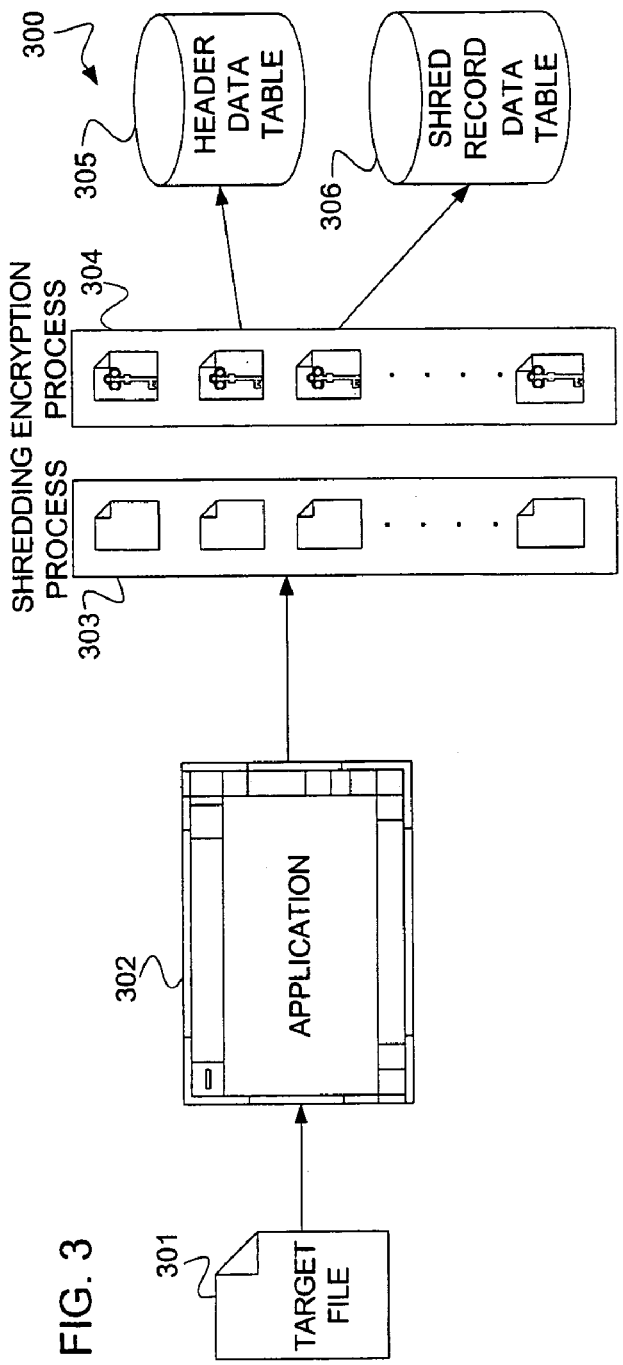
FIG. 3

Server | Tech6

General Configuration

- 901 — Server Name: Tech6
- 902 — Maximum RAM: 50 Mb
- 903 — Temporary Storage: 20 Mb
- 904 — Thread Priority: Highest
- 905 — ☑ Allow Table Encryption
- 906 — ☐ Logins Required
- 907 — ☐ Do Not Save Configuration Changes
- 908 — ☐ Disable Server Output

Startup Options

- 909 — ☐ Bring Up Automatically
- 910 — ☐ Start Minimized

Memory Management

- 911 — ☑ Enabled
- 912 — Frequency: 300,000

Retry Options

- 913 — Interval from last message: 30,000
- 914 — Interval between Keep Alives: 5,000
- 915 — Keep Alive retries: 5

916 — Save | Cancel

Copyright © Freedom Software, Inc. 1991-2005. All Rights Reserved

FIG. 29

| Id | Date | Description | UserName | Comp. |
|---|---|---|---|---|
| 13 | 3/11/2005 6:43:37 AM | Login 0.1 | admin | |
| 14 | 3/11/2005 7:14:23 AM | Logout 0.1 | admin | |
| 15 | 3/18/2005 6:27:59 PM | Login 0.1 | admin | |
| 16 | 3/18/2005 6:28:37 PM | Log Off Music Admin 0.1 | admin | |
| 17 | 3/22/2005 9:10:18 AM | Log Off Music Admin 0.1 | admin | |
| 18 | 3/22/2005 9:10:24 AM | Log Off Music Admin 0.1 | admin | |
| 19 | 3/22/2005 12:47:22 PM | Login 1.1 | admin | |
| 20 | 3/22/2005 12:49:47 PM | Log Off Music Admin 1.1 | admin | |
| 21 | 3/22/2005 2:52:46 PM | Login 1.1 | admin | |
| 22 | 3/22/2005 2:55:00 PM | Log Off Music Admin 1.1 | admin | |
| 23 | 3/22/2005 4:05:56 PM | Login 1.1 | admin | |
| 24 | 3/22/2005 4:09:12 PM | Log Off Music Admin 1.1 | admin | |
| 25 | 3/22/2005 5:28:28 PM | Login 1.1 | admin | |
| 26 | 3/22/2005 5:29:22 PM | Log Off Music Admin 1.1 | admin | |
| 27 | 3/22/2005 5:37:22 PM | Login 1.1 | admin | |
| 28 | 3/22/2005 5:38:05 PM | Log Off Music Admin 1.1 | admin | |
| 29 | 3/28/2005 2:00:19 PM | Login 1.1 | admin | |

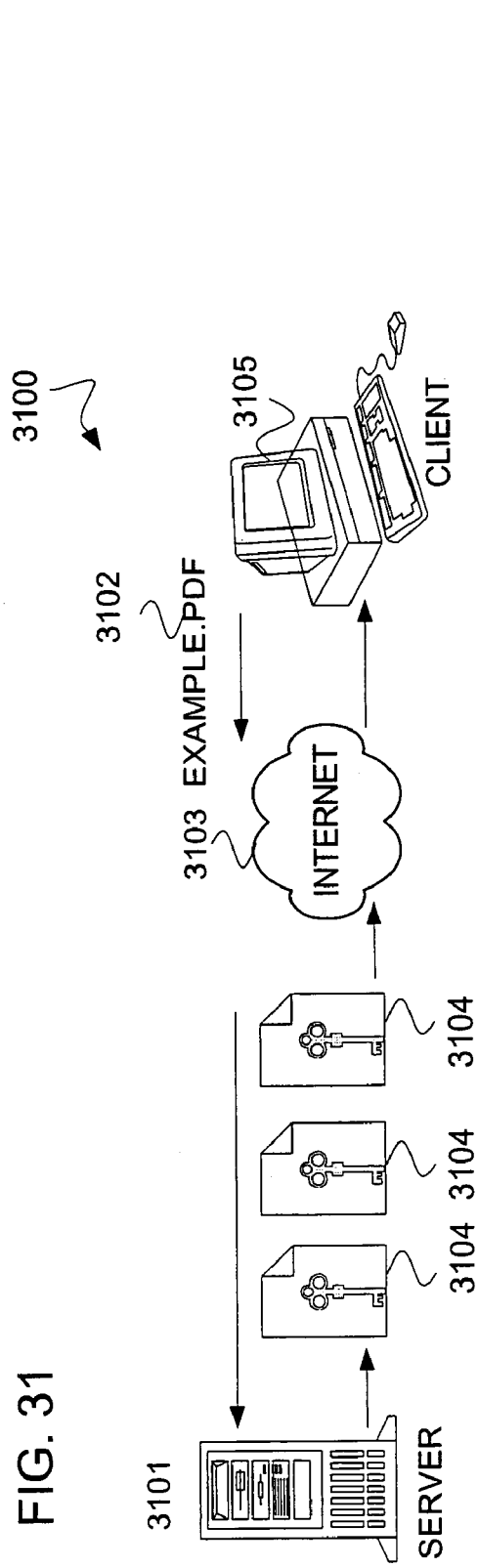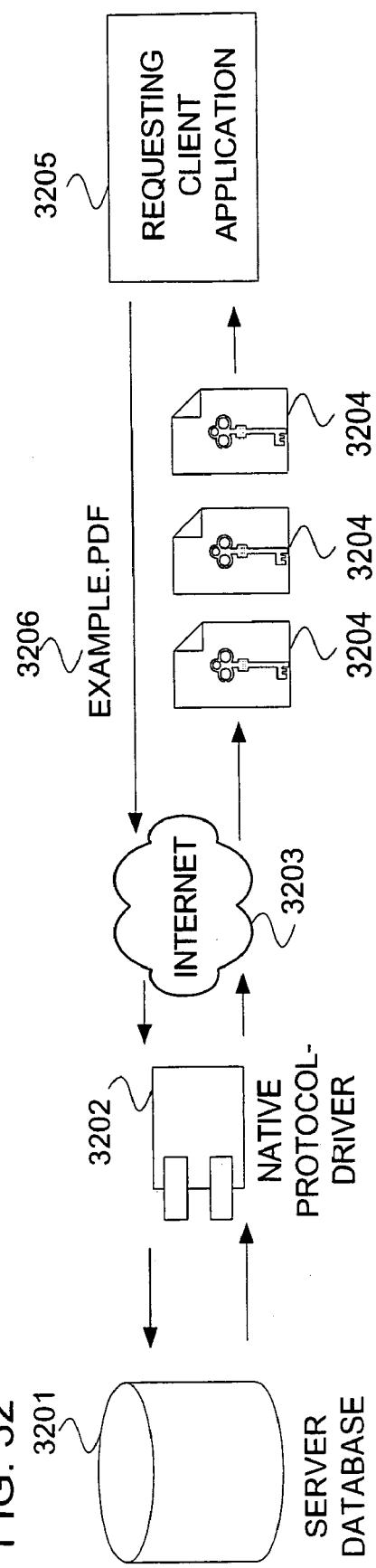

APPARATUS AND METHOD FOR STORING AND DISTRIBUTING ENCRYPTED DIGITAL CONTENT

RELATED APPLICATIONS

This is a non-provisional application claiming priority to U.S. Provisional Patent Application US 60/587,529 entitled "SYSTEM FOR ENCRYPTION, STORAGE, AND DESTRUCTION OF MULTI-MEDIA CONTENT," and U.S. Provisional Patent Application US 60/587,531 entitled "SYSTEM FOR SECURE DIGITAL CONTENT DISTRIBUTION AND USE," both of which were filed on Jul. 13, 2004, by the inventor of the present invention, and both of which are incorporated by reference in their entirety.

FIELD OF THE INVENTIONS

This invention relates to the field of software and more particularly software used for managed/secured file transfer and the management of the digital rights associated with copyrighted digital content in the form of files.

BACKGROUND OF THE INVENTION

An interest in the safe transmission and storage of data (collectively referred to as Managed/Secured File Transfer) is an interest shared by many sectors of industry. The secure transmission of data (i.e., digital content) representing music, movies, and documents containing, for example, financial and/or medical data is critical to the industries that rely on these forms of data. Some sectors of industry profit from the artistic expression inherent in this digital content, whereas other areas of industry profit from the facts and figures that this digital content represents. Digital content in the form of movies is responsible for an estimated six (6) percent of the Gross Domestic Product (GDP) of the United States. Digital content in representing financial and/or medical data can be even more valuable depending upon the manner (legal or illegal) in which it is used. For example, unsecured financial data can be used in furtherance of such illegal activities as insider trading.

Give the economic value associated with digital content, various legal regimes and technological apparatus and methods have been devised to protect this content during storage and/or transmission. For example, these legal regimes include copyright law (e.g., 17 USC et seq.), securities law (e.g., Sarbanes-Oxley Act (SOX)), and a host of other legal regimes (e.g., Health Insurance Portability and Accountability Act (HIPAA)).

Copyright law has been devised to provide an economic incentive for individuals to produce such things as the aforementioned music and movies by protecting these individuals' ownership rights in these artistic expressions. These protections also extend to cover other forms of digital content such as video games, computer code, pictures and other types of expressive works. Copyright law also provides various disincentives to prevent individuals from stealing or pirating these works. These disincentives come in the form of various types of criminal and civil liability associated with the illicit use or piracy of this digital content.

In general copyright owners have the right to reproduce digital content (i.e., make copies), the right to make derivative works, the right to distribute copies, the right to perform works publicly, and the right to display works publicly. These rights, however, are typically balanced against what are called the "Fair Use" rights of those individuals who purchase a license to these copyrighted works. Under the Doctrine of Fair Use, persons holding a license to a copyrighted work are free to, among other things, make copies of the work for personal, non-economic purposes. Often times, however, the law must seek a balance between the copyrights of a particular copyright owner, and the Fair Use rights of a licensee.

In addition to the above described legal regimes utilized to protect digital content, various technological apparatus and methods have been devised to protect this content. Typically, these apparatus and methods relate to various encryption techniques that are used to protect this digital content.

Encryption is the process of obscuring information to make it unreadable without special knowledge. While encryption has been used to protect communications for centuries, only organizations and individuals with an extraordinary need for secrecy have made use of it. Encryption protects information, such as digital content, by taking this content, known as plain text, and converting it into cipher text or encrypted text. The cipher text is typically generated using one of many mathematical algorithms (see, e.g., RSA (Rivest, Shamir and Adelman), DES (Data Encryption Standard), AES (Advanced Encryption Standard)). The process of converting the encrypted text back into plain text is known as decryption. Central to the encryption and decryption process is the use of various keys to encrypt and decrypt the digital content. These keys are typically mathematical values that are plugged into an algorithm and used to encrypt or decrypt digital content. Once a piece of digital content is encrypted it is, in a sense, encapsulated in a shell of numeric values that give the appearance that the digital content is in fact random and meaningless. Typically, this shell is made up of ASCII, Uni-code, or Binary values.

The algorithms used for encryption and decryption can be broken down into two flavors. Symmetric key algorithms, such as the above referenced DES and AES, use one secret or private key to encrypt and decrypt digital content. Asymmetric key algorithms, such as RSA, use two keys; a public and a private key, where the public key is used in encrypt digital content whereas the private key is used to decrypt digital content. These two approaches to encryption also vary in that systems employing an asymmetric key algorithm may use a third party (e.g., a key server) to verify the validity of a particular public key, whereas systems employing symmetric key algorithms do not use a third party verifier. Accordingly, systems employing an asymmetric system are known as a tethered systems, while systems employing a symmetric system are known as an un-tethered systems.

In some systems, a hybrid of symmetric and asymmetric encryption is employed, a system known as a Hybrid-Crypto system. Under this system, a piece of digital content may be encrypted using a symmetric key algorithm, which, in turn, is then encrypted using an asymmetric key algorithm. Alternatively, the public key may be used as a signature to verify the identity of the requestor of content.

A factor used in determining the strength or effectiveness a particular system of encryption is what is known as the key length (i.e., the key size). Specifically, the key size is the measure of the number of possible keys which can be used in a key algorithm. More to the point, the above described keys are typically in the form of a Binary value. The potential size of this Binary value will at one level dictate the effectiveness of the encryption system. The relationship between key-length size and the effectiveness of a system of encryption is better understood if one examines the various methods used to defeat a system of encryption.

Given the value of the digital content protected by the above described systems of encryption, various methods have been devised by unscrupulous persons to defeat the encryption protections afforded this digital content. The most basic method devised to defeat an encryption protection is known as a "Brute Force Attack." In this form of attack, a party will try every possible key value in an attempt to eventually pick the correct key value. The success of such an attack is only limited by the computing power and computational complexity of the application used to engage in the attack. Put another way, the success or failure of a Brute Force Attack is proportional to the speed of the computer and application employed in the attack. Given the relationships between computing power, computational complexity and the success of a Brute Force Attack, very large key values (e.g., 128 bit or $2^{128}$ key values) are typically used to defeat a Brute Force Attack. Other types of attacks used against encrypted digital content can include "Chosen-Plain-Text Attacks" and "Known-Plain-Text Attacks," just to name a few.

One problem that is common to the above referenced attacks is determining whether the characters revealed after engaging in an attack are the sought after plain text, or whether the characters are encrypted text. That is, when one, for example, gets back the value "the", after mounting such an attack, is this actual plain text or is it encrypted text? This is particularly a problem for Chosen-Plain-Text Attacks and Known-Plain-Text Attacks where a comparison is made between a known plain text value and the encrypted text to measure the success of an attack. The success of such an attack is dependent on the ability of the person who is engaging in such an attack to have readily available the entire encrypted digital content that he/she is seeking to decrypt. Put another way, the success or failure of an attack typically can only be determined when the attack results are analyzed within the context of the entire piece of digital content.

One practical embodiment of these encryption techniques is Digital Rights Management (DRM) techniques and related software. Generically speaking DRM is an umbrella term referring to any of several technical methods used to control or restrict the use of digital content and media containing this content. For example, some DRM software and techniques restrict the ability of a licensee to copy a piece of digital content. And again, some DRM software and techniques prevent certain types of digital content (e.g., music or video) as embodied in a particular type of media (e.g., a CD or DVD) from being played on a particular type of device (e.g., a personal computer). As with the above described copyright regime, the challenge to DRM technology is to balance the copyrights of the author of an expressive work against the Fair Use rights of the licensee. Put another way, while it is technologically feasible to, for example, prevent someone from making a copy a piece of digital content, this technological ability should not be used to infringe on a licensee's right to make a copy for personal use (i.e., their Fair Use rights).

DRM systems are employed to protect digital content (e.g., music) that is distributed over computer networks, or online over the Internet. The susceptibility of, for example, digital content in the form of digital audio to unauthorized copying, and the ability to create perfect duplicates, raises the specter of even more significant losses to the music industry, and has been the single greatest factor in the music industry's reluctance to make music available for purchase over the Internet. Thus, a distribution system using a computer network must be demonstratively secure from a large variety of attacks, including those described above, and misuses in order to preserve the music owner's intellectual property rights, including copyrights.

At least three types of risks are present in the distribution of music over a computer network. First, there is a considerable security risk in simply maintaining digital content in a computer system connected to public networks such as the Internet for access by consumers. For example, in order to effectively enable purchasers to review and purchase digital content, the content distributor's computer system storing such content must be networked. However, given the commercial value of such digital content, whether audio data, video data, software, financial documents or the like, such sites would be likely targets of computer-based attacks. Further, the very presence of an online commerce system is itself an inducement to crackers to attempt to break the security controls of such a system and gain access thereto. Thus, an online distribution system for digital content must be secure from such direct attacks. Further, if the online distribution system is compromised, it is desirable that the underlying content itself be secure against unauthorized copying, distribution, display, etc.

Additionally, the protocols and transmission mechanisms by which an online digital-content distribution system delivers content to a legitimate purchaser must also be secure, to prevent unauthorized users from intercepting deliveries of the digital content over the network.

Finally, once the digital content has been delivered to a user, it must be made secure against unauthorized duplication by the user or by others.

These constraints on a digital-content distribution system are in conflict with many of the features consumers want in terms of flexibility and ease of use. In particular, with regard to the purchase of audio data, such as songs and related media (e.g., the lyrics, graphics, liner notes which typically accompany conventional retail forms of audio), consumers want to be able to sample audio products prior to purchasing. It is desirable for such an online music-distribution system then to provide some mechanism by which users can play limited portions of songs and view related media without having to purchase the song. In addition, a consumer should be able to pass on preview music to other potential new customers.

Purchasers of music in traditional forms such as CDs or cassettes are accustomed to simple, easy to use consumer devices, such as portable CD players or tape players. For the successful distribution of music over the Internet, the security requirements must not unduly interfere with consumers' ease of use of the system. A consumer should be able to purchase and play back audio easily and securely. However, the security measures, particularly the encryption mechanisms, should make the purchased audio unusable outside of the specific applications or devices designed to cooperate with the distribution or network system.

Consumers are accustomed to being able to play music purchases anywhere they can carry a CD and CD player. Consumers will expect similar portability when purchasing digital media over the Internet. Accordingly, a desirable online music distribution system should allow a consumer to play back purchased audio not merely on a single computer, but on any platform equipped with an appropriately licensed playback application or device and the licensee's personal identification. In short, a DRM system must be able to protect digital content and the rights of its authors, but at the same time allow for those who purchase such content to exercise their Fair Use rights.

The present invention addresses some of the above described problems. Specifically, it allows for an apparatus, system and method to securely encrypt digital content, but at the same time it allows for persons who use, or are licensees of this content to be able to exercise their Fair Use rights.

SUMMARY OF THE INVENTION

The present invention provides for a method, system and computer-readable media for shredding, encrypting, storing and transmitting digital content (i.e., Managed/Secured File Transfer) between computer systems arranged in a server-client or peer-to-peer relationship. From a security perspective the present invention is advantageous. First, by both shredding and, in some embodiments, separately encrypting each shredded piece of digital content this, in effect, creates multiple layers of encryption that a cracker or other unscrupulous person must get through to fully decrypt the content. Moreover, by both shredding and, in some embodiments, separately encrypting each shredded piece of digital content, this lessens the likelihood that the encryption protection can be defeated using variants of, for example, a Plain Text Attack. This is true due to the fact that the digital content that is the subject of the attack cannot be compared to other pieces of content encrypted with the same private key or public key value. In many cases, the success of a Plain Text Attack depends on the ability to make this comparison. From a DRM perspective, the present invention is advantageous because rather than taking a one-size-fits-all approach, the licensee's rights can be tailored to meet the user's (i.e., the person who shreds and encrypts a file) needs, thus enabling a licensor to observe the Fair Use rights of the licensee.

In some embodiments, the present invention provides a method for handling shredded and encrypted digital content that includes sending a request to a server computer system for a file that has been organized as one or more pieces of the shredded and encrypted digital content in a database associated with the server, receiving the content from the server into a client computer system, sorting the received content from the server in a buffer residing in the client computer system, decrypting the sorted received content using a decryption algorithm, and forwarding the decrypted sorted received content from the buffer to another application.

In some embodiments, the present invention provides an apparatus for handling shredded and encrypted digital content that includes: means for sending a request to a server computer system for a file that has been organized as one or more pieces of the shredded and encrypted digital content in a database associated with the server, means for receiving the content from the server into a client computer system, means for sorting the received content from the server in a buffer residing in the client computer system, means for decrypting the sorted received content using a decryption algorithm, and means for forwarding the decrypted sorted received content from the buffer to another application.

In some embodiments, the present invention provides a system for handling shredded and encrypted digital content. This system includes a client computer having a transmitter that sends a request to a server for digital content that has been organized as one or more pieces of shredded and encrypted data and that is stored in a database associated with the server, a receiver that receives the shredded and encrypted digital content from the server into the client computer system, a sorter that sorts the received digital content, a decryptor that decrypts the sorted digital content using a decryption algorithm, a buffer, and an assembler that assembles the decrypted digital content into the buffer.

Some embodiments of the invention include computer-readable media having executable instructions stored thereon for causing a suitable programmed central processing unit to handle shredded and encrypted digital content by performing a method that includes: sending a request to a server computer system for digital content that has been organized as one or more pieces of the shredded and encrypted digital content in a database associated with the server, receiving the content from the server into a client computer system, sorting the received content from the server in a buffer residing in the client computer system, decrypting the sorted received content using a decryption algorithm, and forwarding the decrypted sorted received content from the buffer to another application.

Some embodiments of the invention include a method for handling shredded and encrypted digital content, wherein the method includes obtaining a dataset that includes digital content, shredding the dataset into a plurality of shreds, encrypting each of the shreds using one of a plurality of encryption keys and storing each encrypted shred into a database, receiving a request from a client for the digital content that has been organized as a plurality of pieces of the shredded and encrypted digital content in the database, and transmitting the content from the database to the client.

In some embodiments, the present invention includes computer-readable media having stored thereon a first data structure comprising two or more of the following:
(a descriptor that includes a unique value used to determine a record identity within a table,
a descriptor including a join value,
a descriptor that includes the number of chunks in each record,
a descriptor representing a predetermined size for each chunk, and
a descriptor that includes actual shredded and encrypted content derived based on the descriptor that includes the predetermined size for each chunk).

In some embodiments, the present invention includes computer-readable media having stored thereon a second data structure comprising two or more of the following:
(a descriptor that includes a value representing a name of a content publisher,
a descriptor that includes a value representing a URL of an originating server,
a descriptor that includes a value representing a name of the originating server,
a descriptor that includes a value representing whether or not content may be edited,
a descriptor that includes a value representing whether a content item may be copied,
a descriptor that includes a value representing whether a content item may be viewed,
a descriptor that includes a value representing whether a content item may be forwarded to another user,
a descriptor that includes a value representing whether a content can be shared with others for read-only usage,
a descriptor that includes a value representing whether a content item may be placed on removable physical media,
a descriptor that includes a value representing the number of times a content item can be recorded to removable media,
a descriptor that includes a value representing whether a content item may be moved onto a portable device, a descriptor that includes a value representing whether a content item is on-loan,
a descriptor that includes a value representing whether a content item is restricted until purchase,
a descriptor that includes a value representing when a demonstration usage expires, and
a descriptor that includes a value representing whether a user must login before accessing a content item).

In some embodiments, the present invention includes computer-readable media having stored thereon a first data structure comprising two or more of the following:
(a descriptor that includes a value representing unique file identifier,
a descriptor that includes a value representing a file name and extension,
a descriptor that includes a value representing date and time when a record was created,
a descriptor that includes a value representing a total size of the file,
a descriptor that includes a value representing the name of a target file,
a descriptor that includes a value representing a file extension,
a descriptor that includes a value representing a number of chunks required to completely shred the target file,
a descriptor that includes the number of chunks within a record,
a descriptor that includes a predetermined size for each chunk, and
a descriptor that includes data having actual shredded and encrypted content derived based on the descriptor that includes the predetermined size for each chunk and the descriptor indicating the file size).

In some embodiments, the present invention includes computer-readable media having executable file-transfer instructions stored thereon for causing a suitable programmed central processing unit to handle shredded and encrypted digital content by performing a method that includes: generating in a graphical user interface an application window having a window frame and a plurality of stiles to define a plurality of panes within the frame, displaying in a first one of the panes a user selectable index of a plurality of physical media, displaying in a second one of the panes first selected physical media from the user selectable index, and displaying in a third one of the panes second selected information for a database.

In some embodiments, the present invention includes computer-readable media having executable media-player application code stored thereon for causing a suitable programmed central processing unit to handle shredded and encrypted digital content by performing a method comprising: generating in a graphical user interface an application window having a window frame and a plurality of stiles to define a plurality of panes within the frame, displaying in a first one of the panes user selectable specific track information, displaying in a second one of the panes user generated track list information, and displaying in a third one of the panes specific track information.

In some embodiments, the present invention includes computer-readable media having executable server application code stored thereon for causing a suitable programmed central processing unit to handle shredded and encrypted digital content by performing a method comprising: generating in a graphical user interface an application window having a window frame and a plurality of stiles to define a plurality of panes within the frame, displaying in a first one of the panes two or more of the following simultaneously: (a user-selectable general settings button, a user-selectable protocols and network settings button, a user-selectable alias-management button, a user-selectable user-management button, a start button, a new session check box, refresh rate text box with an incrementing value, a server name text box, a stop button, a padlock icon, and a running icon).

FUNCTIONALITY SUITE SUMMARY

In some embodiments, the present invention provides a method for handling shredded and encrypted digital content comprising: manipulating digital content in the form of text with a word processing module, manipulating digital content in the form of numeric values and text with a spreadsheet module, manipulating digital content in the form of photos with a photo management module, manipulating digital content in the form of messages between users with a messaging module, and manipulating digital content to be posted for use by multiple users with a bulletin board module.

In some embodiments, the present invention provides computer-readable media having executable instructions stored thereon for causing a suitable programmed central processor unit to perform a method comprising: manipulating shredded and encrypted digital content in the form of text with a word processing module, manipulating shredded and encrypted digital content in the form of numeric values and text with a spreadsheet module, manipulating shredded and encrypted digital content in the form of photos with a photo management module, manipulating shredded and encrypted digital content in the form of messages between users with a messaging module, and manipulating shredded and encrypted digital content to be posted for use by multiple users with a bulletin board module.

BRIEF DESCRIPTION OF THE DRAWINGS

FIG. 2 is a schematic of a plurality of computer systems 100 connected via a computer network 200.
FIG. 3 is a schematic of the shredding and encryption process 300.
FIG. 9 is a schema of a general configuration GUI 900 for a server.

FIG. 29 is a schema of a GUI 2900 that is generated when an activity button 2605 is executed.

FIG. 31 depicts a schematic of a client-server relationship 3100.

FIG. 32 is a schematic providing an application-level view 3200 of the database calling modules.

DESCRIPTION OF EMBODIMENTS

Figure 1:
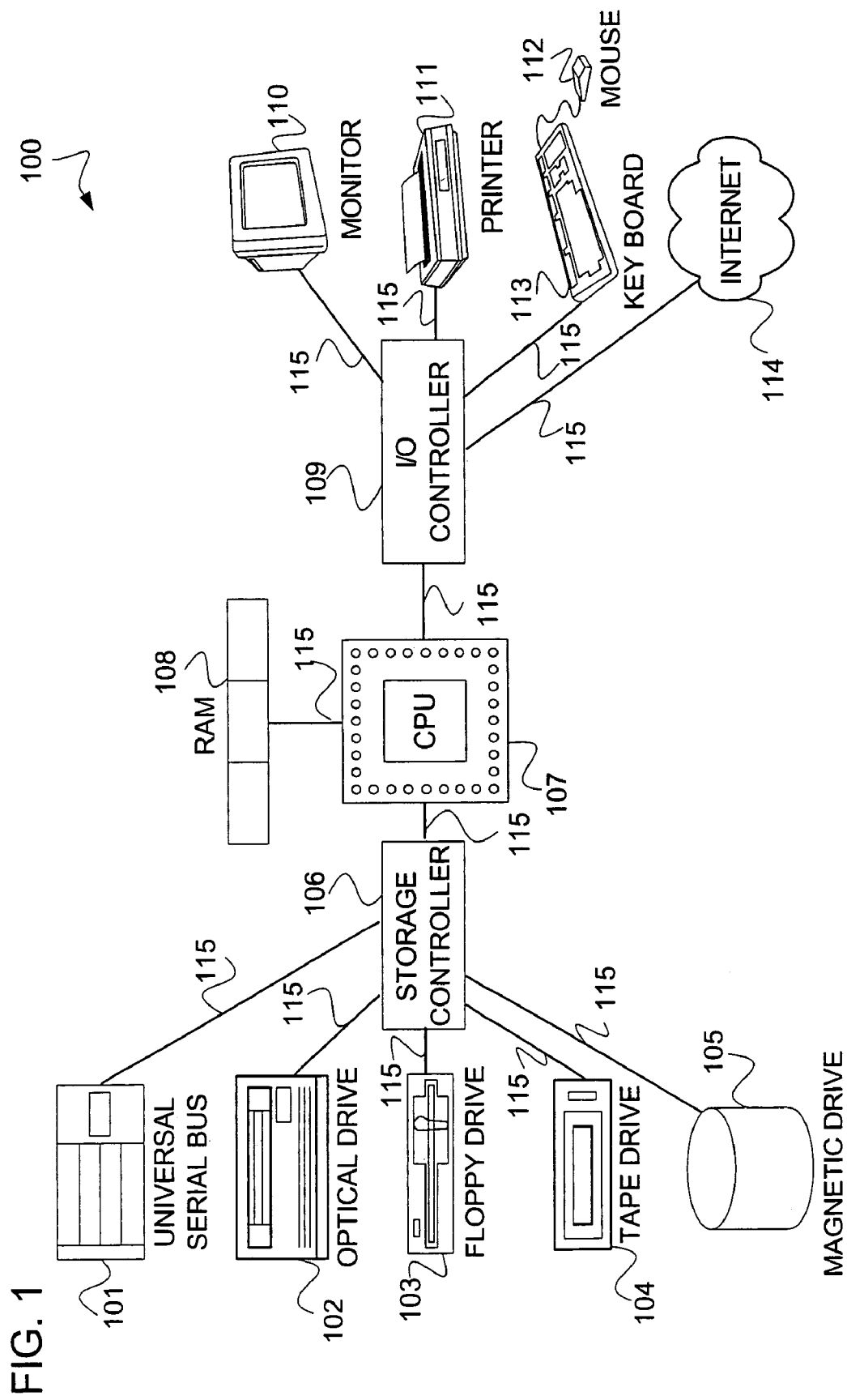
FIG. 1 is a schematic of a computer system 100.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, a digital processing system or computer system includes a processor, which may represent one or more processors and may include one or more conventional types of such processors (e.g., x86, x86-64), such as an AMD processor, or Intel Pentium processor or the like. A memory is coupled to the processor by a bus. The memory may be a dynamic random access memory (DRAM) and/or may include static RAM (SRAM). The processor may also be coupled to other types of storage areas/memories (e.g., cache, Flash memory, disk, etc.), which could be considered as part of the memory or separate from the memory.

The bus further couples the processor to a display controller, a mass memory or some type of computer-readable media device, the modem or network interface, and an input/output (I/O) controller. Computer-readable media may include a magnetic, optical, magneto-optical, tape, and/or other type of machine-readable media/device for storing information. For example, the computer-readable media may represent a hard disk, a read-only or writeable optical CD, etc. The display controller controls in a conventional manner a display, which may represent a cathode ray tube (CRT) display, a liquid crystal display (LCD), a plasma display, or other type of display device. The I/O controller controls I/O device(s), which may include one or more keyboards, mouse/trackball or other pointing devices, magnetic and/or optical disk drives, printers, scanners, digital cameras, microphones, etc.

In some embodiments, the present invention may be implemented entirely in executable computer program instructions which are stored on a computer-readable media or may be implemented in a combination of software and hardware, or in certain embodiments, entirely in hardware.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical-disk storage, magnetic-disk storage or other magnetic-storage devices, or any other media which can be used to carry or store desired program code means in the form of computer-executable instructions, computer-readable instructions, or data structures and which may be accessed by a general-purpose or special-purpose computer system. This physical storage media may be fixed to the computer system as in the case of a magnetic drive or removable as in the case of an EEPROM device (e.g., flash memory device).

FIG. 1 is a schematic of a computer system 100 containing a central processing unit (CPU) 107, connected via various buses 115 to a RAM module 108, a storage controller 106, and an I/O controller 109. The storage controller 106 is operatively connected to various types of physical media via various buses 115. These physical media include CDs, CD-R, CD-RWs, DVD-Rs, or DVDs using one or more optical drives 102, a disk or diskette using one or more floppy drives 103, magnetic tape using one or more tape drives 104, one or more hard drive or magnetic drives 105, and a removable storage media (e.g., a flash memory device) using a Universal Serial Bus (USB) 101. In some embodiments, the removable storage media includes a universal mass storage device, or USB device, that is typically inserted into a USB 101 through which data and/or applications are uploaded and/or downloaded onto the USB device (i.e., a flash memory device such as a key drive, thumb drive or some other flash memory device as is known in the art). (See *USB Complete: Everything You Need to Develop Custom USB Peripherals 2nd Edition*, by Jan Axelson, Lakeview Research, 2001.) In some embodiments, an I/O controller 109 is operatively connected to various I/O devices via various buses 115. In some embodiments, these devices include to a monitor 110, which, in some embodiments, is a CRT, LCD or some other type of display. In some embodiments, a printer 111 is connected to the I/O controller. In some embodiments, these devices additionally include a keyboard 113, which, in turn, is connected to a mouse 112. In some embodiments, an Internet 114 is connected to the I/O controller via a modem, Ethernet port, or some other connection known in the art. (See *Embedded Ethernet and Internet Complete*, by Jan Axelson, Lakeview Research, 2003.) In some embodiments, a local area network (LAN), or wide area network (WAN) may be used to supplement or in lieu of an Internet 114.

In some embodiments, when information is transferred or provided over a network or another communications connection (e.g., either hardwired, wireless, or a combination of hardwired or wireless) to a computer system, the connection is properly viewed as a computer-readable media. Thus, any such connection is properly termed a computer-readable media. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, or intermediate format instructions such as assembly language, or even source code.

In this description and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or Personal Digital Assistant (PDA)) where internal modules (e.g., a processor and memory) work together to perform operations on electronic data.

In some embodiments, the invention may be practiced in network computing environments with many types of computer system configurations, including hubs, routers, wireless access points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. The invention can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices.

In some embodiments, Internet refers to a network of networks. Such networks may use a variety of protocols for exchange of information, such as TCP/IP, ATM, SNA, SDI, etc, and may be used within a variety of topologies or structures. The physical connections of the Internet and the protocols and communication procedures of the Internet (e.g., the TCP/IP protocol stack) are well known to those in the art and are collectively referenced herein as the "Transport Layers." The Transport Layers provide such connections using various protocols (TCP/IP and UDP) over private and public network infrastructures, and will be used to define the method of communication between computer systems. Access to the Internet is typically provided by Internet service providers (ISPs). Access to the Internet via a computer system is typically by way of two or more computers connected in a client-server configuration. A client device or client will be used to reference any computer system that a user may sit at, touch, or hold. A server device will be used to refer to a remotely located computing system, which may be accessed by users through a client application or device via a LAN, WAN or Internet. Users on client systems, such as the client computer systems, generally obtain access to the Internet through an ISP. Access to the Internet may facilitate transfer of information (e.g., email, text files, digital-content files, etc.) between two or more computer systems, such as the client computer system and/or a server computer system (see e.g., a web server, mail server or the like). For example, one or more of the client computer systems and/or the Web server may provide digital content (e.g., video and audio, or video, or audio) to one or more of the client computer systems and/or the Web server. Such digital content may be provided in response to a request.

FIG. 2 is a schematic of a plurality of computer systems 100 connected via a computer network 200. The various types of computer systems pictured include: a server 201, network PC 202, desktop PC 203, laptop computer 206, PDA 207, main frame computer 208, minicomputer 209, and network server 210. These various computer systems can be operatively connected to one another via an Internet 204, a wireless station 205 and/or a WAN or LAN 211 just to name a few. The wireless station 205 includes a system implementing IEEE 802.11, a global system for mobile communications (GSM), a code division multiple access (CDMA) system, or some other system for implementing wireless communications. These various computer systems may communicate via certain transport protocols such as TCP/IP, UDP, ATM or one of the other above described protocols.

Overview

In some embodiments, the present invention is a method and system for the shredding, encryption, storage, and transmission and reassembly of digital content. Individual digital-content files are shredded using a predetermined shred size, resulting in multiple detailed records. Each of these multiple detailed records or pieces is then, in turn, encrypted with a separate symmetric or asymmetric key value. Once encrypted, the user privileges are established and the encrypted pieces are then separately stored into a database table. These encrypted pieces can then be retrieved, decrypted, and reassembled into the original piece of digital content and accessed via a viewer or player application that can access digital content formatted in TIFF, GIF, TXT, PDF, DOC, AVI, MPEG, JPEG, MP3, WAV, AAC or some other format known in the art. Alternatively, these encrypted pieces can be transmitted over a computer network (e.g., LAN, WAN, or Internet) from a first computer to a second computer, where the first and second computers are configured in a server-client relationship, or in a peer-to-peer relationship. Once these encrypted pieces are received they can be decrypted and played back by a viewer or player application, and/or stored in their encrypted form into one or more database tables. In some embodiments, the server and the client applications are stand-alone applications. In some embodiments, the database is an embedded database packaged with the server and/or client application. In some embodiments, the server and/or client application resides or sits on top of an operating system such as Windows™, Linux™ or Unix just to name a few.

Digital Content Shredding, Encryption, and Storage

In some embodiments, individual digital-content files are shredded using a predetermined shred size, resulting in multiple detailed records. This shred size can be manually or automatically determined. Each of these multiple detailed records or pieces is then, in turn, encrypted with a separate symmetric or asymmetric key value as is known in the art. (See *PGP: Pretty Good Protection*, by Simson Garfinkel, O'Reilly & Associates, Inc., 1995.) The shred size can be manually or automatically determined, and is typically based upon factors such as the application and data requirements (e.g., an application reading an MPEG file might require a large shred size as oppose to an application reading a JPEG file). Similarly, the size of the key value can be manually or automatically predetermined, and is typically based upon empirical testing and/or modeling relating what key size is most effective at withstanding an attempt to crack or break the protective encryption shell.

Once shredded and encrypted, the data is stored as database tuple or record into one or more database tables. In some embodiments, this database is an embedded database, while in other embodiments a separate database platform or application is used as is known in the art. In some embodiments, an embedded database is a database that is packaged with or within an application and is not a part of a separate database platform. In some embodiments, the embedded database is implement-and-forget in nature. That is, once implemented it requires little or no database administration. In some embodiments, the database tables are typically created using a Structured Query Language (SQL), and are accessed, searched, and information selected or retrieved using SQL or some similar language used to create and implement relational or object relational database schemas as are known in the art. (See *Database System Concepts 3rd Edition*, by Abraham Silberschastz, Henry K. Korth, & S. Sudarshan, McGraw-Hill, 1997.) A database application or platform is used, in some embodiments, including MYSQL™, SQLServer™, Access™, Oracle™, or the like. In some embodiments, the record is stored into a series of binary large object fields (BLOB), while in other embodiments the record is stored into a character large object (CLOB) field, or some other data type and associated field known in the art (e.g., string, float, or integer just to name a few). (See *The Fundamentals of Database Systems 3rd Edition*, by Remez Elmasri & Shamkant B. Navathe, Addison-Wesley, 2000.) For each piece of shredded and encrypted data, there is an associated Header record and Shred record. Generally speaking, in some embodiments, the Header record describes the actual attributes of the data, whereas the Shred record contains the actual data itself. The use of the Header and Shred records is described in the example provided below.

In some embodiments, an extensible-markup language (XML) and associated schema is used to tag and store the encrypted data as a database record as is known in the art. (See *XML for the World Wide Web*, by Elizabeth Castro, Peachpit Press, 2000; *Data on the Web: From Relations to Semistructured Data and XML 1ST Edition*, by Serge Abiteboul, Peter Buneman, & Dan Suciu, Morgan Kaufmann, 1999.) In this embodiment, the various schema types, whether built in or custom defined, will reflect the data structures and fields depicted below for the Header Data table and Shred Record Data table.

FIG. 3 is a schematic of the shredding and encryption process 300. Depicted is a target file 301 that is loaded into an embodiment of the present invention referenced herein as an application 302. In some embodiments, this target file 301 can be loaded by the present invention via a drag-n-drop method common to many graphical user interfaces (GUIs), or through a command line call to load the target file. Once loaded, in some embodiments, the target file is shredded into portions or chunks of data of a predetermined size through a shredding process 303. Once shredded, the resulting chunks of data are encrypted by a process 304 using one or more distinct private encryption keys. Once shredded and encrypted by steps 303 and 304, the chunks of data are saved to a Header Data table 305, and a Shred Record Data table 306, representing various database tables.

In some embodiments, a target file (e.g., "EXAMPLE.PDF") is brought into the system through a drag-n-drop feature, or by selection through a dialog box, screen, window or other types of user interfaces that are commonly known in the art. Once dropped into the application, various file attributes are extracted, which may include: file name, file date, file size, and/or the original location/path of the target file. Once these attributes are extracted, a Header record is created for that file and placed into a Header record or table in a database. In some embodiments, the Header table will have the following basic data fields and structure:

FileID: Integer, a value generated by the application to assign a unique value to the digital content Description: String, a value representing the target file name and extension Date: DateTime, a value representing the date and time the record file was created Size: Double, the total size of the file in kilobytes, megabytes or some other value FileName: String, a value representing the name of the target file FileExtension: String, a value representing the file extension or file type (e.g., PDF, MP3, JPEG, MPEG etc.)

ChunkCount: Integer, the number of chunks required to completely shred the target file ContentCount: Integer, the number of Chunks within each record Content: BLOB, a field containing the actual shredded content ChunkSize: Double, a value representing a predetermined or constant size for each chunk The above mentioned file attributes will then be used to populate these data fields. In addition to these fields, additional fields may be used depending upon the requirements of the user. These additional fields may be determined based upon empirical testing and/or modeling.

With regard to data for the field titled ChunkSize this data value is determined automatically, or by a user. Once determined, this value is then used to calculate the number of Chunks required to process a target file. In some embodiments, a calculation is made using the following ChunkCount formula: ChunkCount=Round(FileSize/ChunkSize). The Round function rounds the quotient to the nearest integer value; thereby compensating for file sizes that need only use partial amounts of a field or fields. In some embodiments, various conversion factors are applied such that if, for example, the FileSize is in megabytes (MB), then the ChunkSize will be converted to megabytes (MB) from, for example, kilobytes (kB) so as to allow for a commonality between the units of the numerator and denominator. These conversion factors are well known in the art and will be applied, in some embodiments, where the units of the numerator and denominator are not the same. The resulting ChunkCount value is then used to generate a series of data shreds or chunks that will be used to populate the Content field. In some embodiments, the Content field of the Header record is populated with the first chunk of data from the target file.

In some embodiments, the process of actually saving these data shreds or chunks to a database is accomplished in the following manner. First, once the ChunkSize and Chunk-Count is determined using, in some embodiments, the above disclosed method, a portion or chunk of the target file is read directly from the target file into a buffer, or stream, that is equal to or greater in size to the known ChunkSize. In some embodiments, a buffer equal to, or greater in size than the ChunkSize is implemented. This buffer, stream, or temporary stream is then encrypted using one or more of the processes described below. Next, this encrypted buffer or stream is then saved into the above described Content field of the Header table and/or the Shred Record table described below. This process continues iteratively or recursively until the entire file is consumed. An iterative example of this process is reflected in the following pseudo code:
While (not end of target file)
   Read a ChunkSize portion of the target file into a stream or buffer;
   Encrypt the stream or buffer;
   Place the stream or buffer into the Content field of the Header Data table or file data table;
   Assign a FileID to the record containing the Content field;
   Get the next ChunkSize portion from the target file A person skilled in the art using an object orient programming language such as C++, C#™, Java™, Delphi™, or the like would be able to implement this pseudo code.

In some embodiments, a method may be employed to use variable chunk sizes for a single target file. This method may employ the use of randomly generated ChunkSize values, whereby the ChunkSize value is determined anew after each encrypted stream or buffer containing a chunk is saved into the Content field of a Shred record or Header table. In this embodiment, a randomized ChunkSize value is subtracted from the FileSize value and a running ChunkCount value kept through each iteration or recursive movement. As with the method outlined above, each of these chunks is stored into a stream or buffer of a size equal to the ChunkSize, encrypted, and ultimately saved into the above described Content field of the Header table and/or the Shred Record table described below. Once the target file is completely consumed, the ChunkCount value is stored into the Chunk-Count field of the Header table. An iterative example of this process is reflected in the following pseudo code:
While (not end of target file)
   ChunkCount plus one;
   While(ChunkSize greater than remaining FileSize)
     Assign the ChunkSize a random value using a Randomizer function;
   Subtract the ChunkSize from the FileSize and assign the resulting value to the FileSize;
   Read a ChunkSize portion of the target file into a stream or buffer;
   Encrypt the stream or buffer;
   Place the stream or buffer into the Content field of the Header Data table or file data table;
   Assign a FileID to the record containing the Content field;
   Get the next ChunkSize portion from the target file A person skilled in the art using an object orient programming language would be able to implement this pseudo code.

In some embodiments, more than one chunk or shred may be saved into the same Content field. In one such embodiment, a first buffer or stream equal to, or greater in size than, the first ChunkSize is generated and the shred or chunk from the target file corresponding to this first ChunkSize is stored therein. This buffer or stream is then encrypted using one or more of the methods outlined below. Next, a second stream or buffer is generated that is equal to, or greater in size than, the first stream or buffer plus a second ChunkSize. A second shred or chunk from the target file corresponding to the second ChunkSize is then read from the target file and stored along with the first encrypted stream or buffer into the second buffer or stream. This second buffer or stream is then encrypted, and, in some embodiments, stored into the Content fields of the Header table or Shred record. In the alternative, additional shreds or chunks may be encrypted and stored into an ever growing buffer or stream the size of which can be determined by the user. In some embodiments, this process of generating an ever growing encrypted buffer or stream may continue iteratively or recursively until the entire file is consumed. In some embodiments, this process may continue iteratively or recursively until a predetermined number of chunks have been placed into a particular buffer. The ChunkSize used in this embodiment may be either the above described constant or randomized value. An iterative example of this process is reflected in the following pseudo code:
While (not end of the target file)
   Generate a buffer or stream of a size equal to the ChunkSize plus the previous encrypted buffer or stream;
   Read a ChunkSize portion from the target file;
   Assign the buffer or stream the extracted ChunkSize portion of the target file and the the previous encrypted buffer or stream;
   Encrypt the buffer or stream A person skilled in the art using an object orient programming language would be able to implement this pseudo code.

In some embodiments, the actual shredding and encryption of the chunks is performed by a Content Management Module and an Encryption Engine described below.

As to the FileID field, in some embodiments, this field is populated with a value unique to the Header table and each individual record within this table. This value may be automatically assigned by the database itself, or from a routine published by the host application. In some embodiments, the Description field is populated with the target file name (e.g., "EXAMPLE") and extension (e.g., ".PDF"). In some embodiments, this is a meta-data field, which may be changed by the user or application.

In some embodiments, the remainder of the file will be processed into a Shred record table which has the following base data fields and structure:
   ChunkID: Integer, a unique value used to determine a record's identity within a table
   FileID: Integer, a value corresponding to the FileID value in the Header file (i.e., a join value)
   Content: BLOB, afield containing the actual shredded content
   ContentCount: Integer, describing the number of chunks contained in each record ChunkSize: Integer, a value representing a predetermined size (e.g., kilobytes, megabytes) for each chunk An iterative or recursive method is used, in some embodiments, to process the remainder of the file into the Shred Record table whereby a chunk is read into the stream/buffer, the stream is encrypted, the Content field is populated with the encrypted stream data, and the FileID field is assigned the value of the same field from the Header Data record. This establishes a master-detail relationship between the two records. The ChunkID field is assigned a value unique to the Shred Record table within the host database. This value may be automatically assigned by the database itself, or from a routine published by the host application, and the chunk record is posted to the Shred Record table. In some embodiments, the purpose of the ChunkID value is to establish a priority for the various pieces of shredded, encrypted content that reflects the order of these pieces as they are read in from the original target file. In some embodiments, the size of the Content and ContentCount field in the Header Data record can be varied.

In some embodiments, additional data fields and structures are envisioned. In still other embodiments, the Header Data may contain an additional meta-data field for descriptive purposes and searching. In some embodiments, these meta-data fields and tags may be written in the aforementioned XML, using an associated XML schema.

Figure 4:
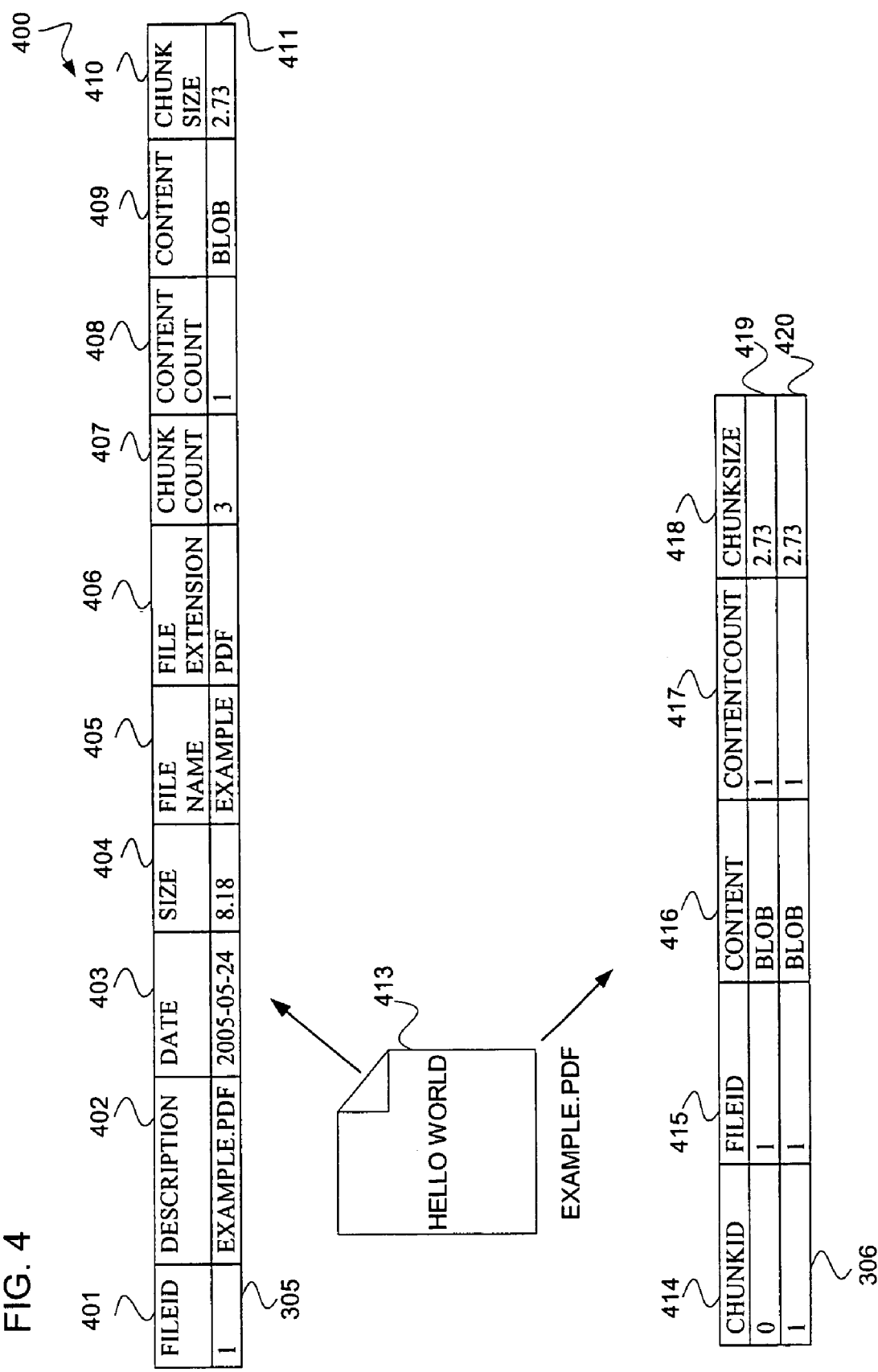
FIG. 4 is a schematic describing a data structure 400.

FIG. 4 is a schematic describing a data structure 400, including domains and attributes, populated with records from a hypothetical file titled "EXAMPLE.PDF". The aforementioned shredding process 303 shreds files into Header Data table 305 with the following table columns. In some embodiments, a FileID 401 table column is depicted that contains a value automatically generated by the application to assign a unique value to the digital content to be shredded, encrypted and stored. In the present example, an integer value of one (1) has been assigned. In some embodiments, a Description 402 table column is disclosed that contains a string value reflecting the file name and extension. Here, the string "EXAMPLE.PDF" has been stored. In some embodiments, the column titled Date 403 holds a date type, as is common to many database applications, relating to the date on which the file was shredded, encrypted and stored. In some embodiments, a string, CLOB or some other data type known in the art can be used in lieu of the date data type. In the present example, the date 2005 May 24 is the date the file was created. In some embodiments, a Size 404 is implemented whereby data relating to the size of the file to be shredded, encrypted and stored is stored. In some embodiments, this field will use data of a type integer, double, float or some other type well known in the art. This example depicts a file size of 8.18, where this size is measured in kilobytes (kB). In some embodiments, the unit of size will be kilobytes (kB), whereas in other embodiments the unit of size will be megabytes (MB), gigabytes (GB), or terabytes (TB), or some other size known in the art. In some embodiments, a FileName 405 field is used whereby a string data type is implemented to represent the name of the file. In the present case, the string "EXAMPLE" is stored into the table. In still further embodiments, a FileExtension 406 field is created, whereby a value of type string is stored reflecting the extension type of the file be this a PDF, JPEG, MPEG or the like. Here, a "PDF" file extension is stored. In some embodiments, a ChunkCount 407 is used to save the number of chunks into which a file is to be divided. In some embodiments, this value is represented as an integer, or some other data type known in the art. This ChunkCount value is, in some embodiments, derived from the above described ChunkCount formula. The present example uses a ChunkCount of three (3). In some embodiments, a ContentCount 408 is utilized whereby the number of chunks within each record can be determined. Specifically, it is possible to have more than one (1) chunks within each record such that each record for a chunk could contain more than one chunk. The present example has only one (1) chunk for each record. In some embodiments, a Content 409 field is implemented that contains the actual file content. In some embodiments, this field is of type BLOB, CLOB or some other type well known in the art. In some embodiments, this field will contain the actual digital content represented as an object with associated attributes and methods (i.e., a data object), but in binary or character (e.g., ASCII, Uni-Code) form. In some embodiments, these data objects will be protected with an encryption shell. In some embodiments, this encrypted shell will be created using symmetric or asymmetric encryption algorithms and techniques as is described below. In the present example, a portion of the EXAMPLE.PDF file is stored as a BLOB data object. In some embodiments, a ChunkSize 410 field is utilized to determine the size of each chunk into which the file is divided. In some embodiments, ChunkSize 410 will use a field of type integer, double, float, or some data type known in the art to store data. Moreover, in some embodiments, the value in the ChunkSize will represent kilobytes (kB) of digital content, whereas, in other embodiments, the value will represent megabytes (MB), gigabytes (GB), terabytes (TB), or some other size known in the art. In the present example, a double value of 2.73 is used, where this value is in kilobytes (kB). In this example, the first record 411 is placed into the Header table 305.

While the first chunk of data is saved as a record into the Header Data table 305, the remaining data are saved into a Shred Record data table 306. This Shred Record table 306 has five (5) columns populated with records from a hypothetical file titled "EXAMPLE.PDF". In some embodiments, a ChunkId 414 contains an integer value representing the unique value of the record entry. In the present example, the value zero (0) is assigned to the first record 419, whereas the value one (1) is assigned the second record 420. These two records correspond to the two remaining chunks of the three (3) into which the "EXAMPLE.PDF" was divided. In addition to the ChunkId 414 column, a FileID 415, Content 416, ContentCount 417 and ChunkSize 418 are provided, the descriptions of which are provided above.

In some embodiments, additional data fields are placed into Header record, fields relating to the privileges and digital rights associated with the target file. These rights may vary depending upon the application and file requirements. In some embodiments, the following data fields may be used to establish the digital rights of a particular target file:

Owner: String, is the name of the content publisher

SourceServerIP: String, address or URL of the originating server

SourceServerName: String, name of the originating server

CanEdit: Boolean, determines if the content item may be edited

CanCopy: Boolean, determines if the content item may be copied

CanView: Boolean, determines if the content item may be viewed

CanForward: Boolean, determines if the content item may be forwarded to another user CanShare: Boolean, determines if the content item can be shared with others for read-only usage CanBurn: Boolean, determines if the content item may be placed on removable media (e.g., CD-R, CD-RW, DVD-R)

BurnCount: Integer, how many times can it be burned to removable media

IsPortable: Boolean, determines if the content item may be moved onto portable devices CheckedOut: Boolean, determines if the content item is on-loan IsDemo: Boolean, determines if the content item is restricted until purchase Expires: Double, when the demo usage expires LoginRequired: Boolean, determines if the user must login to the original server before accessing the content item These various data fields can be used to set the privileges or the digital rights of a user (e.g., the right to make a copy, the right to distribute, the right to play on a certain device etc.). In addition to these basic digital rights, in some embodiments, other functionalities relating to digital rights can be implemented via adding additional data fields including data/time limitations, usage count restrictions, read-only access, print rights and self-destruct functions. In some embodiments, these rights are selected by the user prior to the target files being shredded, and are applied once the first chunk is created.

In some embodiments, each record has separate privilege rights or use rights associated with it. These use rights allow the individual who originally shreds and encrypts the digital content to, in effect, determine such things as whether the digital content may be copied, what types of devices and/or applications may be used to play the digital content, how many copies may be made of the digital content, and a host of other privileges that relate to the Fair Use rights of the licensee.

Figure 5:
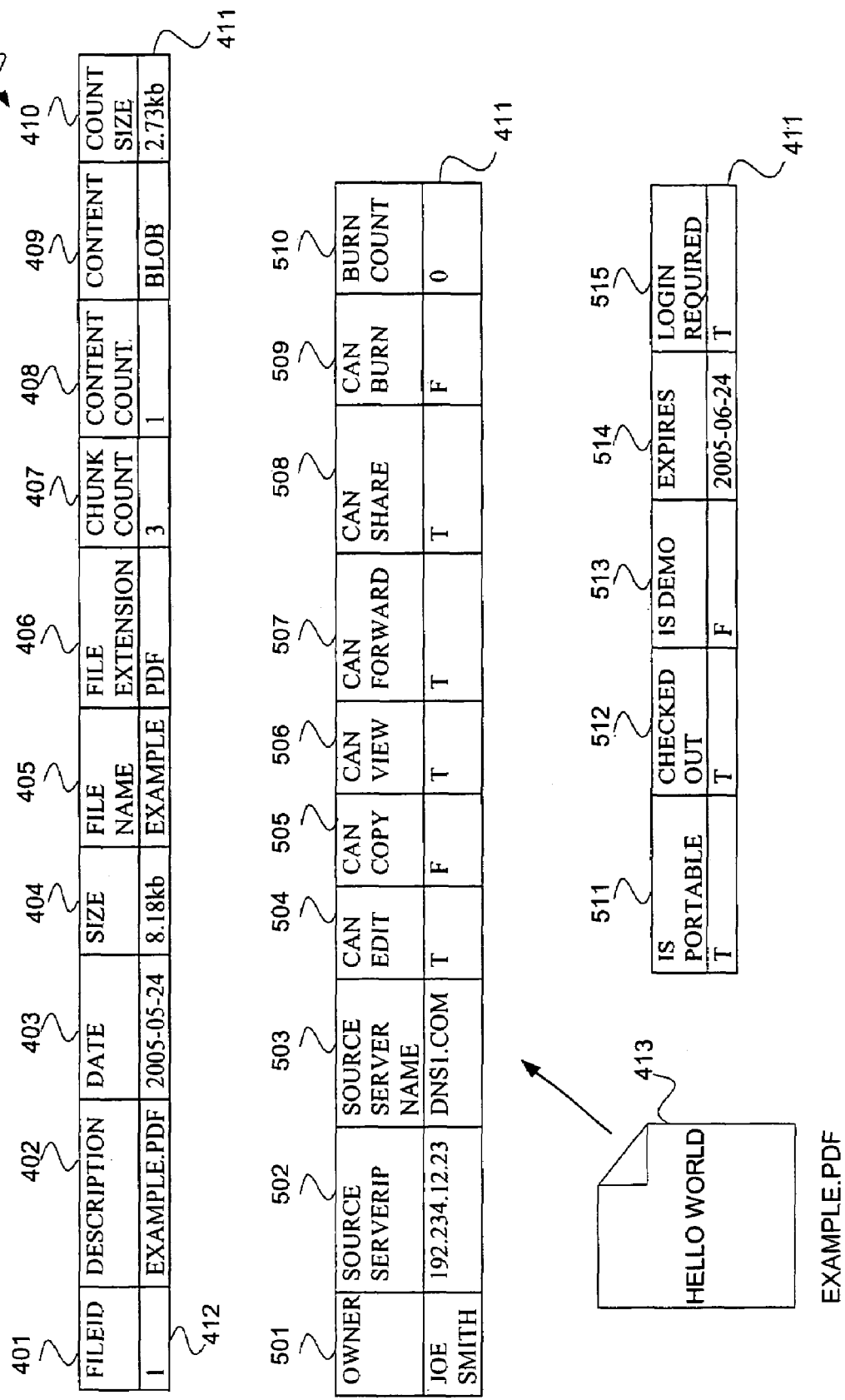
FIG. 5 is a schematic describing a data structure 500.

FIG. 5 depicts a data structure 500 populated with records that are used within the Header Data table 305 to determine digital rights associated with a particular record. In the present example, record 411 has a number of digital rights associated with it. For example, an Owner 501 value in the form a string is set to determine what party or individual published the content. Here the name of that person is JOE SMITH. Next, a SourceServerIP 502 in the form of a string is use to determine the Internet protocol (IP) address of the server from which the content originated. In the present example, the IP Address is 192.234.12.23. Then, a SourceServerName 503 is established to provide the name of the originating server. The present example uses the name of DNS1.COM as the name of the source server. A variety of column values containing boolean values are then used to set certain rights with respect to the shredded, encrypted content. A CanEdit 504 is use to determine whether the content can be edited. In the present example, the value is set to "True." A CanCopy 505 value is used to determine whether the content can be copied. Here this value is set to "False." Additionally, a CanView 506, CanForward 507, CanShare 508, and CanBurn 509 columns are used to set various rights related to the content. In this example, the values are set to "True," "True," "True" and "False" respectively. Then a BurnCount 510 is provided, which, in the present example, is set to zero (0) signifying that no copies can be made. After BurnCount 510, three (3) more Boolean values are provided in the form of a column titled IsPortable 511, CheckedOut 512, and IsDemo 513. These values, in the present example, are set to "True," "True" and "False" respectively. In addition to the above disclosed embodiments, in some embodiments, a column titled Expires 514 is used to set a date when with a demonstration version, usage of the content expires. Here the demonstration version is set to expire on 2005 Jun. 24. In some embodiments, if the expiration value is set to zero (0), then the usage will not expire. Additionally, in some embodiments, a boolean value is used to determine whether a login is required to access content. (i.e., a login required field). In the present invention, a Login is required hence the value of the field is set to "True."

One advantage of the present system is that it does not implement the "one-size-fits all" approach of other DRM systems. Specifically, whereas some DRM systems, for example, prevent one (e.g., a licensee of music) from making any copy of a piece of digital content, or from accessing a piece of digital content on a particular type of device, or using a particular application to access the piece of digital content, in some embodiments of the present invention, one is allowed the flexibility to set or not set a variety of different privileges, and not be wedded to any one privilege. This flexibility, in some embodiments, allows one using the present invention to better observe or potentially accommodate the Fair Use rights of a licensee.

In some embodiments, the application utilizing or requesting the shredded, encrypted digital content is charged with the responsibility of decrypting and reassembling the shredded, encrypted digital content. This application, in some embodiments, is written in an object oriented programming language including C++, C#™, Java™, Delphi™, or the like.

In some embodiments, the encryption and decryption functions are performed by an Encryption Engine native to the server or client application. In some embodiments, this Encryption Engine typically supports an un-tethered encryption system. Specifically, in some embodiments, the invention supports symmetric encryption algorithms and techniques. In some embodiments, however, an asymmetric algorithm or tethered encryption system may be supported. These Encryption Engines are described below.

Reassembly of Shredded, Encryption, and Stored Digital Content from a Database

In some embodiments, Content 409 must be reassembled in a computer system output stream or buffer from a record set contained in Header Data and Shred Record Data tables. In some embodiments, these data tables may be native or remotely located. In some embodiments, the process for reassembly is as follows. The Content 409 field of a Header Data record 411 is copied to an output stream or buffer. Then, based upon a correspondence between the FileID 401 value (e.g., 1) of the Header record (e.g., 411) and the records contained in the Shred Record data table (e.g., records 419 and 420), an iterative or recursive process is used to decrypt and append the Content 409 field from each file data record (e.g., 411, 419 and 420) to the same output stream or buffer. In some embodiments, the records will be sorted prior to placement into the output stream or buffer, while, in other embodiments, the records will exist as sorted records within the tables (e.g., 305 and 306). In some embodiments, decryption of the Content 403 will occur after the records (e.g., 411, 419 and 420) are placed into the output stream or buffer. This iterative or recursive process will continue, in some embodiments, until the entire record set corresponding to the digital content is placed into an output stream or buffer. In some embodiments, only a portion of the record set will be placed into an output stream or buffer, where the portion size (i.e., a portion as denoted in kB, MB or some other unit of measurement) of the record set is based upon some predetermined value. This value may be automatically or manually determined by a user (e.g., a server administrator) of the client or server application. The output stream or buffer contents are next copied or sent to a native destination application or device. In the case where the record set is to be reassembled into a file, the output stream or buffer is saved to a file of a user-determined name, format (e.g., MPEG, MP3, JPEG, PDF, etc.) and location (e.g., a file directory location). In one embodiment, once extracted and reassembled, this digital content may be restored to a physical media such as a CD-RW, CD-R, DVD-R or the like. In the case of a destination stream, the output stream data is simply copied to the destination stream. An iterative example of the decryption and reassembly process is reflected in the following pseudo code:

While (not the end of the Shred Record Data table and the FileID data for a record in the Header Data table equals the FileID data for a record in the Shred Record Data table)
    Read the Content field from the Shred Record Data table into a memory location;
    Run a decryption function on the Content contained in the memory location;
    Append the decrypted Content to a stream or buffer;
    Get the next Content field from a record in the Shred Record Data table A person skilled in the art using an object orient programming language would be able to implement this pseudo code. The entire process of transmission and reassembly of shredded, encrypted Content 409 from a remote database is disclosed below in the section relating to the client application.

Assembly of Multiple Shredded, Encyrptred Digital Content Records into a Single File Format In some embodiments, multiple pieces of Content 409 can be assembled into a compilation of digital content. The compilation, in some embodiments, can contain, among other things, multiple files for a movie including trailer information, comments by the participants in the movie (e.g., actors, directors, producers, just to name a few), outtakes, and the actual movie itself. In still other embodiments, the compilation can contain multiple music tracks for, for example, a specific artist or musical genre. In some embodiments, an authoring tool is implemented that provides the ability to assemble a file from digital content not stored in the application database, but from files stored elsewhere on a user's machine. In terms of formats, in some embodiments, formats of varying types can be inserted into the same compilation making it possible to combine video, audio, graphics and text into the same compilation or combined file. In at least one embodiment, BLOB fields are used to store the digital content for each file. Additionally, in some embodiments, when this compilation is saved as a database record a new FileID 401 is generated for it. With regard to the actual creation of a compilation, as a threshold matter, to generate this compilation, a list of records (e.g., 411, 419, 420) to be placed into the compilation must be created, using, for example, an SQL query. Once this list of records is generated, an iterative or recursive process can be used to first generate an output stream or buffer, assign this new buffer content from an existing buffer or steam, assign this buffer content from a record (e.g., 411), and get the next record in the list or records (e.g., 419, 420). Once these records are placed into a buffer or stream, they can be outputted to an application or device including a client application or device, and utilized as a single file. The following pseudo code reflects this process:

While(not end of a list of records)
    Generate a new stream or buffer equal in size to the record plus an old stream or buffer;
    Assign the content from the old stream or buffer to the new stream or buffer;
    Assign the content from the record to new stream or buffer,
    Get the next record A person skilled in the art using an object orient programming language would be able to implement this pseudo code.

In one embodiment, a compilation can be created by directly accessing the data structure containing the record set to be compiled. In this embodiment, a data structure containing the record set is read into a second data structure, be this a list, hash table, tree, or some other data structure known in the art. (See *Algorithms in C++ Parts: 1-4, 3$^{rd}$ Edition*, by Robert Sedgewick, Addison-Wesley, 1998.)

This record set can be read in iteratively or recursively, and will continue until the end of the record set is encountered. Each record of the set is read into an individual buffer which is then, in some embodiments, stored in a memory location associated with the second data structure. Each record is associated within the data structure by virtue of a common or shared FileID value, such that links will exist between individual records stored in the data structure or contiguous pieces of memory representing the data structure will contain records with a common FileID value. The following pseudo code reflects this process:

While(not end of the data structure containing the records)
    Initialize a memory location;
    Read a record containing data from a header table into the initialized memory location;
    Add the initialized memory location to a second data structure;
    If (FileID of the record stored into the second data structure and the FileID of the next record are the same)
        While(FileID of the record stored into the second data structure and the FileID of the next record are the same and not end-of-data-structure)
        Initialize a memory location;
        Read the next record into the initialized memory location;
        Add the initialized memory location to the second data structure;
    Get the next record A person skilled in the art using an object orient programming language would be able to implement this pseudo code.

A Server Application

In some embodiments, a first and second computer system are configured in a server-client relationship. Server and client applications are run on the first and second computer systems respectively (see below description). These applications, in some embodiments, are written in an object oriented programming language such as C++, C#™, Java™, Delphi™, or the like. Once written, a unique private key value is embedded in the server application to uniquely identify the server application. The application along with the embedded key value is then compiled or interpreted as is known in the art. In this server-client relationship, the client requests shredded, encrypted content from the server. This encrypted content is streamed to the client via a LAN, WAN or Internet. Users of the client or server application will interact with the server or client computer systems via various GUIs.

Figure 6:
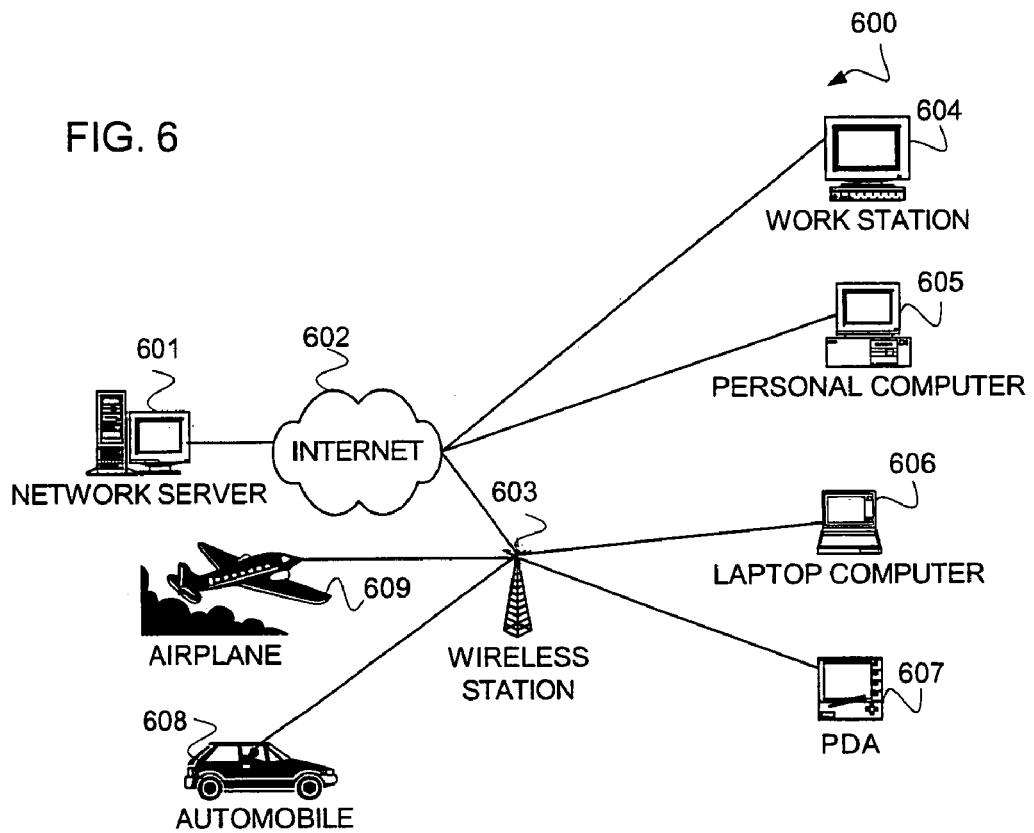
FIG. 6 is a schematic depicting a server-client network 600 between computer systems.

FIG. 6 is a schematic depicting a server-client relationship or network 600 between computer systems. In FIG. 6 a server 601 is connected to an Internet 602. Connected to the Internet 602 is a wireless station 603, and work station 604, personal computer 605, and laptop computer 606 and PDA 607 both of which are connected to the Internet 602 via the wireless station 603. Additionally, in some embodiments, a computer system 100 can reside in an automobile 608 or an airplane 609, and hence either one or both of these computer systems 100 can be connected in a server-client configuration to other computer systems 100, including those listed above, via a wireless station 603. In some embodiments, the laptop computer 606 is connected directly to the Internet 602. In some embodiments, the server 601 is a server in the traditional sense in that it carries out tasks for another computer (e.g., a client). This client can be any of the above mentioned computer systems (e.g., laptop computer 606, PDA 607, personal computer 605).

Figure 7:
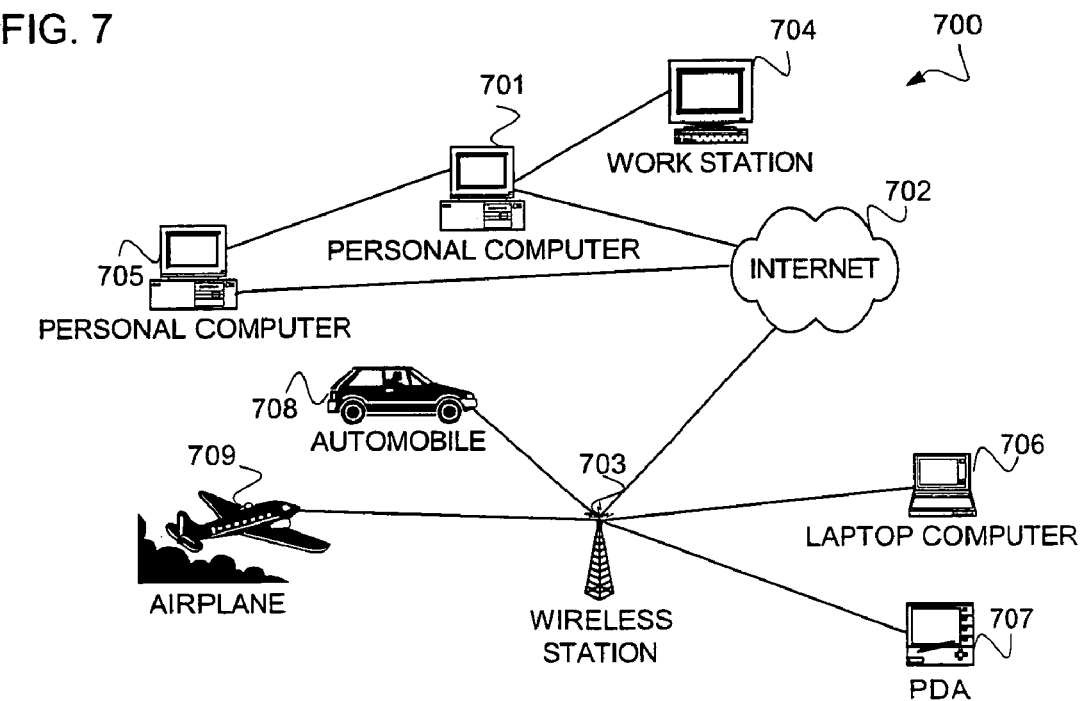
FIG. 7 is a schematic depicting a peer-to-peer network 700 between computer systems.

FIG. 7 depicts a peer-to-peer network 700 between computer systems whereby each computer system functions simultaneously as both a client and a server. In FIG. 7, a personal computer 701 is connected to an Internet 702, a work station 704, and a second personal computer 705. Connected to the Internet 702 are a wireless station 703, and personal computer 705. Furthermore, connected to the wireless station 703 are a laptop computer 706 and PDA 707 both of which are connected to the Internet 702 via the wireless station 703. Additionally, in some embodiments, a computer system 100 can reside in an automobile 708 or an airplane 709, and hence either one or both of these computer systems 100 can be connected in a peer-to-peer configuration to other computer systems 100, including those listed above, via a wireless station 703. In some embodiments, the laptop computer 706 is connected directly to the Internet 702. In this peer-to-peer configuration, any of the above disclosed computer systems (e.g., laptop computer 706, PDA 707) can perform the server tasks normally associated with a server computer system (e.g., server 601).

In some embodiments, the server application has a number of basic functionalities associated with it. These functionalities can be configured individually or as a group to meet certain needs of a user of the server application.

In some embodiments, a general configuration is employed that allows the server to be assigned a name by which clients will address it through the Transport Layers. Maximum-memory-usage and temporary-storage-size values are also maintained in this area. Server priority levels may also be selected with a value set of: Highest, Above Normal, Normal, Below Normal, and Lowest. Various other settings govern general security, startup, garbage collection (memory management), and client retry settings. All of these items are presented in an independent dialog window with options to commit or cancel changes.

In some embodiments, a network configuration is employed which allows the user to configure each installed transport layer. Each layer contains settings for one or more ports on which to communicate, and a physical adapter selection on which to connect to the network (e.g., LAN, WAN, or Internet). Each transport layer may also be enabled or disabled. Support is also provided for automatic availability broadcasting, or private operation mode. The maximum number of supported transport layers is dependent upon the bounds of each compiled instance of the server.

In some embodiments, in addition to the above described general and network configurations, various additional functionalities are available for the server application. Various user administration functions are available that allow the addition, modification and deletion of user profiles used when the server is operated in a secured mode. Each profile specifies a username, last name, first name and an optional administrator designation. The profile also contains multiple permissions flags including read, insert, update and delete. Additional profile settings may exist to fulfill other functionality within specific compiled versions of the server. Users with administrative designation can log into the server and change any of the configuration settings. For example, read access allows users to open database tables in read-only mode, while insert rights allow users to create new tables and add new records. Update rights allow users to rename, restructure, pack, and re-index tables and modify records in tables, whereas delete rights allow users to delete tables and delete records from tables.

In addition to the various functionalities associated with the user administration designation, in some embodiments, a user can engage in alias configuration wherein the user can add, edit or delete aliases known to the server. An alias is a named reference to a storage location containing database tables. In some embodiments, the path references a fully qualified path to a folder under the host operating system. In some embodiments, an unlimited number of aliases are supported. In some embodiments, clients utilize aliases to reference specific databases without having to know the physical path on the server. This also provides operating system independent access to the database. In some embodiments, the clients may implicitly contain or know alias names, or they may be queried from the server at runtime after passing security requirements.

In some embodiments, a scripting functionality is implemented that allows the server to process specific commands individually, or in batch mode. Commands may be submitted to the server from clients via the Transport Layers. Batch commands may be processed at startup through specific files, or received as streams from the transport layer. In some embodiments, these batch commands are written in some type of scripting language such as Perl, or some other language known in the art.

In addition to the above described functionality, in some embodiments, basic server functionality is included. Start Server initiates communication with client via the Transport Layers, using the user-specified configuration settings. Any errors preventing startup are displayed for user intervention and optionally written to a log table or file. Successful startup is indicated by one or more images or words on the main display. Additional server modules may also be initiated at startup and may contain additional settings and indicators. These modules are specific to each compiled instance of the server. Stop Server halts all communication over the Transport Layers leaving clients disconnected from the server. The application window remains active and the server may be re-started. Exit Server halts all communication over the Transport Layers leaving clients disconnected from the server and closes the application window.

A Server Application Interface

In some embodiments, the server application interface provides end-user access to system settings, user accounts, and database references (i.e., the aforementioned aliases). A main application window is displayed, in some embodiments, containing menus and buttons to access various functions, relating to the definition and operation of the network. The main window inherits all standard functions as defined by the host operating system. The form contains various visual components to facilitate user interaction.

In some embodiments, the form also contains various display components used to convey some or all of the following informational items: database statistics for all client activity such as: state (i.e., active/inactive), connected client count, active session count, open database count, open table count, number of database cursors, and memory usage. In some embodiments, client connections statistics for all activated Transport Layers such as: addresses, state, connected client count, message count, and performance calculations. In some embodiments, uptime is expressed in days, hours, minutes and seconds. In some embodiments, a hierarchical menu structure provides access to various settings and options, which are presented inside one or more modal dialog boxes. In some embodiments, button bars containing access to additional, or commonly used functions are implemented. In some embodiments, various images, bitmaps and glyphs are used to indicate on/off status of configuration settings and operational modes are implemented. This form runs on the console of the host computing device and provides real-time information and interaction. The host network connection is used to facilitate client communication via one or more Transport Layers.

Figure 8:
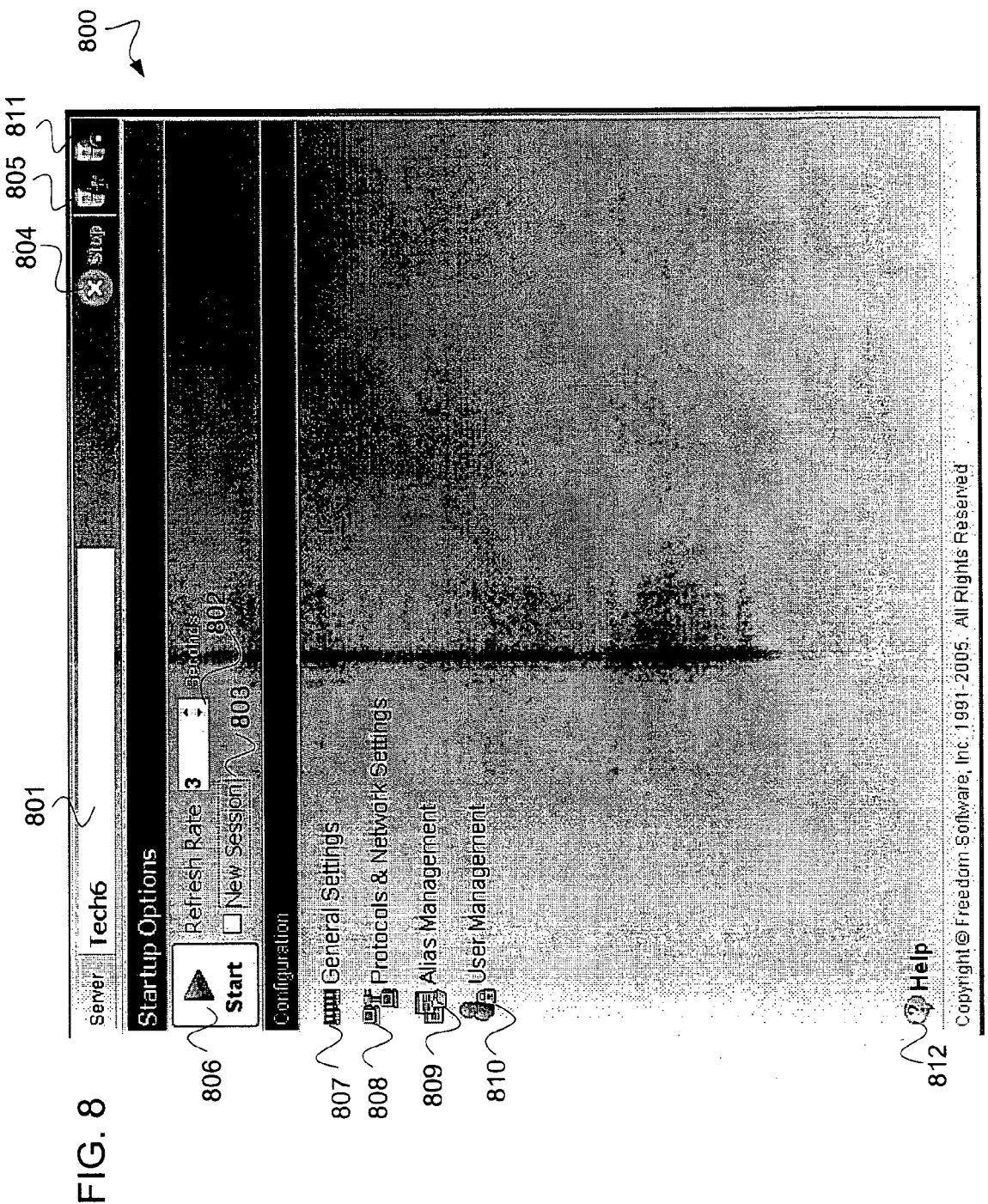
FIG. 8 is a schematic depicting the start-up options of a server GUI 800.

GUIs developed using one of the above disclosed object-oriented programming language is a practice well known in the art. (See *C++ GUI Programming with Qt* 3, by Jasmin Blanchette & Mark Summerfield, Prentice Hall PTR, 2004.) FIG. 8 is a schematic of a startup options GUI 800. In some embodiments, a server name can be inserted into a text box 801. This server name can be changed from a general configuration window or frame, but only when the server application is not running. In at least one embodiment, the server name is combined with the IP address of the local machine to determine how a client computer system can connect to the server when multiple servers are running on the same local machine. In some embodiments, a text box with an incrementing button 802 is implemented to allow a user such as, for example, a server administrator, to set the refresh rate or the interval for the rate at which statistics for a particular server application is displayed. A check box 803 that, when checked, creates a new session between a server and client computer systems is also implemented in some embodiments. The session is used as a log to help differentiate between one span of time to another. Every time a new session is chosen from the startup options, the session number is increased by one. In some embodiments, a button 804 is implemented to stop the application server from running. When stopped, multiple configurations can be edited that are not enabled to be edited when the server is running. If a server is already in a stop mode, then this button is disabled. In at least one embodiment, a button 805 denoted by a padlock icon is implemented whereby, if the server security is enabled, this icon will show as a closed padlock. In the alternative, if the server security is disabled, this icon will show as an open padlock icon. A start button 806 is implemented, in some embodiments, that initiates a server application that runs the server. Once the server has been started it will be able to process requests from the client applications. If the server is already running, this button is disabled. In some embodiments, a general settings button 807 is implemented, which when executed, opens a second window or frame that allows one to perform such tasks as setting a server name, specifying resource and memory management and retry options among other things. In some embodiments, a protocols and network settings button 808 is implemented, that, when executed, opens an additional window or frame for performing such tasks as adjusting the TCP/IP Transport Layer and network settings. Next, In some embodiments, an alias management 809 button is implemented that, when executed, opens an additional window or frame that allows additional functionality to manage an alias associated with a server application. In some embodiments, a user management button 810 is implemented that allows management of users and the various privileges associated with these users and stores this information into a server application database. In at least one embodiment, a running icon 811 is implemented whereby if the server application is running, this icon will display a green circle with a white arrow in it. If, however, the server is stopped, this icon will display a red circle with a white dot in it. Moreover, in at least one embodiment, a help button 812 is implemented that allows a user to open a help window, whereby the user can perform a text search using a text box to input data, or index search of the various functionalities associated with the server application.

FIG. 9 is a schema of a general configuration GUI 900. In some embodiments, a general settings button 807 is executed. Once executed, a window or frame opens and additional functionality relating to configuring a server application is displayed. In some embodiments, a text box 901 is implemented allowing for a user to input a server name. The server name can only be modified while the server application is not running. This server name determines what server names may be selected. In terms of what names can be inputted into the text box 901, any name comprised of ASCII or Uni-Code characters of a predetermined length may be used. In some embodiments, a text box 902 is implemented that allows a user, such as a server administrator, to input the maximum amount of random access memory (RAM) that may be used for a server's internal RAM cache. In at least one embodiment, a text box 903 may be implemented to record the maximum memory a server will use for virtual memory in, for example, the hard drive (i.e., magnetic storage device) implemented by the server. In some embodiments, a drop down menu 904, with setting of highest, medium and lowest, is implemented to enable an individual to set the thread priority that specifies the priority given to the application server from the operating system (e.g., a Windows 32-bit operating system) for processing priority. In some embodiments, a check box 905 is implemented to denote whether or not encryption is used. If it is unchecked, the database does not apply encryption, while if it is checked qualified clients are given the means to decrypt data when needed. In at least one embodiment, a check box 906 is implemented that, when checked, requires that logins, including user name and password, be used. If this is not checked, then no login will be necessary. A check box 907 is implemented in at least one embodiment, wherein, if checked, any configuration changes will not be saved during the current session. Specifically, the next time the server application is executed it will revert back to the prior server application configuration settings. In some embodiments, a check box 908 is implemented that allows one to disable server output wherein, if checked, the server application will not be able to output any data from the database tables. In at least one other embodiment, a check box 909 is implemented that allows for various startup options to be executed that automatically bring up the server application whenever the machine upon which the server application is sitting is executed. In some embodiments, a check box 910 is implemented to set certain startup options, wherein, if checked, the server will automatically be minimized when it is brought up (i.e., the server application window or start up frame). In some embodiments, a check box 911 is implemented which, when checked, allows for a memory management function to be enabled such that a predetermined amount of memory may be freed up by the operating system for use by the server application. In still at least one additional embodiment, a text box 912 is implemented that allows a user to set the frequency at which the server application checks with the operating system to reclaim memory previously allocated and used by the server application, memory which can now be freed up for use (i.e., re-use) by the server application. In some embodiments, a text box 913 is implemented that allows for various retry options to be implemented, including setting the retry option based upon the interval from last message received by the server application from a client application. Specifically, this text box 913 sets the interval for how long the server application will wait to keep alive a message from a client since the last time the client sent a keep a live message. In still one other embodiment, a text box 914 is implemented relating to keep alive information, where a server application waits before disconnecting the client application from a network based upon the time between messages. In some embodiments, a further text box 915 is implemented whereby retry options are set that determine the number of tries that will be made to keep a line of communication open between a server and client application. Once any of these predetermined thresholds as entered into the text boxes of 913, 914, or 915 have been met, the server closes the connection with that client. In some embodiments, a series of Save, Cancel, and Help buttons 916 are implemented. These buttons provide the option to save, cancel or access the help option for the general configuration GUI 900.

Figure 10:
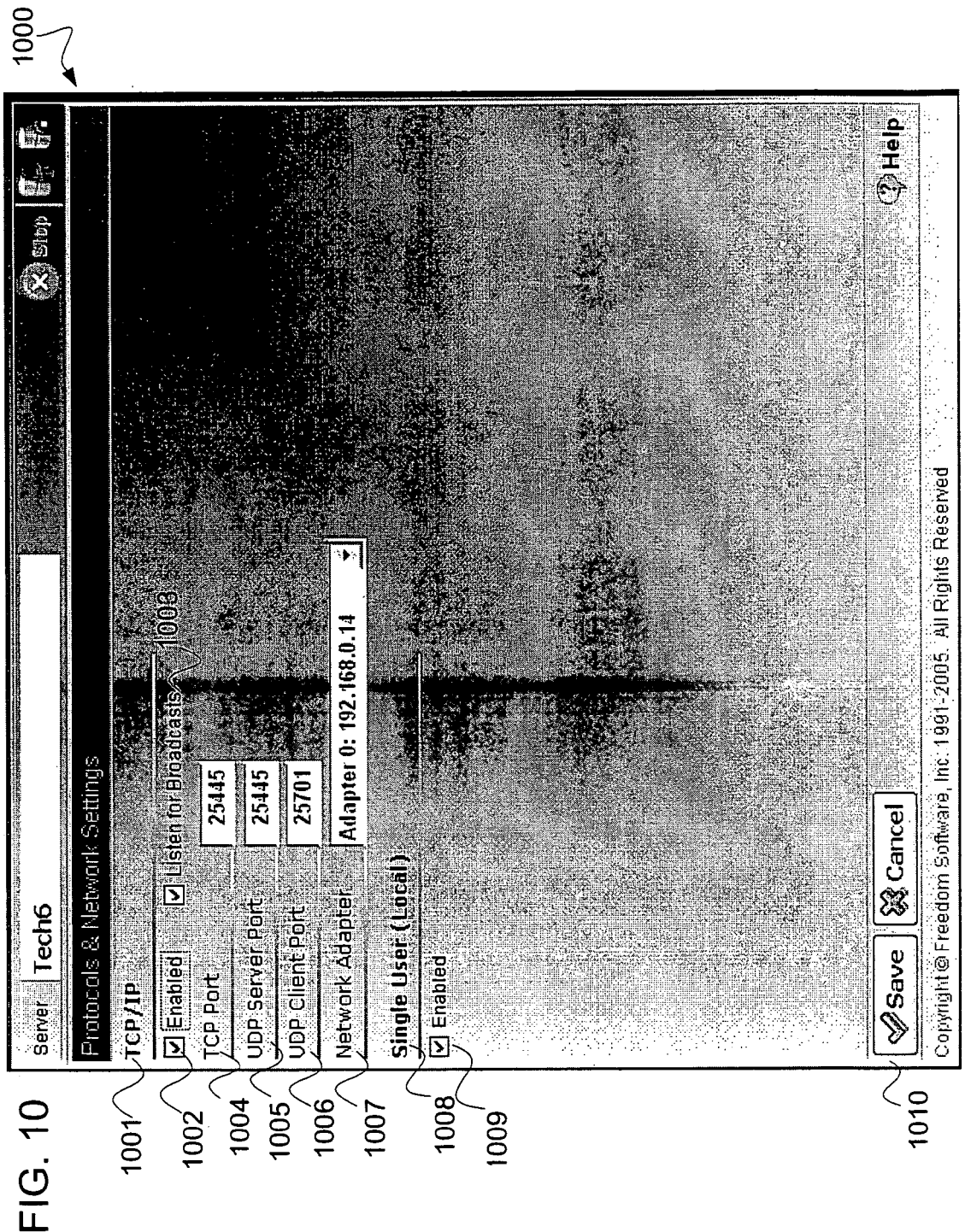
FIG. 10 is a schema depicting a protocol and settings GUI 1000 for a server.

FIG. 10 is a schema depicting a protocol and settings GUI 1000 as implemented. That is, in some embodiments, a protocols and network settings button 808 is implemented, that, when executed, opens an additional window or frame for adjusting the functionality relating to the configuration of various TCP/IP Transport Protocols. In some embodiments, various TCP/IP Transport Layers are used to transmit digital content as denoted by the TCP/IP icon 1001. In at least one embodiment, a check box 1002 is implemented to allow for various TCP/IP Transport Layers to be used to enable communication between server and client applications. Where this box is not checked, the TCP/IP Transport Layers will not be used. In still other embodiments, a check box 1003 is implemented where, when enabled, the server application will detect any client applications that ask for a list of available servers and respond to that client request with its server name and net name (i.e., IP address). In some embodiments, a text box 1004 is implemented that allows for a TCP port to be denoted for communication between the server and client application. In some embodiments, a user datagram protocol (UDP) server port is used to facilitate communication between a server and client application. A text box 1005 is used to input the name of the server-side UDP port. In still other embodiments, another UDP port is used to facilitate communication between a server and client application, by denoting the client-side port. The name of this port is entered into a text box 1006 and recorded by the server application via this text box. In some embodiments, a network adaptor is implemented using a drop down menu 1007. This drop down menu 1007 allows one, such as a server administrator, to specify the network adapter the server will use for network traffic. This is useful if the local computer system upon which the server application is running has multiple network adapters. In some embodiments, an icon 1008 is used to denote that a single local user is using the server application. In some embodiments, a check box 1009 is implemented such that when activated, the server application is locally used for single user transport. In some embodiments, buttons 1010 are provided to enable a user (e.g., a server administrator) the option to save, cancel or access the help option for the protocols and network settings window.

Figure 11:
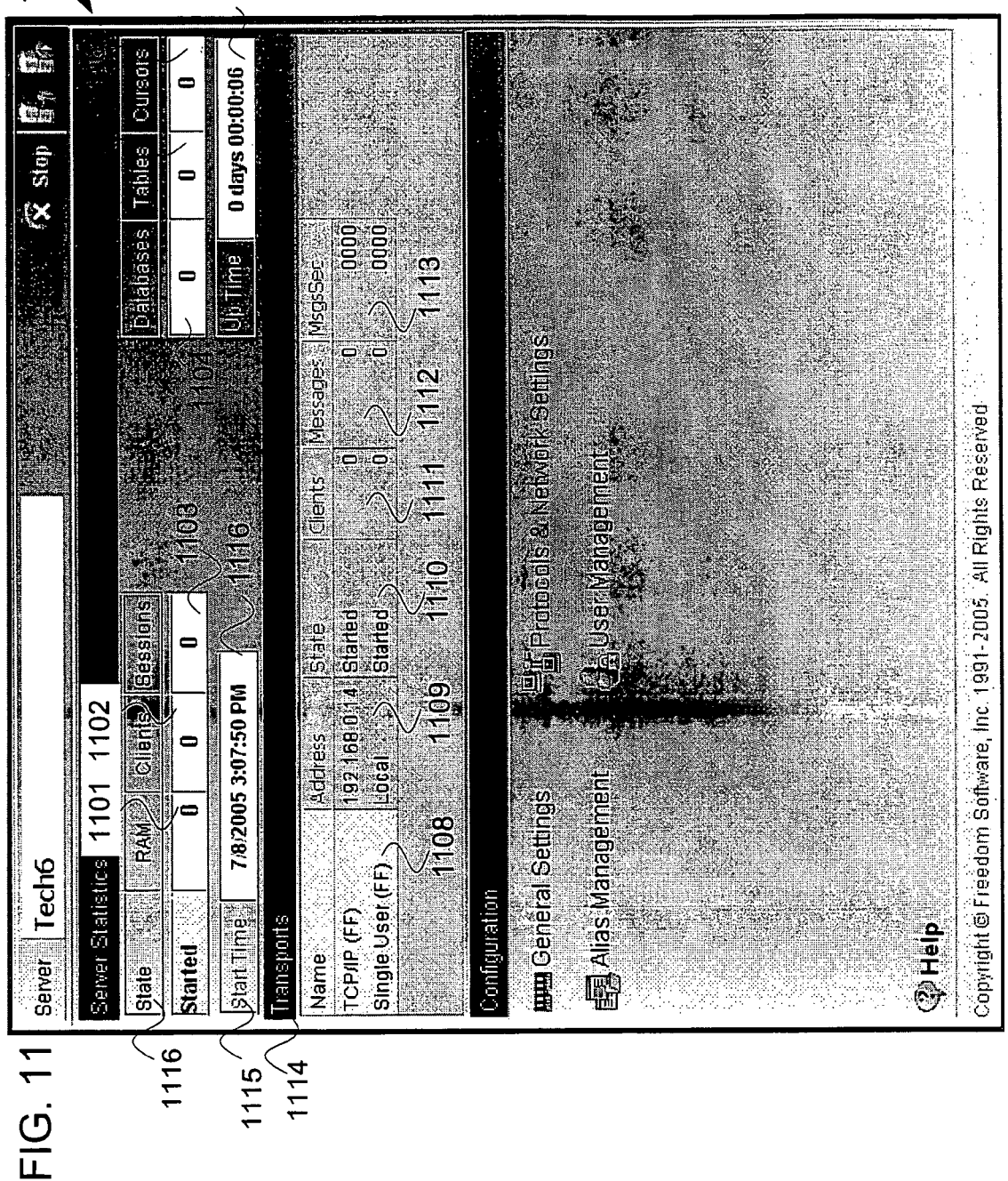
FIG. 11 is a schema depicting a server statistics GUI 1100.

FIG. 11 is a schema depicting a server statistics GUI 1100. In some embodiments, various statistics relating to various functions carried out by the server application are displayed. Specifically, this GUI is used to view the current state of the server for resources used and types of connections to the server. It also shows the time the server application was started as well as the current up time for the server application. In some embodiments, various display boxes 1101, 1102, 1103 are implemented to show the current server state for RAM (i.e., display box 1101) used as well as the number of clients (i.e., display box 1102) connected and the current session (i.e., display box 1103). In particular, display box 1101 shows the amount of RAM that is currently being used by the server's internal cache. Next, display box 1102 shows the number of clients currently connected to the server. As clients connect to the server this number increases. As clients log out this number decreases. Then, a display box 1103 is implemented to allow for the current session number to be displayed. Every time a new session is chosen from the startup options, the session number is increased by one. In at least one embodiment, a display box 1104 disclosing database information is used. This display box 1104 shows the number of databases currently open or being accessed. Then, a display box 1105 is used to show the number of database tables currently open or being accessed. Additionally, in some embodiments, a cursor 1106 shows how many cursors are active. In still other embodiments, various transport layer information 1114 is disclosed that shows the default configured transports for the current server application. In some embodiments, the names of the transports configured for the server application are displayed in a display box 1108. In at least one embodiment, the IP address for the transport configured for the server is defined, and displayed via a display box 1109. Then, in some embodiments, a display box 1110 is used to display the current state of the transport (i.e., started, stopped, or failed). In still other embodiments, a display box 1111 is used to display the number of clients connected to the server application through specified transports. Furthermore, in some embodiments, the number of messages sent is specified in a display box 1112. Moreover, in some embodiments, a display box 1113 is used to display the rate at which messages are sent through the transport connection. In some embodiments, a display box 1115 is used to denote the start time, and a second display box 1116 is used to show the time and date at which the server application was started. Additionally, an uptime display box 1107 is implemented to denote the time, in hours and days, the server application has been operating.

Figure 12:
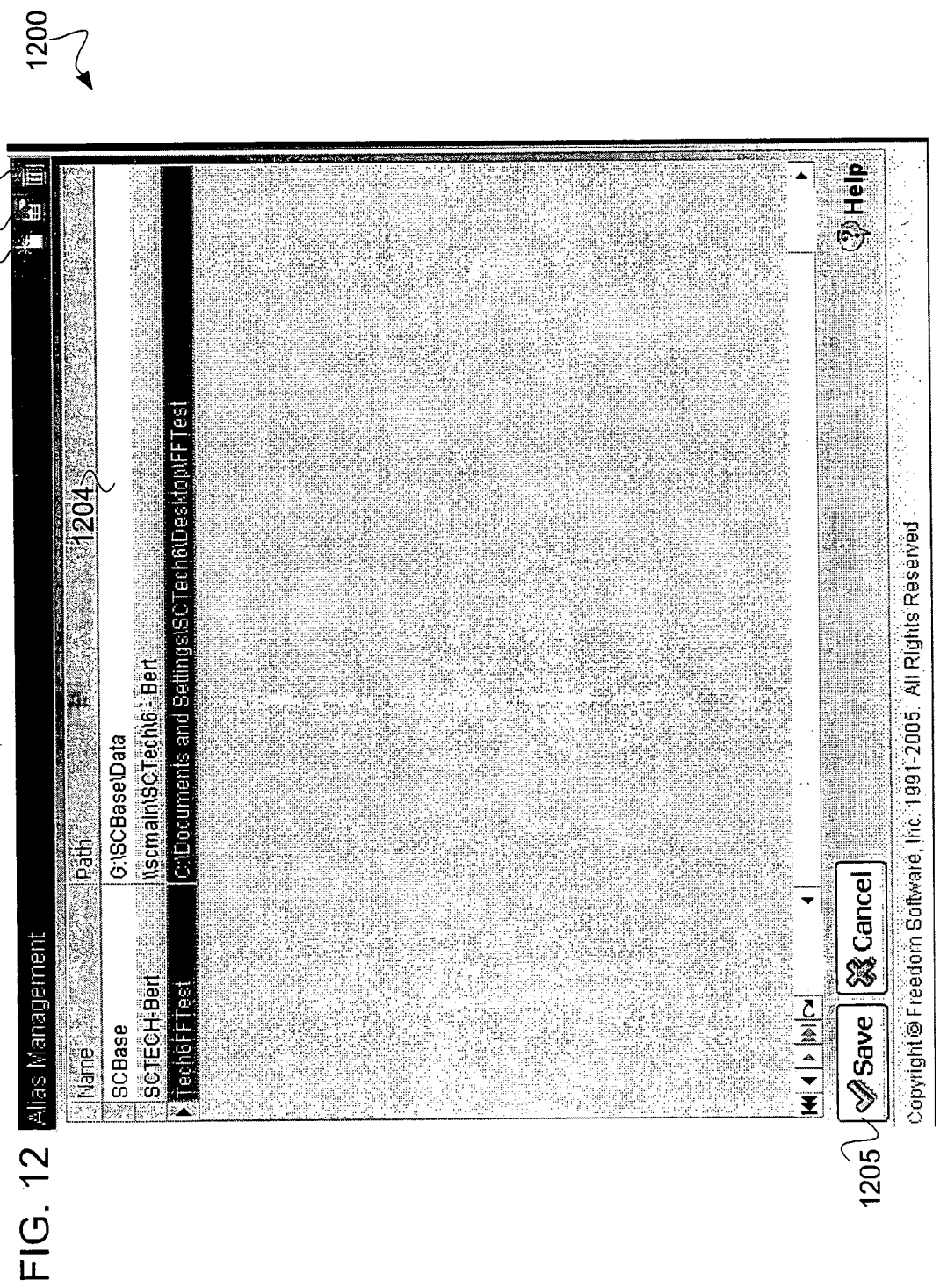
FIG. 12 is a schema of an alias management GUI 1200.

FIG. 12 is a schema of an alias management GUI 1200. In some embodiments, an alias management 809 button is implemented where, once executed, a server alias can be generated or managed. In some embodiments, a button 1201 is implemented to allow for a new window or frame to be created wherein information relating to a new alias can be entered. In some embodiments, a button 1202 is implemented that allows for alias information to be edited such that, once executed, a new frame or window is opened wherein alias information may be edited. In some embodiments, a delete alias button 1203 is implemented which, when executed, opens a window or frame for removing an alias from a list of server aliases. In at least one additional embodiment, a display box 1204 is implemented that defines a path from the alias directory to where the files are actually stored on the server. In some embodiments, various save, cancel, and help buttons (collectively referred to herein as buttons 1205) are implemented. These buttons provide a user the option of saving, canceling or accessing the help option for the alias management window or frame.

Figure 13:
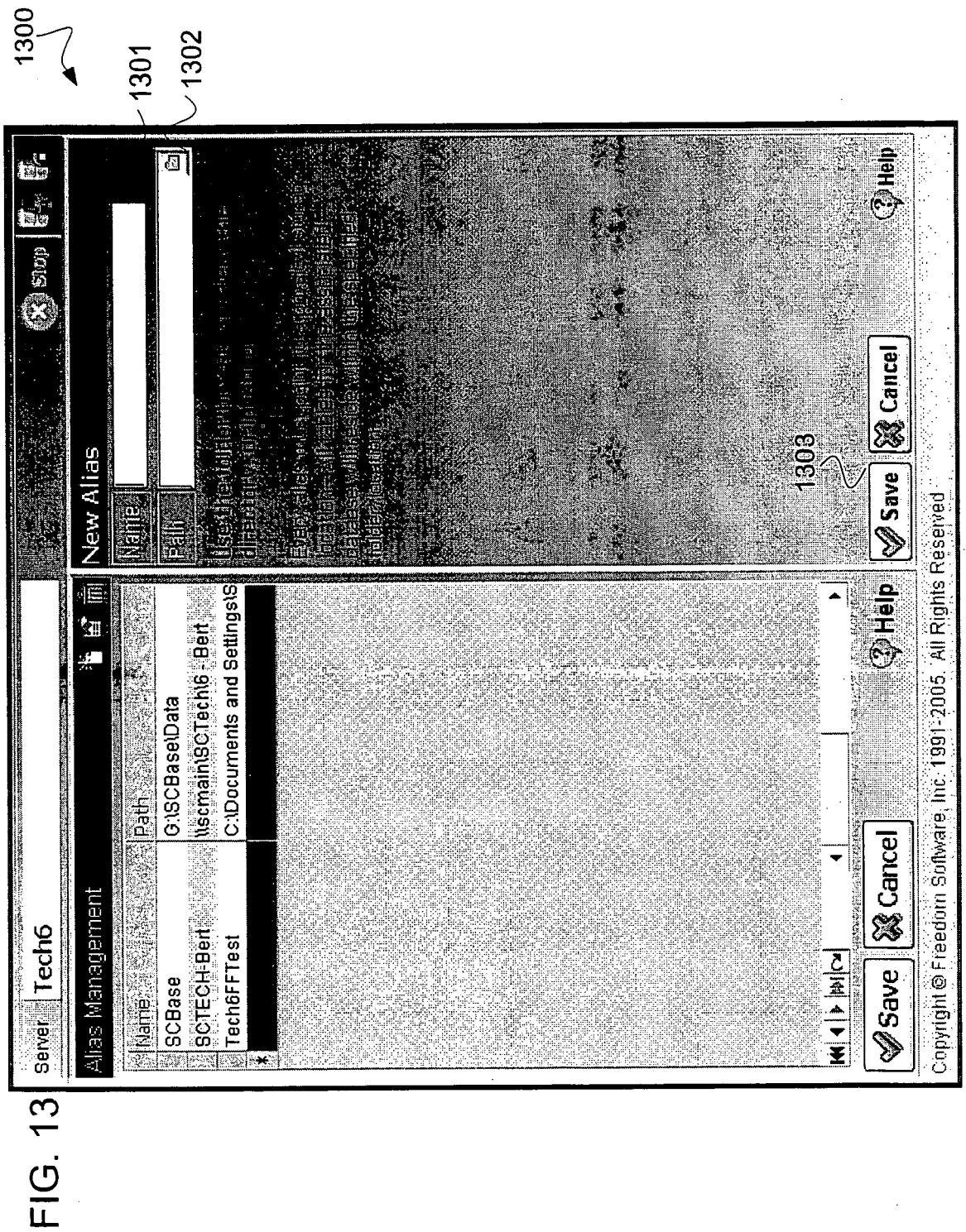
FIG. 13 is a schema of an alias management GUI 1300, and, in particular, where a button 1201 is executed and new window or frame is opened for the purpose of creating a new alias.

FIG. 13 is a schema of an alias management GUI 1300, and, in particular, where a button 1201 is executed and a new window or frame is opened for the purpose of creating a new alias. In this window, a text box 1301 is implemented to enter in the new name of a server alias. Next, a text box 1302 is implemented such that a new path for the alias to the physical storage location in memory is designated. In some embodiments, various save, cancel, and help buttons (collectively referred to herein as buttons 1303) are implemented. These buttons provide a user the option of saving, canceling or accessing the help option for the alias management window or frame.

Figure 14:
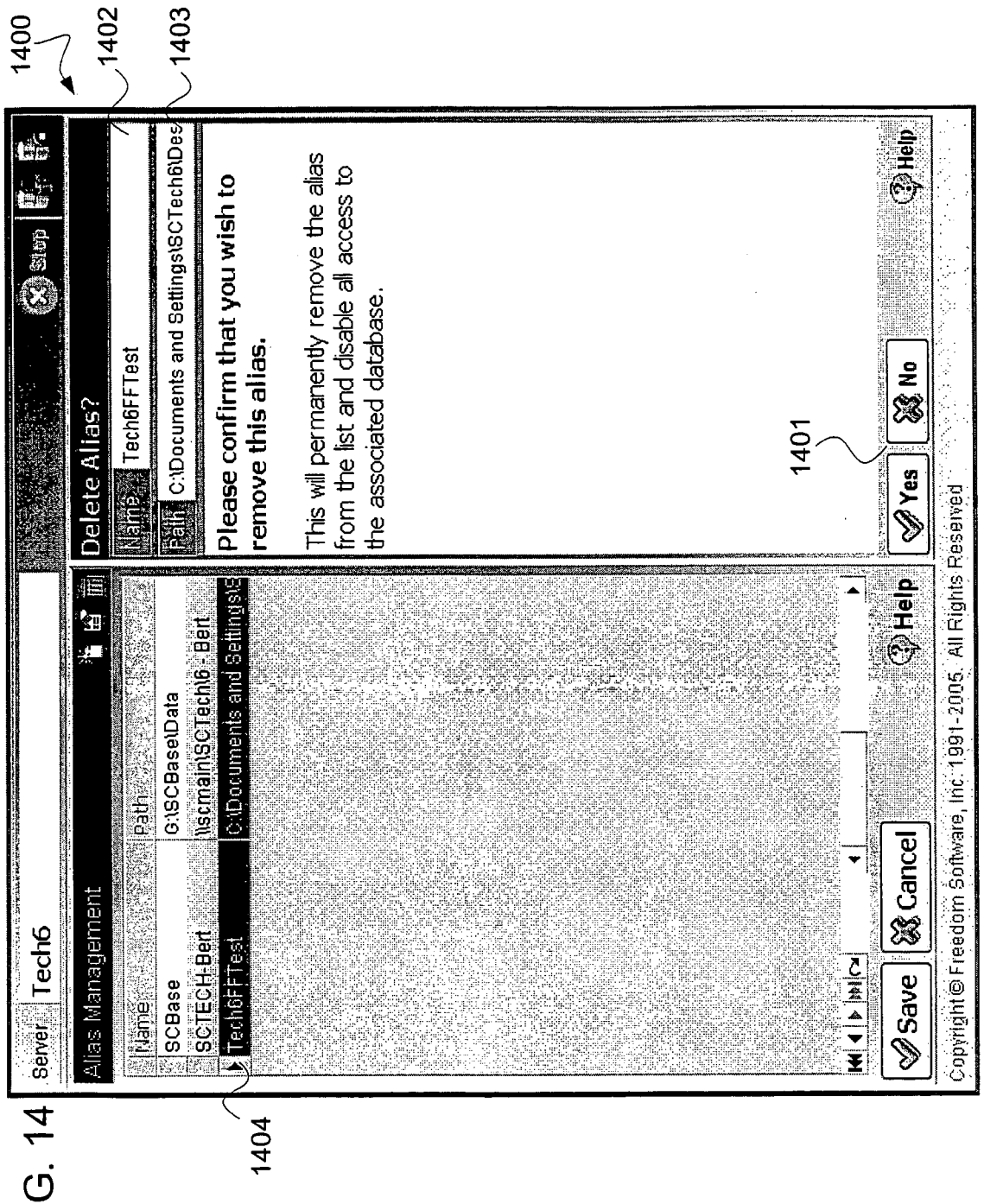
FIG. 14 is a schema of an alias management GUI 1400, and, in particular, where a button 1203 is executed and new window or frame is opened for the purpose of deleting an alias.

FIG. 14 is a schema of an alias management GUI 1400, and, in particular, where a button 1203 is executed and a new window or frame is opened for the purpose of deleting an alias. In some embodiments, various save, cancel, and help buttons (collectively referred to herein as buttons 1401) are implemented. In some embodiments, the name of the alias to be deleted is entered into a text box 1402. In at least one embodiment, the path for a particular alias is entered into a text box 1403. In still other embodiments, a particular alias name and path can be highlighted in a list, and the name and path information automatically entered into the above disclosed text boxes 1402 and 1403.

Figure 15:
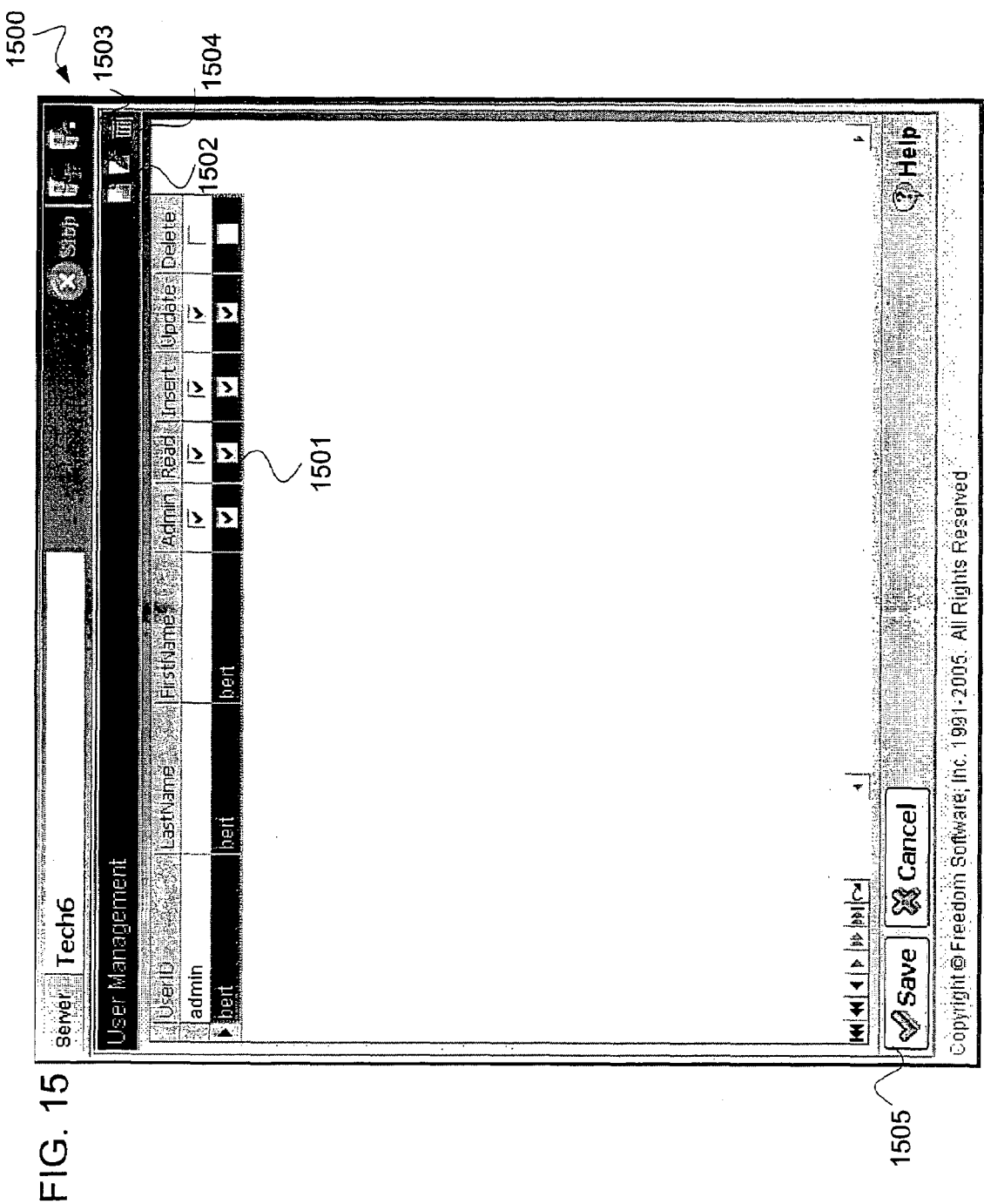
FIG. 15 is a schema of a user management GUI 1500, and, in particular, where a button 810 is executed and new window or frame is opened for the purpose of setting privileges (e.g., admin, read, insert, update, or delete) via various check boxes 1501.

FIG. 15 is a schema of a user management GUI 1500, and, in particular, where a button 810 is executed and a new window or frame is opened for the purpose of setting user privileges (e.g., admin, read, insert, update, or delete) via various check boxes 1501. Additionally displayed in this GUI 1500 is information relating to UserID, LastName, and FirstName. A button 1502 is displayed that, when executed, opens a new window or frame for the purpose of adding a new user. Furthermore, in some embodiments, a button 1504 is implemented for editing the user information for an existing user. In at least one embodiment, a button 1503 is implemented for deleting user information. In some embodiments, various save, cancel, and help buttons (collectively referred to herein as buttons 1505) are implemented.

Figure 16:
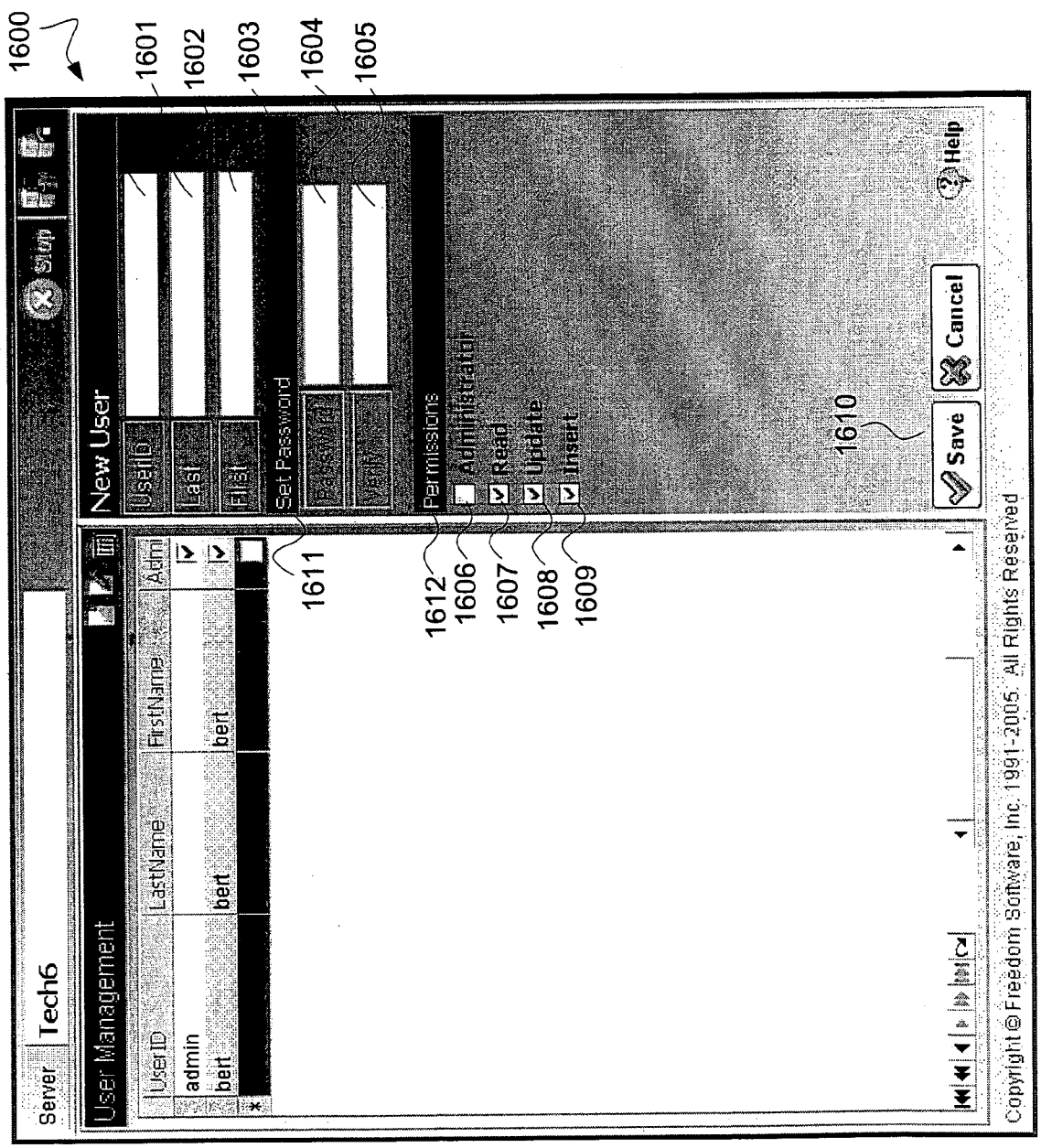
FIG. 16 is a schema of a user management GUI 1600, wherein new user information can be inputted.

FIG. 16 is a schema of a user management GUI 1600, wherein new user information can be inputted. In some embodiments, a button 1502 is executed wherein a window or frame is opened to allow for new user information to be entered into the server application. In this new window a text box 1601 is used to enter the new UserID. In some embodiments, a text box 1602 is implemented to allow a user to enter a Last user name. In at least one embodiment, a text box 1603 is implemented to allow a user to enter a First user name. In some embodiments, a Password 1604 may be set via a text box for a new user. Furthermore, in some embodiments, a text box 1605 is implemented to allow for the verification of the previously entered Password. In some embodiments, various check boxes are used to set a user's permissions (i.e., denoted by a permissions 1612 icon) in the system (e.g., administrator 1606, read 1607, update 1608, insert 1609). In some embodiments, various save, cancel, and help buttons (collectively referred to herein as buttons 1505) are implemented.

Figure 17:
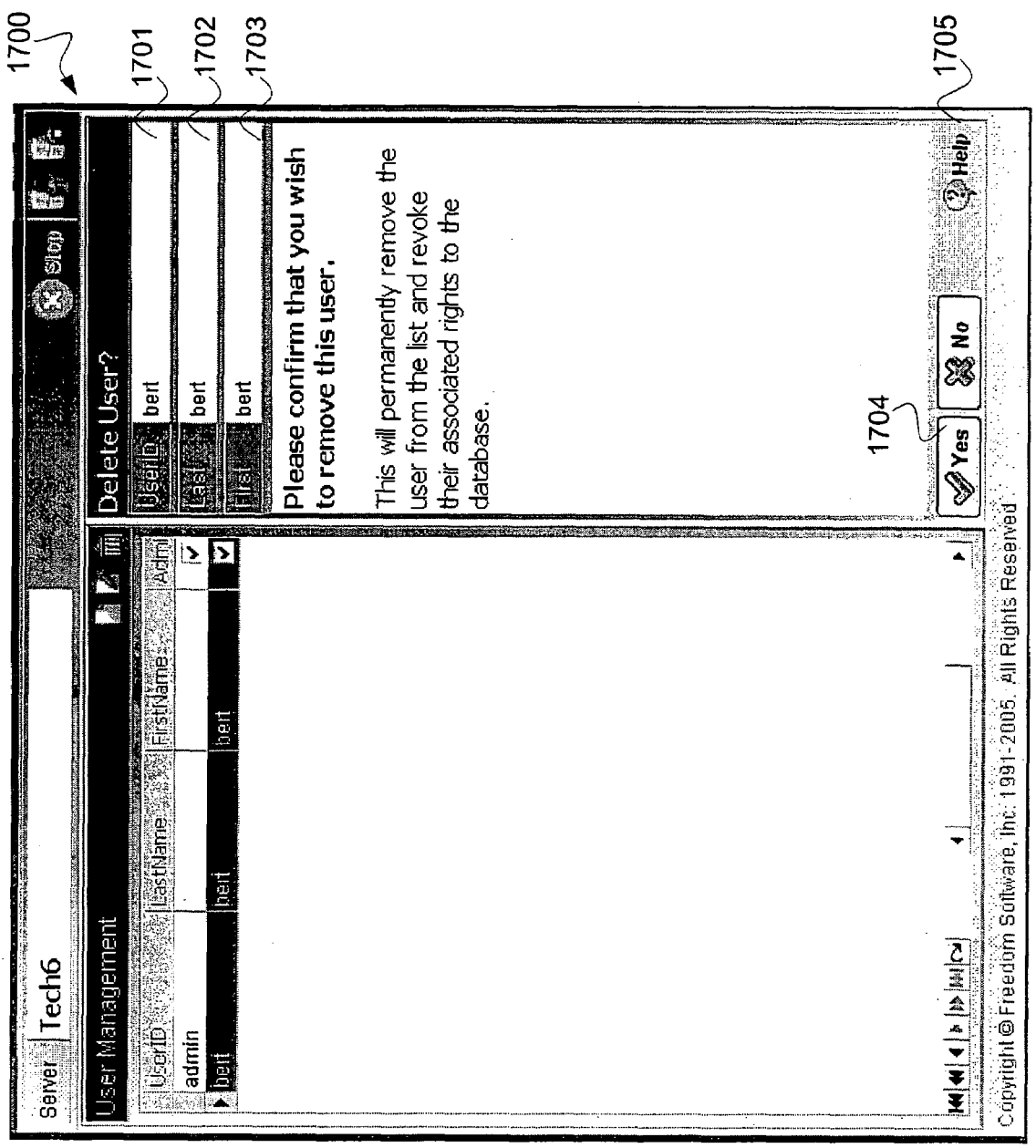
FIG. 17 is a schema of a user management GUI 1700, wherein user information to be deleted can be inputted.

FIG. 17 is a schema of a user management GUI 1700, wherein user information to be deleted can be inputted. In some embodiments, a button 1503 is executed wherein a window or frame is opened to allow for user information to be deleted from the server application. In some embodiments, a text box 1701 is implemented to allow for a UserID to be deleted. Then, in some embodiments, a text box 1702 is implemented to allow for the last name of a user to be deleted. Additionally, in some embodiments, a first name is entered into a text box 1703 to provide information to be deleted. Yes and no buttons (collectively referenced as buttons 1704) are used to execute the deletion of the entered UserID, Last and First names. Additionally, a help button 1705 is also implemented.

A Logic Level for the Server Application

In some embodiments, various modules of compiled or interpreted computer code are implemented in one of the above mentioned languages (collectively known as "Core Modules"). These Core Modules perform a variety of different functions.

Figure 18:
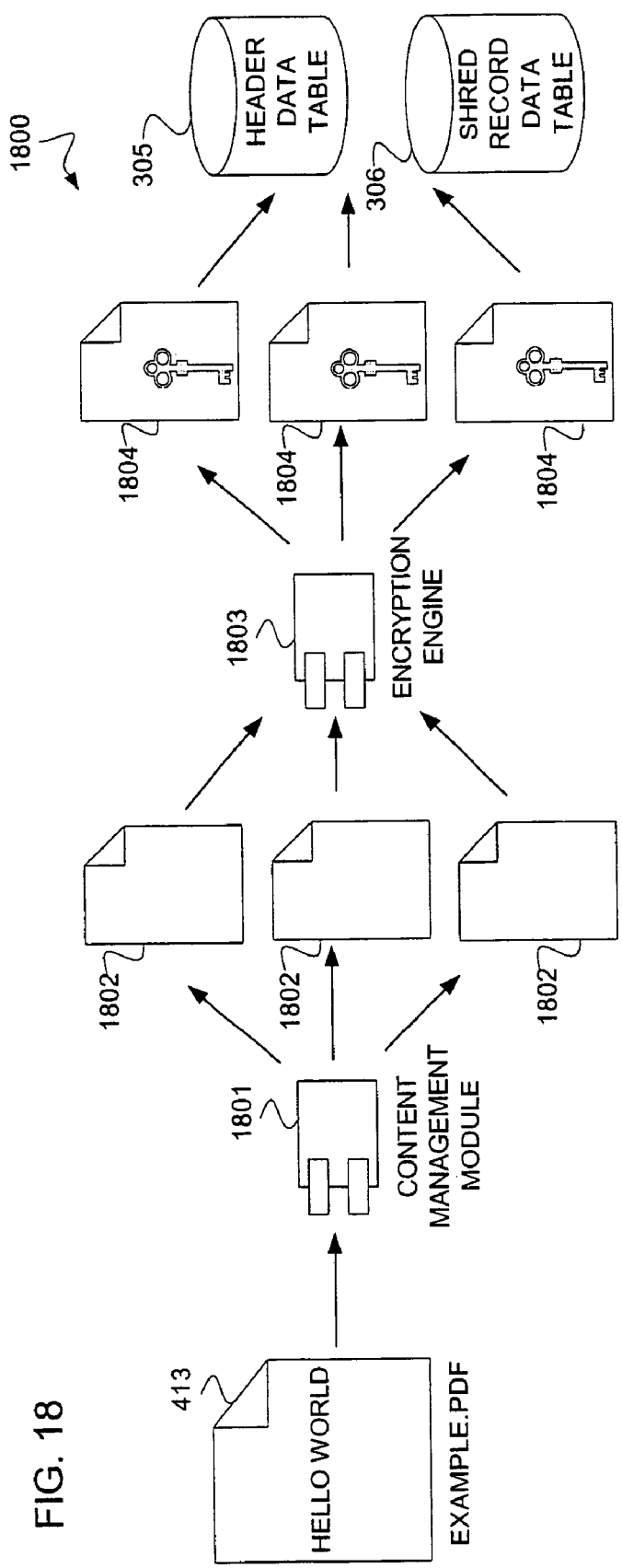
FIG. 18 is an application-level schematic of the shredding, encryption and storage process 1800 utilizing the Content Management Module 1801, and the encryption module or engine 1803.

FIG. 18 is an application-level schematic of the shredding, encryption and storage process 1800 utilizing the Content Management Module, and the encryption module or engine. In this schematic, a piece of digital content in the form of a file titled EXAMPLE.PDF 413 is processed by a Content Management Module 1801, and shredded into three pieces of content 1802. This Content Management Module 1801 implements one of the above described shredding algorithms.

These three pieces are then processed by an Encryption Engine 903, and encrypted into three shredded, encrypted pieces of content 904. This Encryption Engine 903 implements one the below described encryption algorithms. These three pieces of shredded, encrypted content are then stored into the Header Data Table 305 and the Shred Record Data Table 306.

In some embodiments, the Content Management Module takes a piece of digital content in the form of a GIF, TXT, PDF, DOC, MPEG, JPEG, MP3, WAV, AAC or other file and associated format known in the art, and shreds or breaks apart this file into smaller pieces. In some embodiments, the size into which the file is broken (i.e., the shred size) is predetermined, whereas in other embodiments this shred size can be set manually at the server application level. In some embodiments, the shred size will be based upon the requirements of the client application. Once the shred size is determined, the digital content is shredded as is described above. This module, in some embodiments, also allows for the management of the digital rights associated with a piece of content as is described above. In some embodiments, the server application takes digital content and shreds, and stores this digital content, while in other embodiments it is the client application that performs these tasks. One advantage of shredding this digital content is to make it less susceptible to individuals trying to gain unauthorized access, for rather than being able to access all of the content at once as a file, a person seeking unauthorized access can only gain access to a portion or part of the file. Once shredded, this digital content is then encrypted using an Encryption Engine 903 implementing one of the encryption algorithms described below.

In some embodiments, an Encryption Engine 903 is implemented. This engine is responsible for encrypting and decrypting messages and data sent between the client and the server. In some embodiments, the engine implements a symmetric key algorithm, whereas in other embodiments it implements an asymmetric key algorithm. These are also known in the art respectively as un-tethered and tethered systems of encryption. In some embodiments, the symmetric algorithm implements the Advanced Encryption Standard (AES). (See *The Design of Rijndael: AES—The Advanced Encryption Standard*, by Joan Daemen & Vincent Rijmen, Springer-Verlag, 2002.) AES can use key sizes of 128, 192, or 256 bits. The usefulness of a particular key size can be determined through empirical testing and/or modeling. In some embodiments, the key size is automatically determined by the Encryption Engine 903 based upon some type of preset size. In still other embodiments, the key size is selected by the user to meet their particular needs. In some embodiments, an interface exists between the Encryption Engine 903 and a database application (see below) such that different Encryption Engines and accompanying algorithms (e.g., AES, Triple-DES, IDEA, or Blowfish just to name a few) can be swapped out or used so as to provide a variety of options for the type of encryption protections that may be offered.

In some embodiments, each compiled instance of the server can have an embedded key (i.e., unique, multi-bit code and key combination). Once the key value is generated, it is a private key only known and shared between a particular server and client application. In some embodiments, this private key is itself encrypted, while in other embodiments it is not. In some embodiments, a hash function is used to protect the private key value, in still other embodiments various programming techniques, known in the art, are used to protect the private key value. (See Cryptography: Theory and Practice, 2nd Edition, by Douglas Stinson, Chapman & Hall/CRC, 2002.) In some embodiments, the embedded key has a key size of 128 bits. The actual key size used can be determined, in some embodiments, through empirical testing and/or modeling.

In some embodiments, the embedded key used at both the client and the server side must be the same so as to verify the identity of the client and/or server. In some embodiments, once the identity of the client and/or server is verified, the proper Encryption Engine 903 can be determined for the purpose of encryption or decryption of digital content. This Encryption Engine 903, in some embodiments, contains a table of private key values to be used to decrypt or encrypt the content.

In some embodiments, each individual piece of shredded, encrypted content (Content) is encrypted with a separate private key, and tracked by an Encryption Engine 903 possessing a table of key values. In some embodiments, a hash function is used to protect or obscure a private key value. In still other embodiments, various programming techniques are used to protect or obscure the private key value. In some embodiments, a separate protected key is transported with each piece of Content. In some embodiments, the database table into which the Content is stored is itself encrypted with another private key. In some embodiments, 128-bit encryption is used to protect the Content and the database tables. The actual key size used can be determined, in some embodiments, through empirical testing and/or modeling.

Figure 19:
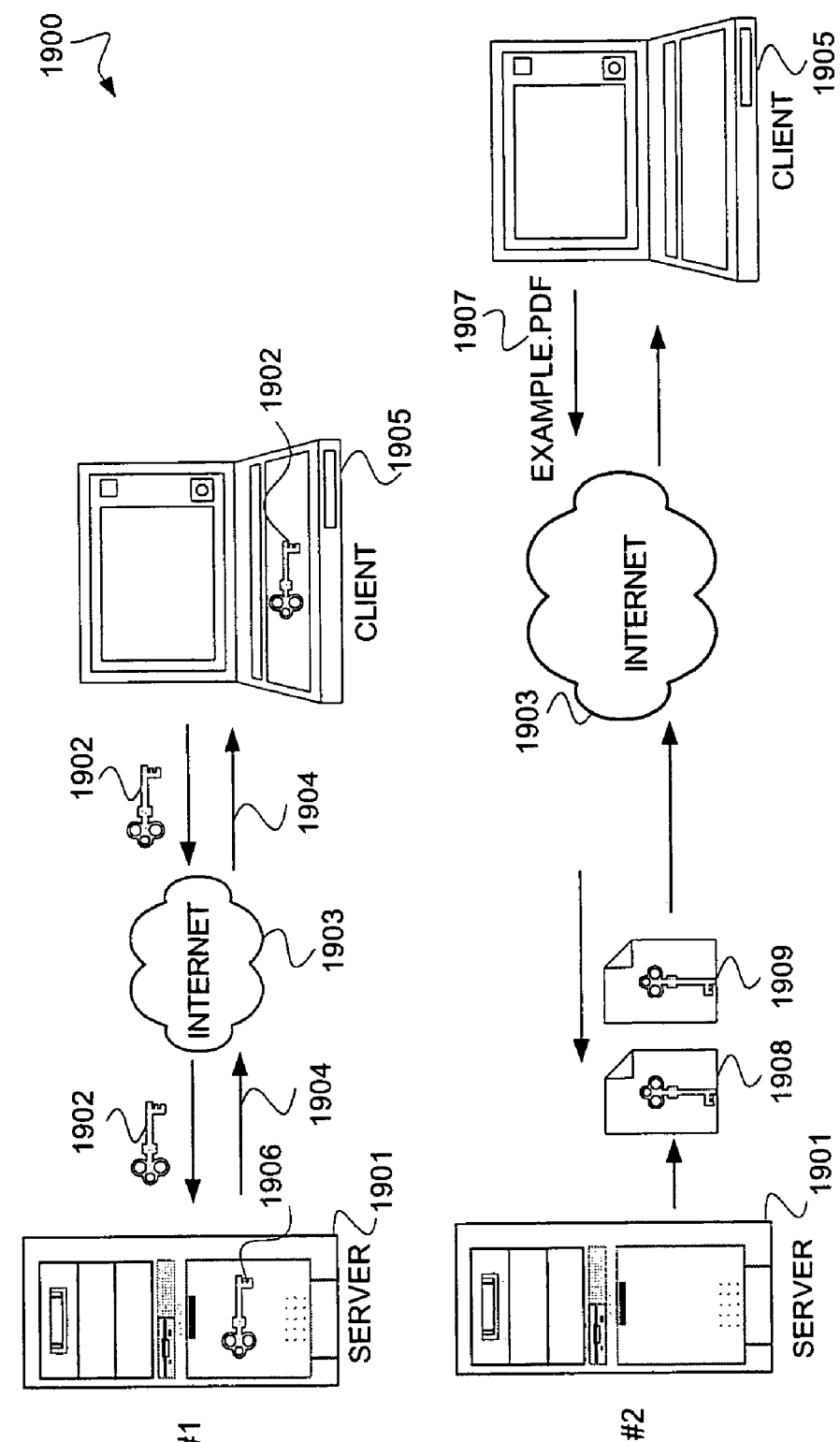
FIG. 19 is a schematic of an un-tethered system 1900 of encryption.

FIG. 19 is a schematic of an un-tethered system 1900 of encryption. First, a Step #1 is implemented whereby a client 1905 log onto an internet 1903 and connects to a server 1901. The server 1901 requests that the client 1905 provide a copy of its embedded private key 1902 to verify its identity. This embedded private key 1902 is transmitted to the server 1901 via an internet 1903, and compared against the embedded private key 1906 of the server 1901. Once a correspondence of values between the client 1905 private key 1902 and the private key 1906 of the server is verified, a Step #2 is executed. In Step #2, a client 1905 makes a request for Content 1907. In the present example, the client 1905 makes a request for a file titled EXAMPLE.PDF. This request is transmitted via an internet 1903. Once received by the server 1901, the Content corresponding to the request is transmitted to the client 1905 via the same internet 1903. In the present example, two pieces of Content 1908 and 1909 are transmitted.

Figure 20:
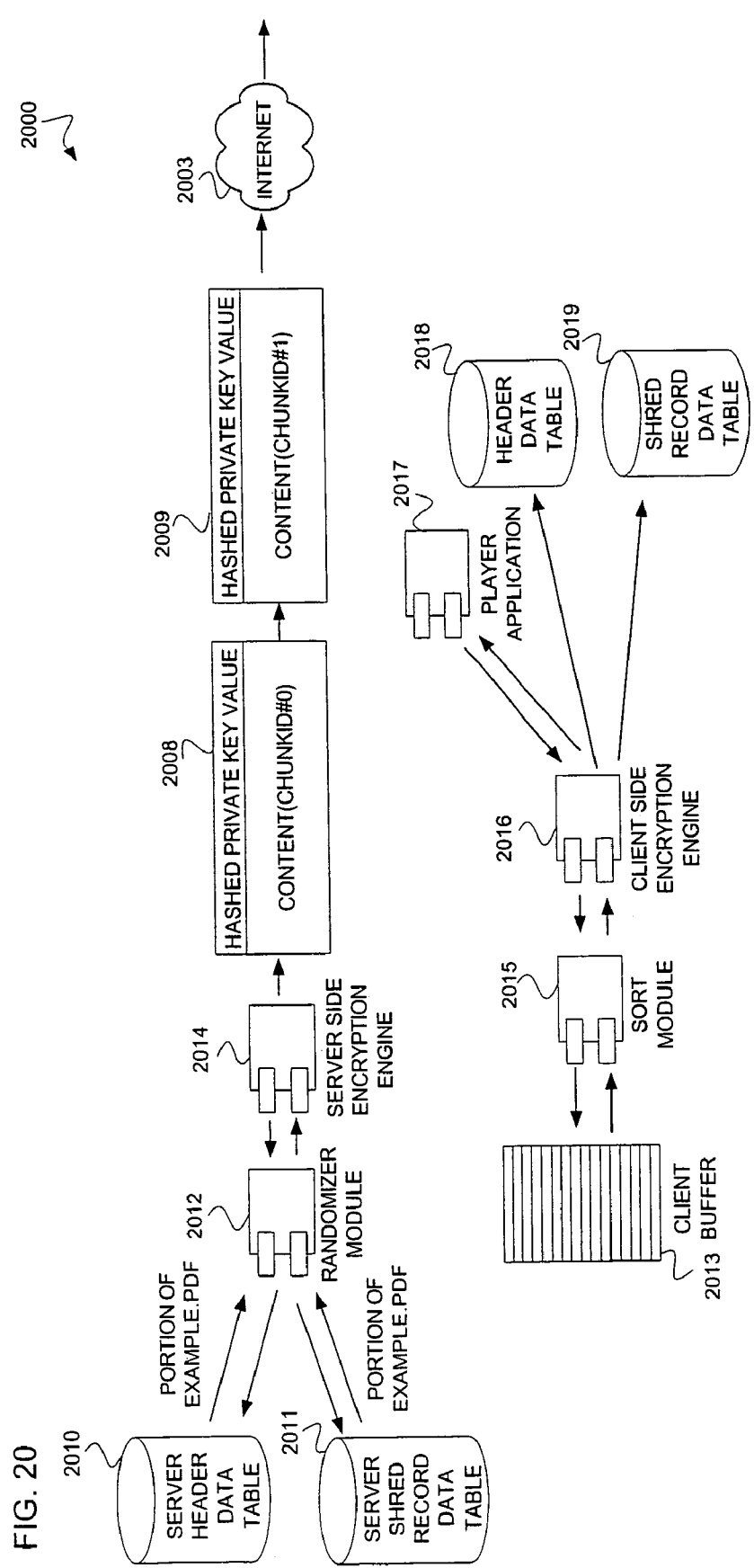
FIG. 20 is an application-level schematic of the untethered system 2000 and in particular the sending portion of the system.

FIG. 20 is a schematic providing an application-level view of the un-tethered system 2000 and in particular the sending portion of the system (i.e., the above disclosed Step #2). In FIG. 20, various applications and code modules are disclosed that are utilized in the sending of Content to a client 2005 from a server 2001. In this system, portions of the requested Content are retrieved in a random order using a Randomizer Module 2012. Randomizer modules (i.e., modules of computer code that randomly generate numeric values to be used in performing specific tasks) are well known in the art. (See *Java: How to Program* $3^{rd}$ *Edition*, by H. M. Deitel & P. J. Deitel, Prentice Hall, 1999.) The Randomizer Module 2012 makes calls to the database tables (i.e., 2020, 2011) using a specific FileID 401 (e.g., 1) value and a randomly generated numeric value (e.g., 1 or 0) corresponding to a ChunkID 414 value, and retrieves an individual record corresponding to this FileID 401 and the ChunkID 414 value. In some embodiments, an entire set of records is retrieved by the randomizer, stored to a server-side buffer, and individual records are randomly extracted from this set and transmitted to a client computer system. This individual record is then sent a server-side Encryption Engine 2014 where its corresponding private key value is hashed, encrypted with a further private key, or obscured in some manner known in the art. In the present example, the private value is hashed. In some embodiments, the private key is passed through a series of functions that hide its value. This process continues until all the records containing a FileID 401 are processed by the Randomizer Module 2012. Once hashed, the records 2008 and 2008 are sent via an internet 2003 to a client buffer 2013. Once in the client buffer 2013, the records are sorted by the ChunkID 414 values in a descending or ascending order by a Sort Module 2015. In some embodiments, the records are sent in a sequential order such that no sorting is required. Once sorted, in some embodiments, the Content 409 is sent to a client-side Encryption Engine 2016 that decrypts the Content 409 and sends it as reassembled, decrypted digital content to a player application 2017, or to either a Header Data table 2018, or Shred Record Data table 2019. In some embodiments, decryption occurs prior to reassembly in a client buffer 2013. In some embodiments, the decryption and reassembly process in a client buffer 2013 is as described above in the section titled: Reassembly of Shredded, Encrypted and Stored Digital Content from a Database. In those instances where the digital content is sent to either of the two data tables 2018 or 2019, the digital content is re-encrypted, assigned new FileID 401 and ChunkID 414 values based upon a setting specific to the client 2005. In some embodiments, this digital content may be re-shredded prior to re-encryption to meet the needs of the client 2005, or a specific application or device.

While, in some embodiments, an un-tethered system of encryption is implemented, it is possible that a tethered system or asymmetric encryption algorithm and supporting system could be implemented. Asymmetric encryption algorithms and techniques are well known in the art. (See *RSA & Public Key Cryptography*, by Richard A. Mollin, CRC Press, 2002.) These types of encryption algorithms and techniques differ from un-tethered or symmetric encryption algorithms and techniques in that the tethered or asymmetric system utilizes a public and private key (i.e., a key pair) to encrypt and decrypt digital content. By contrast, the un-tethered system only uses a single private key. A further difference is that in many cases, a third party is used to verify the validity of the public key and private key pairs during the course of encryption. This reliance on a third party gives rise to the description of the asymmetric system as a tethered system. Some well known asymmetric encryption algorithms include RSA, and Diffie-Hellman, just to name a few.

In some embodiments, a tethered, asymmetric system of encryption is implemented. In such a system, the identity of a client application or device is verified by exchanging the embedded private keys between the server and client applications. Once the identity of the client is verified, the client device generates a public key/private key pair, and sends the public key to the server application to be used to encrypt the digital content that has been requested. In some embodiments, multiple public key/private key pairs are generated, one for each piece of shredded digital content or record (e.g., records 411, 419, and 420). In some embodiments, the embedded key of the client application or device is used to re-encrypt each piece of digital content, and a second layer of encryption protection is added in the form of one or more public keys provided by the client application or device. After the digital content is encrypted with the public key, it is sent to the client application, where it is received, decrypted with the private key and played, viewed or otherwise utilized.

Figure 21:
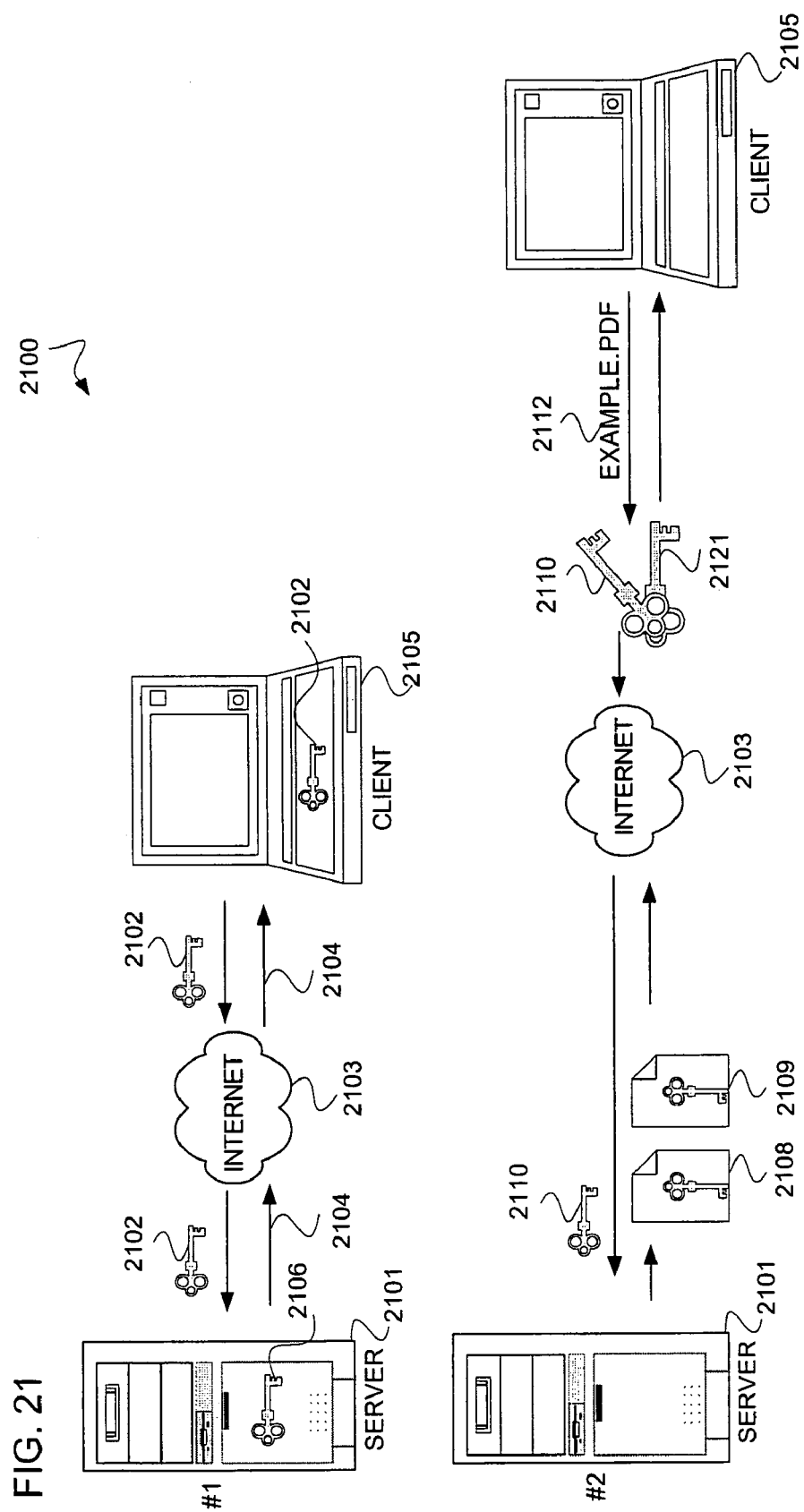
FIG. 21 is a schematic of a tethered system 2100 of encryption.

FIG. 21 is a schematic of a tethered system 2100 of encryption. In some embodiments, a first step (i.e., Step #1) is executed whereby the identity of a client 2105 is validated through the client 2105 sending a copy of its embedded private key 2102 to a server 2101 via an internet 2103. This private key 2102 is compared against the private key 2106 of the server 2101. The identity of the client 2105 is verified where the two private key values (i.e., 2102 & 2106) match. Next, a second step (i.e., Step #2) is executed whereby the client 2105 generates a public key 2110/private key 2121 pair. The public key 2110 is sent to the server 2101 along with a Content request 2112 via an internet 2103, while the private key is maintained by the client application 2105. Once the server 2101 receives this public key 2110 it is free to encrypt portions (e.g., 2108, 2109) of the requested Content with this public key 2110 and send it via an internet 2103 to the client 2105. Once received by the client 2105, the Content 2108, 2109 will be decrypted using the private key 2121. In some embodiments, multiple private key 2110 and public key 2121 pairs are generated, one for each piece of Content into which the requested file has been divided.

Figure 22:
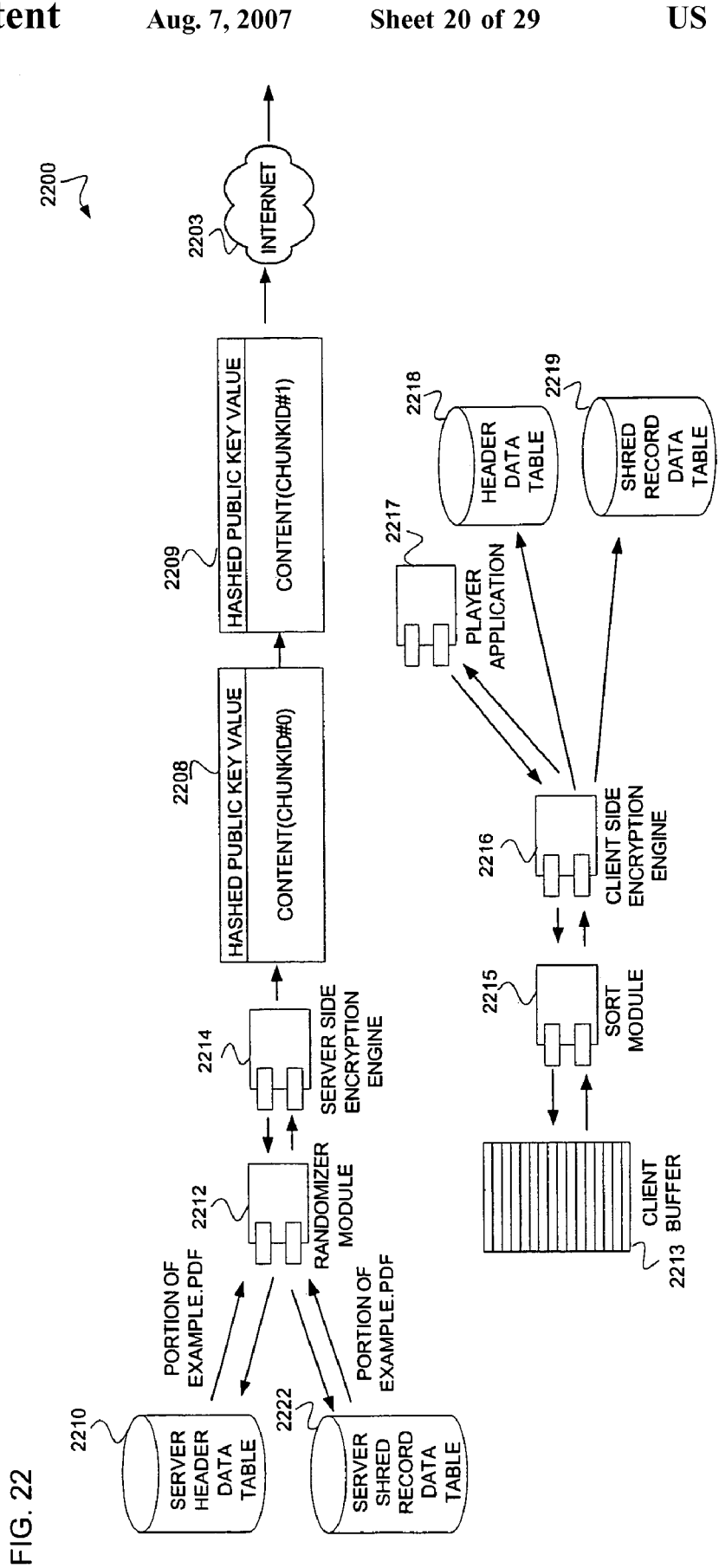
FIG. 22 is a schematic providing an application-level view of the tethered system 2200 and in particular the sending portion of the system.

FIG. 22 is a schematic providing an application-level view of the tethered system 2200 and in particular the sending portion of the system (i.e., the above disclosed Step #2). In FIG. 22, various applications and code modules are disclosed that are utilized in the sending of Content to a client 2105 from a server 2101. In this system, portions of the requested Content are retrieved in a random order using a Randomizer Module 2212. The Randomizer Module 2212 makes calls to the database tables (i.e., 2210, 2222) using the FileID 401 and retrieves the set of records that possess the FileID 401. In some embodiments, the records are individually retrieved by the Randomizer Module 2212 as opposed to being retrieved as a set of records. In some embodiments, the individual records or set of records is stored into a server-side buffer prior to transmission. The Randomizer Module 2212 then generates random numeric values and sends individual records from this set based upon a correspondence between the randomly generated value and ChunkID 414 value. These randomized records are then sent to a server side Encryption Engine 2214 where their corresponding public key values are hashed, encrypted with a further public key, or obscured as is known in the art. In the present example the public key value is hashed. Once hashed, the records 2208 and 2209 are sent via an internet 2203 to a client buffer 2213. Once in the client buffer 2213, the records are sorted by the ChunkID 414 values in a descending or ascending order by a Sort Module 2215. Once sorted, the Content portion of the record is sent to a client-side Encryption Engine 2216 that decrypts the Content and sends it to a player application 2217, or to either a Header Data table 2218, or Shred Record Data table 2219. In some embodiments, the records contained in the client buffer 2213 are decrypted prior to being placed into the buffer. In some embodiments, the decryption and reassembly process in a client buffer 2213 is as described above in the section titled: Reassembly of Shredded, Encrypted and Stored Digital Content from a Database. In those instances where the digital content is sent to either of the two data tables, the shredded, unencrypted content is re-encrypted, assigned new FileID 401 and ChunkID 414 values specific to the client 2105. In some embodiments, this digital content may be re-shredded prior to re-encryption to meet the needs of a specific application or device.

Figure 23:
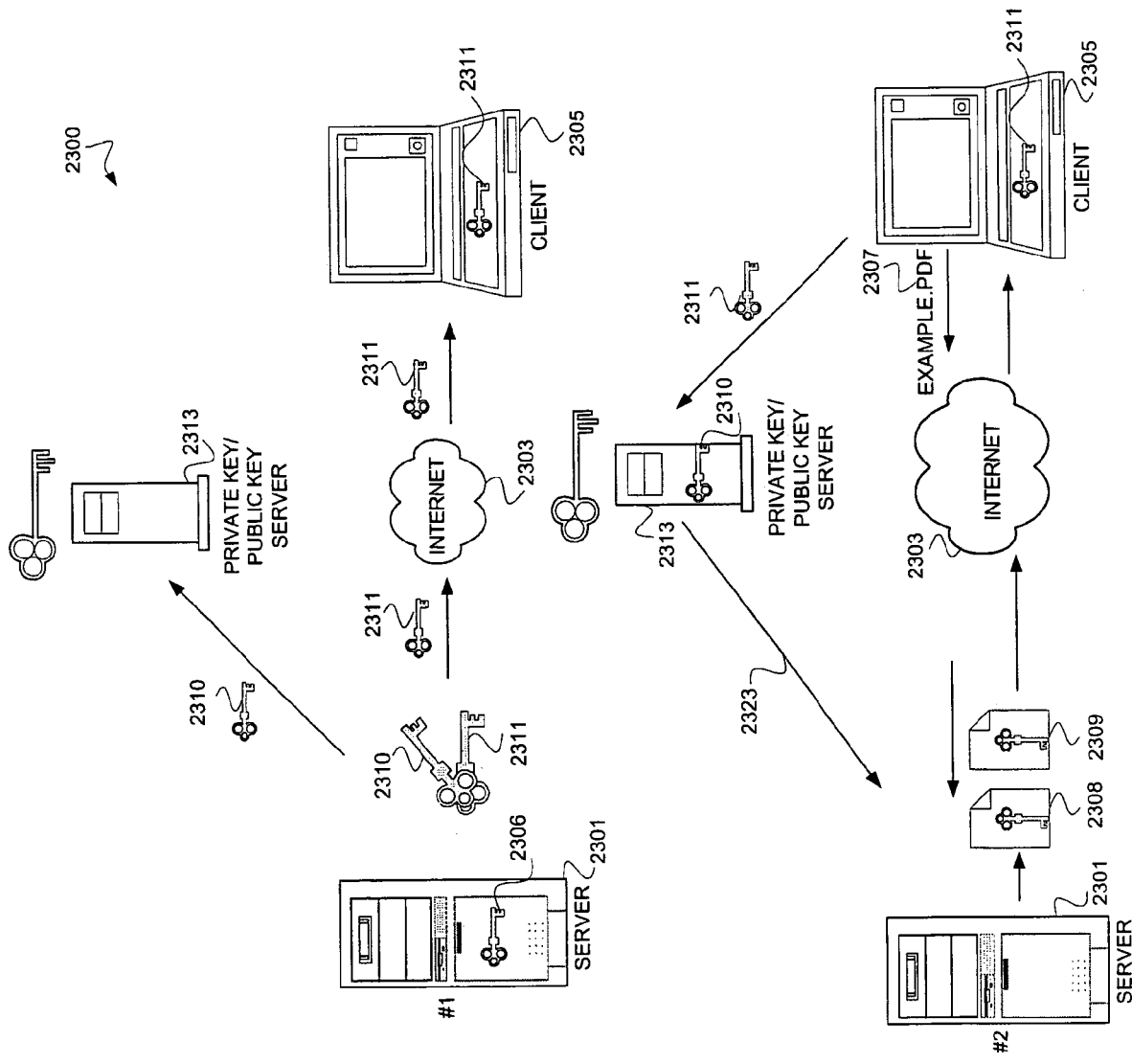
FIG. 23 depicts a Hybrid-Crypto system 2300 that employs both asymmetric and symmetric encryption techniques.

In some embodiments, a Hybrid-Crypto system, as shown in FIG. 23, could be implemented using the above described asymmetric and symmetric encryption techniques. In some embodiments, a tethered system could be implemented whereby a separate public key/private key server could be implemented to verify the identity of a client application or device. In such a tethered system, the Content generated using the above described shredding and encryption techniques would be signed with a public key used by a client, but provided to the client by a server application or device. This public key or signature would be verified by a third-party server by comparing it to a private key value. Once the identity of the client application or device was verified, the encrypted Content would be sent to this client application or device as determined by a URL or other means of identifying the client application or device. The advantage of such a tethered system is that it provides for client verification that is not based upon an embedded key specific to a client and/or server application or device, whose value, once discovered, negates the usefulness of the client and/or server application.

FIG. 23 depicts a Hybrid-Crypto system 2300 that employs both asymmetric and symmetric encryption techniques. In this system, a client 2305 is supplied a public key of a public key 2311/private key 2310 pair generated by a server 2301 (i.e., Step #1). The public key 2311 is supplied via an internet 2303 to a client 2305. At the same time, the private key is sent to a public key/private key server 2313. At some later point in time, a client 2305 requests Content from the server 2301 by first verifying its identity to the public key/private key server 2313 by providing the public key 2311 to this server 2313. Once the identity of the client 2305 is verified, a message 2323 is sent to the server 2301 that the identity of the client 2305 has been verified. The client 2305 then makes a Content request 2307 via an internet 2303, and pieces of Content 2308 and 2309 are supplied to the client 2305 by the server 2301 via the same internet 2303 (i.e., Step #2). The actual decryption of the private symmetric keys associated with each piece of Content 2308 and 2309 is as described above.

In some embodiments, the aforementioned RSA asymmetric encryption algorithm can use key sizes of 128, 192, or 256 bits. The usefulness of a particular key size can be determined through empirical testing and/or modeling. In some embodiments, the key size is automatically determined by the Encryption Engine (e.g., 903, 2214, 2216) based upon some type of preset size. In still other embodiments, the key size is selected by the user to meet their particular needs. In some embodiments, an interface exists between the Encryption Engine and a database application such that different Encryption Engines and accompanying algorithms can be swapped out or used so as to provide a variety of options for the type of encryption protections that may be offered.

In some embodiments, a session management module is implemented. In some embodiments, this module records server uptime and statistics for specific data items and service usage metrics. In some embodiments, this information is saved in a specific table and available for reporting to client applications and services. In some embodiments, various types of search and batch report functions are available to retrieve information relating to service usage metrics such as memory, processor, or bandwidth use just to name a few. Similarly, in some embodiments, a batch report relating to individual customer usage of bandwidth and digital content, including the number of files that have been shredded and encrypted, can be generated. In some embodiments, these reports and the data reported therein will be date and time stamped. In some embodiments, these reports can be displayed using a text editor such as Microsoft Notepad™, or Unix Vi, Emacs, or the like. In some embodiments, these reports can then be printed out, emailed or stored onto some type of physical storage media for future reference.

In some embodiments, a payment-processing module is implemented. In some embodiments, the module submits financial transactions posted to specific tables through third-party clearing houses for approval. Results are posted back to the same tables and reported back to client applications. In some embodiments, a client may request a piece of Content from the server application. In response the client is asked to provide method of payment information (e.g., credit card account information). This payment information is then routed to a third-party server for verification of the validity of the payment information, and to determine if the requisite funds are available. In some embodiments, the client must manually enter the payment information, whereas, in other embodiments, the process is automated such that a client account is maintained on the server application and a payment method pre-provided by the client is used as payment. Put another way, in some embodiments, credit card information is associated with a particular user and/or client such that this account may be automatically charged where Content is requested from the server application. Once this information is successfully provided the server application delivers the requested Content to the client.

In some embodiments, a task-scheduler module is implemented. In some embodiments, this module monitors the system clock and initiates events and services at times established by a user configuration and stored within specific tables. In some embodiments, these events and services include checking for software module updates, deploying software patches, executing and scheduling the execution of batch files, and checking memory usage and scheduling disk de-fragmentation where necessary, just to name a few.

In some embodiments, a maintenance manager is implemented. In some embodiments, this module initiates database maintenance routines based upon scheduled events stored within specific tables. For example, in some embodiments, various database-optimization algorithms are implemented to ensure the efficient implementation of the database and to limit the likelihood of such things as non-additive joins. In some embodiments, these algorithms can be automatically implemented as a scheduled task, while in other embodiments they can be manually implemented. The actual algorithms implemented may be Boyce-Codd Normal Form or some other normalization, optimization algorithm known in the art. (See *The Fundamentals of Database Systems* 3$^{rd}$ *Edition*, by Remez Elmasri & Shamkant B. Navathe, Addison-Wesley, 2000.) In some embodiments, the user of the server application is prompted regarding data that have not been accessed or used so as to allow the user to make a decision regarding whether data should be discarded.

In some embodiments, a policy-enforcement module is implemented. In some embodiments, this module monitors traffic and data conditions to ensure proper execution of services and features. Specifically, in some embodiments, a server may, for example, have certain bandwidth limitations for all clients or particular clients relating to how much bandwidth they can use in accessing and downloading Content. These limitation are the implementation of a policy, and where this policy is violated the server application may, in some embodiments, restrict bandwidth usage by a particular client. Similarly, if a client were to violate a policy relating to the manner in which Content were accessed (e.g., if they tried to crack or access unauthorized Content) this too could require that a client's access to the server be restricted or denied. In short, in some embodiments, where a policy is violated, the server application may restrict a client from accessing the server application.

A Database Level for the Server Application

In addition to the Head and Shred. Record Data tables disclosed above, in some embodiments, additional data tables are implemented to allow for the tracking of such things as user information, profiles, purchases and other information related to users of the server, client and related applications. In some embodiments, each module and service is supported by one or more pre-defined tables within the database. Client applications know these table definitions and submit records to them, which are acted upon by related modules/services. Upon being acted upon by these related modules/services, the results of various manipulations (e.g., selects, calculations) of these records are posted back to the same or related tables where the client application retrieves them and responds accordingly. In some embodiments, these manipulations are carried out using SQL, whereas in other embodiments another means of manipulating these records is used.

The specific supporting tables are derivatives of the basic tables described below, and may contain additional fields and properties specific to compiled version of the server. These basic tables might include, in some embodiments, data fields relating to UserID, UserName, LastName, FirstName, Password, SocialSecurityNumber, DateofBirth, CreditCardNumber, and other personal information. Many of the database tables will vary based upon the commercial or non-commercial uses to which the server application is put. For example, in some embodiments, where Content is purchased, a data field will be maintained on the server application that contains billing data (e.g., a BillingData field). A. BillingData field may, however, be absent from non-commercial embodiments of the present server application. The manner in which customer data used in electronic commerce are modeled, stored to, and retrieved from a database and associated tables is well known in the art. (See *Database Systems: Design, Implementation, and Management*, 5$^{th}$ *Edition*, by Peter Rob & Carlos Coronel, Course Technology, 2001.)

A Client Application

In some embodiments, a first and second computer system are configured in a server-client relationship (see above description). Server and client applications are run on the first and second computer systems respectively. These applications, in some embodiments, are written in an object oriented programming language including C++, C#™, Java™, Delphi™, or the like. Once written, a unique private key value is embedded into the client application to uniquely identify the client application. The application along with the embedded key value are then compiled or interpreted as is known in the art. In the server-client relationship, the client requests Content from the server. This Content is streamed to the client via a LAN, WAN or Internet. Users of the client or server application will interact with the server or client computer systems via various GUIs. In some embodiments, Content is decrypted, reassembled and placed into a buffer for use by a player application or device present in a client application.

In some embodiments, this Content is played as a track or distinct selection from a sound recording as opposed to a file. These tracks are displayed instead of a WAV, ATI, MPEG, or some other file known in the art. Once accessed by the client application, these tracks have various digital rights associated with them. In some embodiments, these tracks are aggregated into one or more play lists. In at least one embodiment, these play lists can be searched by artist, genre, album title, and a variety of other methods.

A Client Application Interface

Figure 24:
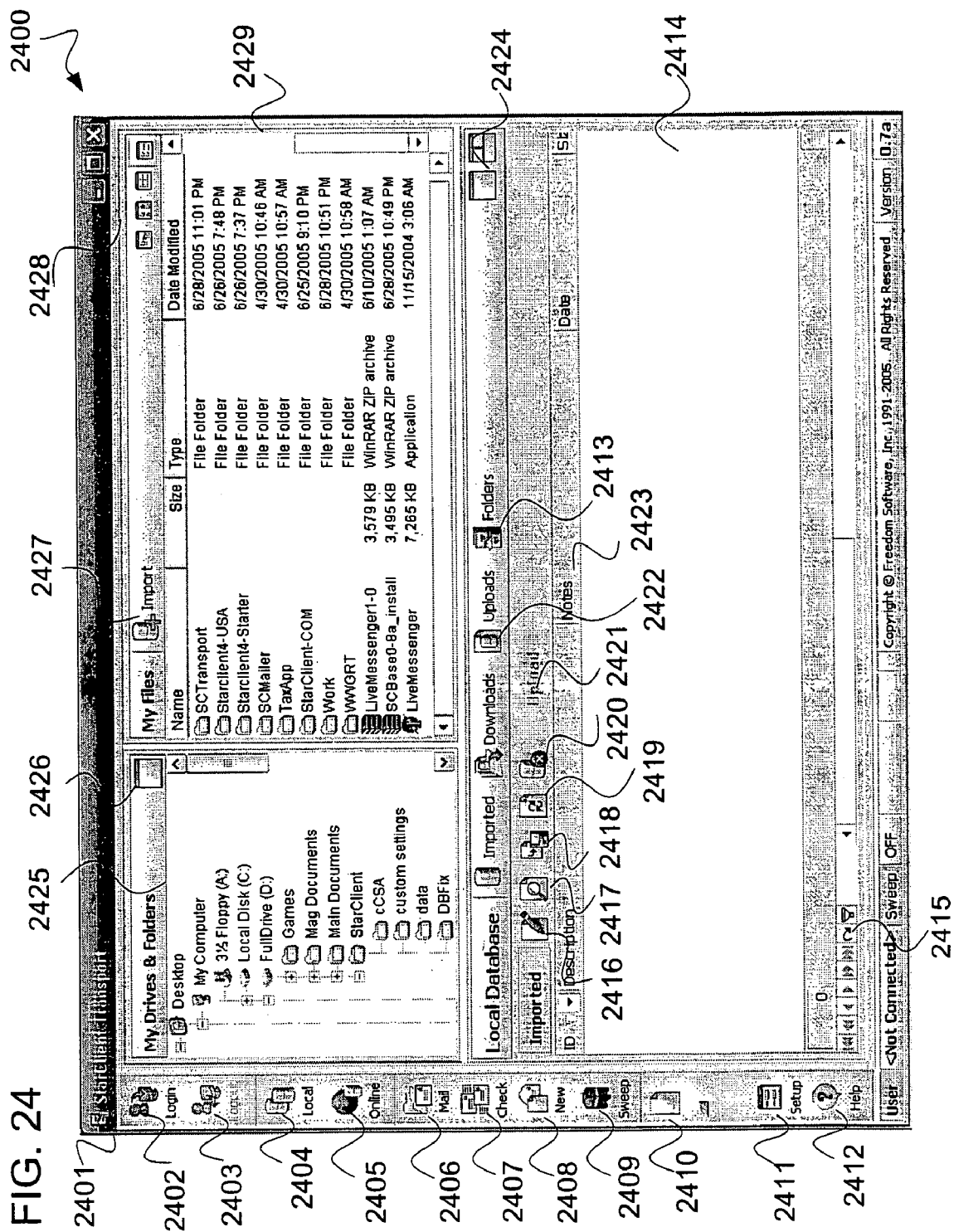
FIG. 24 depicts a file transfer GUI 2400 as it would appear in a window frame on a computer monitor 110.

In some embodiments, a client-application-file-transfer interface is implemented, while in some embodiments a player-application interface is implemented. FIG. 24 depicts this file-transfer GUI interface 2400 as it would appear in a window frame on a computer monitor 110. In some embodiments, this GUI is written using an object oriented-programming language as disclosed above. In some embodiments, a file-transfer interface 2401 is implemented in the form of a GUI. In some embodiments, this interface is implemented to transfer and display Content that was previously stored as text-file format such as PDF, DOC, TIFF or TXT just to name a few. A login 2402 button is used to bring up a dialog box that logs one into a private and encrypted network creating a connection between a local and network database. In some embodiments, a log out 2403 button is used to disconnect the client application and local database from the network database. In some embodiments, a local 2404 button is implemented to allow a user to change the main window view to show the local database view. In still further embodiments, an online 2405 button is implemented to allow for a user to change the main window view to show the online database view. A mail 2406 button is implemented, in some embodiments, to allow one to change the main window view to show a window allowing for a user to send and receive email. In one embodiment, a mail-check button 2407 is implemented to allow a user to check for any new email. In still a further embodiment, a new-mail button 2408 is implemented to allow a user to send new email. In at least one embodiment, a sweep toggle button 2409 is implemented that starts or stops a search for any new email. In some embodiments, a reserved button 2410 is implemented that reserves a space in the GUI for future functionality. In some embodiments, a setup button 2411 allows a user to specify a username and password with an option to store the password. In at least one embodiment, a help button 2412 is implemented for bringing up a help dialog box with information about the application. In some embodiments, a local database navigation grid with refresh and filter buttons 2415 is implemented. In at least one embodiment, a local database view or window 2414 is implemented. In some embodiments, a detail-view buttons 2424 and 2426 are implemented to toggle between the interfaces to either show or hide the local explorer view. When hidden, just the local or online database will show full screen. When shown, the local explorer view will be on top and split into two sections, the "My Drives & Folders" section 2425 and the "My Files" section 2429. The bottom half of the screen will then be placed to the fore depicting the local or online database view. In some embodiments, various buttons implementing file functions are implemented including an edit-file button 2416, a view-file button 2417, a save-to-file button 2418, a refresh-file from original source button 2419, and a delete-file button 2420. In addition to the various buttons 2422 related to uploading files to a server, there are description fields 2421 and 2423 (i.e., grid Header fields) describing this functionality. Additionally, there is a file folder description 2413 relating to the particular local database and its organization. In some embodiments, an import button 2427 provides one the ability to import any file that is selected from the My Files section. When imported, the file is entered into the local database in the import section. And again, when imported, the file can be given a specific name and have notes tagged along with it including: Filename, Description, Notes, Date/Size, and Send Message. In some embodiments, a My Drives & Folders 2425 window is implemented that displays the hierarchical structure of files, folders, and drives on a computer. It also shows any network drives that have been mapped to drive letters (e.g., A, C, or D) on a computer. Using a browser such as Windows Explorer™ or Mozilla FireFox™ one can copy, move, rename, and search for files and folders. In at least one embodiment, a My Files 2429 window displays the contents of a selection from the folder selected in 2425. From My Files 2429 files can be imported by selecting a file and clicking the import button 2427 or by just dragging and dropping the file into the local database window 2414. By performing a right-click in this window all the functionality of the standard Windows Explorer or Mozilla FireFox™ browser is imported. In some embodiments, a various view option buttons 2428 is implemented that has four choices for display options of the My Files 2429 window. One can view the My Files 2429 window as large icons. One can view the My Files 2429 window as small icons. One can view the My Files 2429 window as a list view. One can view the My Files 2429 window as a details view.

While not displayed, in some embodiments, additional functionality is also envisioned. For example, various functionalities are associated with the mail 2406 button are envisioned. As disclosed above, this button 2406 allows one to change the main window view to show a window allowing a user to send and receive email. In many ways this window is a form of integrated messaging functionality implemented via a GUI that allows a user to communicate with other users, artists (i.e., musical artists and other creators of digital content), publishers and their related websites. Optionally included are embedded voice and video support which can serve to augment traditional text-based forms of communication. Some of the specific functionality displayed in this window includes various mail options such as: in box, out box, message preview, contacts, and contact groups. An additional, second window displays links for send/receive, new message, reply, reply all and forward options and associated functionality. This functionality is implemented with various buttons/GUIs. More specifically, the inbox displays all messages received through the network. Message preview allows a user to highlight a message in the inbox, and have a preview of that message displayed without having the entire message displayed for viewing. An outbox shows all messages that have been sent or are currently ready to be sent. A send/receives window and associated button/GUI sends all messages in outbox that have not yet been sent, while it receives any message available on the Network server and brings them into the In Box.

Figure 25:
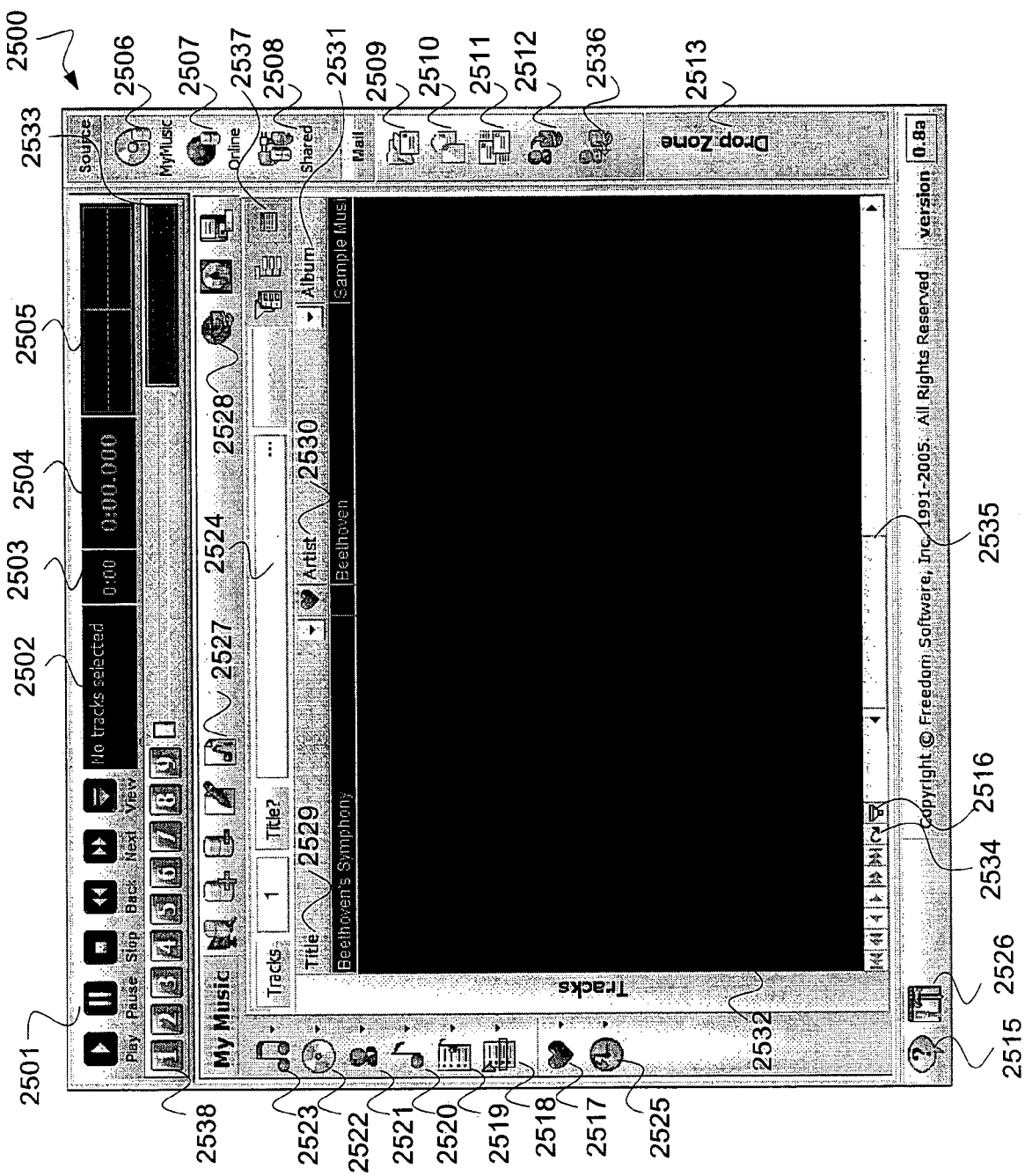
FIG. 25 depicts a player application GUI 2500 and the associated functionality.

FIG. 25 depicts a player application GUI 2500 and the associated functionality. In some embodiments, this GUI is written using an object oriented-programming language as disclosed above. In some embodiments, this interface is implemented to transfer and play Content that was previously stored in a MP3, MPEG, JPEG, WAV or AAC file format just to name a few. In some embodiments, this player application can play Content previously stored in one of the above mentioned file formats. In some embodiments, this player application itself can shred, encrypt and store to a database any of the above mentioned file formats using methods and data structures outlined above. In some embodiments, various media player control buttons 2501 are displayed including play, pause, stop, back, next view. Additionally, displayed, in some embodiments, are a track-name display 2502, a track-length window 2503, a track-remaining window 2504, and a graphical representation 2505 of the music being played. In some embodiments, a MyMusic 2506 button is displayed that when executed will display audio Content available in an embedded database, or from a USB 101, or native storage drive (e.g., optical drive 102, floppy drive 103, tape drive 104, or magnetic drive 105) and associated physical media (e.g., CD-R, CD-RW, CD, DVD-R, DVD, floppy disk, or tape). In some embodiments, an online 2507 button is displayed that when executed will allow one to access audio Content from an online server. By using this online button, a user can connect to a particular server using the server's IP address and, depending on the user's privileges, access Content on this server. In some embodiments, this Content can be accessed via paying a use fee. In one embodiment, a shared 2508 button is implemented that allows one computer system to connect to various other computer systems in a peer-to-peer configuration, or client-server configuration. The audio and video Content available on these other servers will be displayed once a connection to another computer system is made. A create-mail 2509 button is implemented, in some embodiments, whereby one can create a new email message. In one embodiment, a send-email 2510 button is implemented to send new email. In some embodiments, a respond-email button 2511 is implemented to send a responsive email message. In one embodiment, a mail-login 2512 button is implemented to allow one to log into a mail system, and a mail log out 2536 button is implemented to allow one to log out of the system. In still one other embodiment, a drop zone 2513 area is disclosed that provides a region into which audio or video files can be placed and automatically shredded, encrypted and stored into the application's database for future use. In at least one embodiment, a mute 2516 button is implemented to allow one to mute the output of the player application 2500. In some embodiments, a refresh 2534 button is implemented to fresh the audio and video Content information displayed in the track window 2532. In some embodiments, a help 2515 button is displayed that allows a user to request information relating to how to use or access various functions associated with the player application. In still one other embodiment, a slide bar 2535 is implemented that allows a user to view the visible track information, even where this track information is not viewable in the entire track window 2532. In some embodiments, a systems diagnostics window 2526 is implemented that allows one to review such things as bandwidth usage, and storage space used among other things. In at least one embodiment, a track-history icon 2525 is displayed that allows a user to see a grid view or list of the most recently played tracks. In some embodiments, a heart icon 2517 button is implemented that allows one to access a grid view or list of favorite or most played tracks. In some embodiments, a now-playing icon 2518 is provided that allows one to access a grid view or list information relating to the track that is presently being played. In at least one embodiment, a play-list icon 2519 is available that allows a user to review a grid view or list of various play list. In some embodiments, a genre 2520 button is implemented that allows one to sort tracks according to genre, and will disclose a grid view of the number of tracks that are accessible in each genre. In some embodiments, an artist 2521 button is available that allows one to search for the names of artist available and displays a grid view or list of how many tracks for each artist is available. In at least one embodiment, an album 2522 button is implemented that allows a user to search by album title, and once found displays a grid view or list of the search results. In some embodiments, a track 2523 button is implemented that allows a user to review the number of tracks available, and review the tracks by name, artist, album and other relevant information. These tracks are displayed as a grid view or list. In some embodiments, a series of audio Content presets 2538 numbered one (1) through nine (9) is disclosed that allow one to instantaneously access audio or video Content stored on a play list, where the audio or video Content is numbered one (1) though nine (9). Additionally pictured to the right of the presets 2538 is a track-progress bar whereby the progress of a track in terms or what portion of it has been played is tracked. In one embodiment, a data options bar 2527 is displayed whereby moving right to left, a new play list icon is disclosed that allows one to access a new play list. Next, an edit-track-information list is disclosed. Then, a remove-track icon is displayed (i.e., a database icon with a minus symbol), and add-track icon are displayed (i.e., a database icon with a plus symbol) for adding and removing tracks from a play list. Additionally, to the left of the add track button, a scan button is provided to allow one to scan the computer system onto which the application is running for additional audio or video Content. Additionally contained on the data-options bar 2527 are some icons relating to an upload icon 2528 for uploading tracks from the computer system running the client application to another computer system connected to the computer system running the server application via a network. Directly to the right of the upload icon 2528 is, in some embodiments, a burn icon for burning tracks to a physical media such as a CD-RW, CD-R, DVD-R, or the like. To the right of the burn icon is a save-tracks icon used to save tracks to a particular type of physical storage media such as a floppy drive or flash memory. In some embodiments, the ability to burn or save tracks will be determined by the digital rights associated with a particular target file. In at least one embodiment, the track window 2532 is broken up into a grid type format with a track title heading 2529, track artist heading 2530, and album heading 2531 are displayed in a grid type format. In some embodiments, a graphical representation 2533 is provided relating to how much Content is remaining to be played. In at least one embodiment, a series of display buttons 2537 are provided, with the right-most button acting as a selector to show tracks in columns, providing a grid display of tracks by genre, artist, and albums. To the left of this selector button is a group-track button that groups tracks by genre and subdivided these genres by artist in the genre. To the left of this group-track button is a selector button that divides up the Content by individual tracks, artists and albums. In some embodiments, a title 2524 text box is implemented that allows for a lexigraphic search of the track library, whereby text is entered into the text box and the most lexigraphically similar track title is returned as a search result. In some embodiments, a track-number search can be implemented, wherein a track text box is used to input data related to the number of a track. Once inputted, this data is used to search for the track corresponding to the track number.

Figure 26:
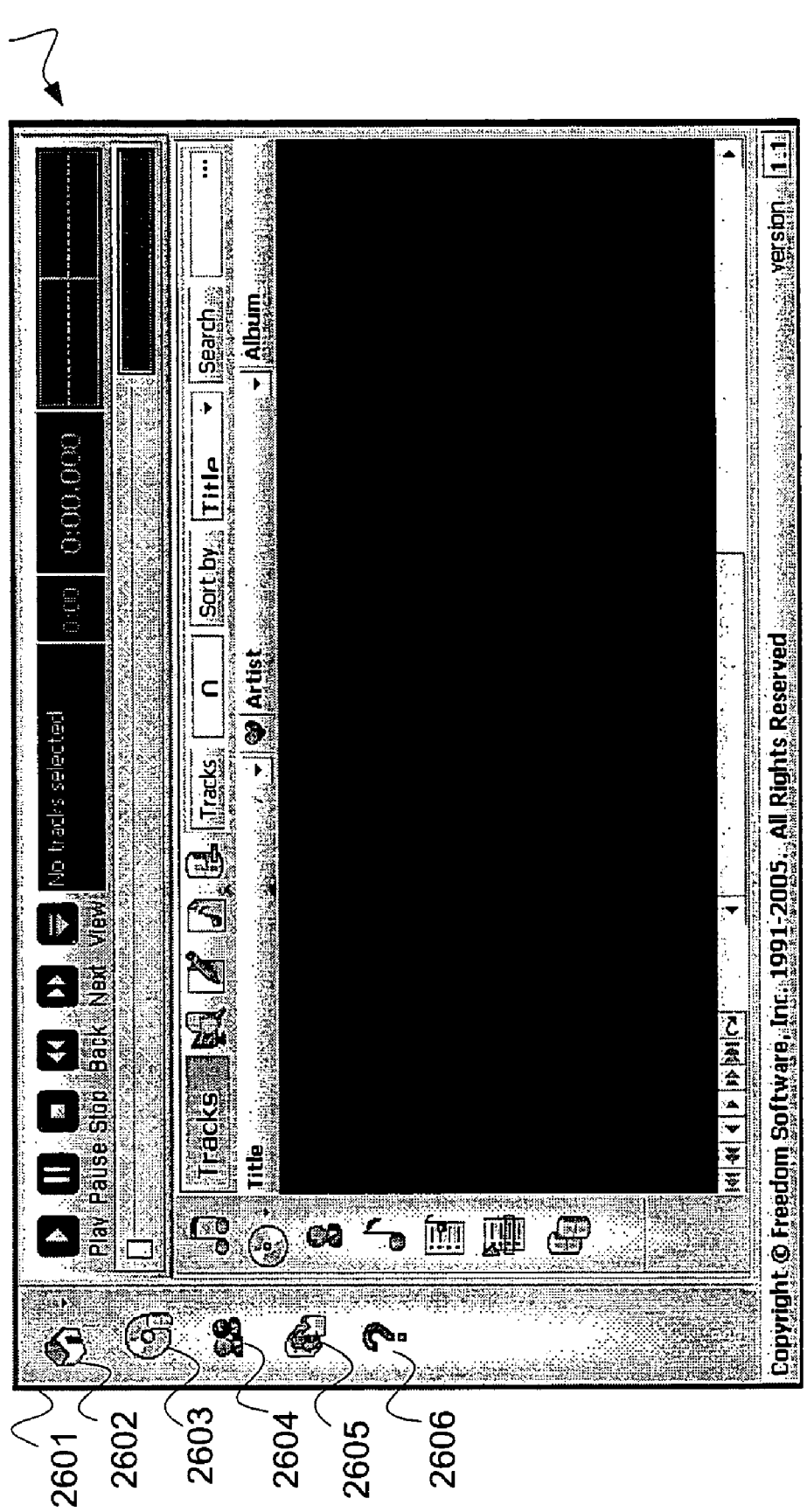
FIG. 26 is a schema of a player application GUI 2600 with added functionality to enable the user of the player application to make queries of general information regarding the network to which it is logged into.

FIG. 26 is a schema of a player application GUI 2600 with added functionality to enable the user of the player application to make queries of general information regarding the network to which it is logged into. A functionality bar 2601 provides various buttons that allow a user to elicit information from the network. A home button 2602 allows one to access information regarding the company that is running the network upon which the player application is logged onto. A music button 2603 allows a user to see a list of all available songs and sorting options for these songs, including the ability to sort by titled, genre, artist, or album just to name a few of the options. GUI 2600 is the result of music button 2603 being executed. A user may then play any of the songs listed. In some embodiments, these songs are available off of the network. A user button 2604 allows a user to access user-base information and general-user information. An activity button 2605 allows a user, including server administrators, to review the activity of a user using a particular server during a specific time period. An incident report button 2606 allows persons to review various reported incidents including violations of network policies, security breaches, cracking reports, hacking reports, and the like.

Figure 27:
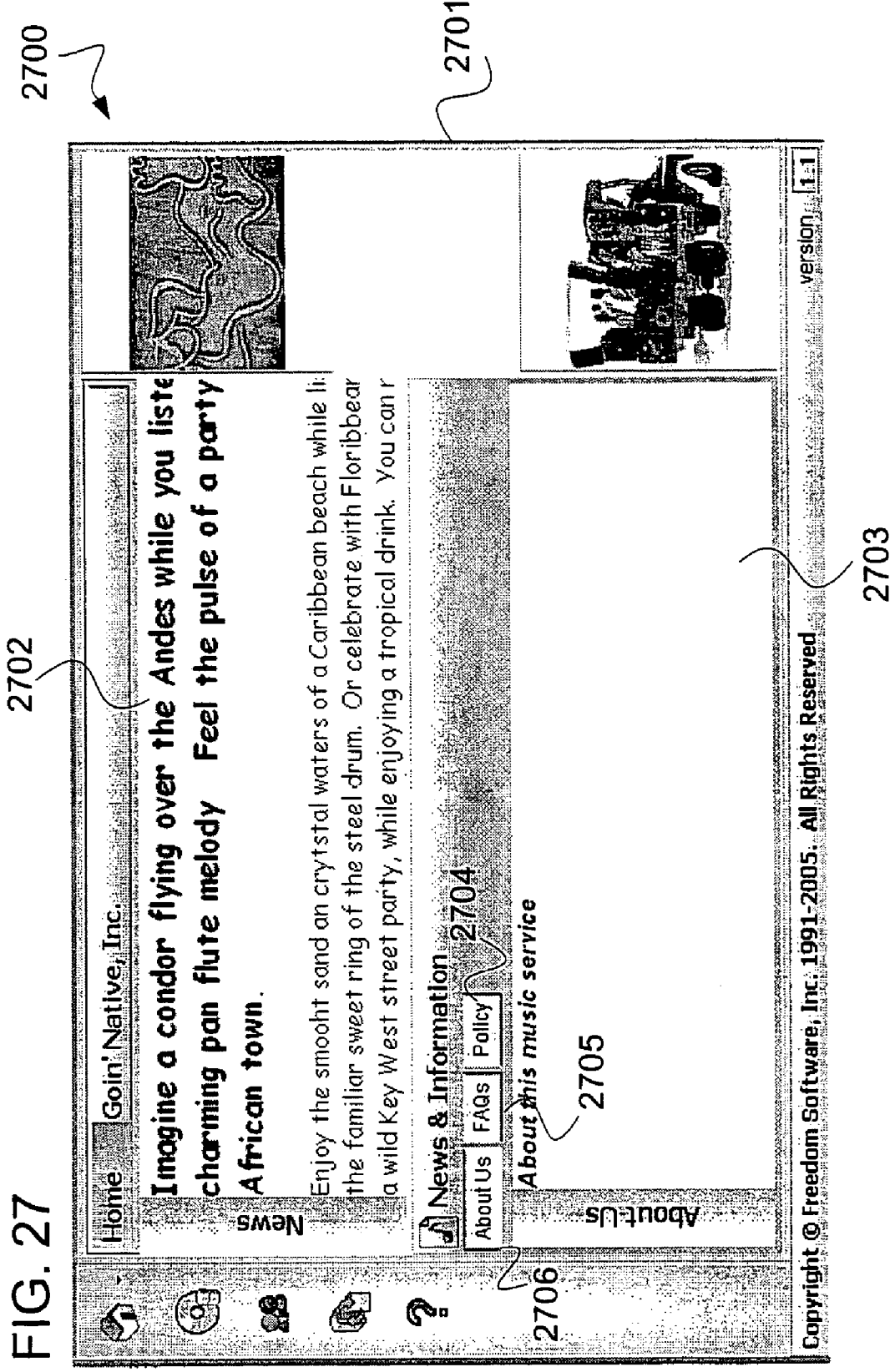
FIG. 27 is a schema of the resulting window 2701 and associated home GUI 2700 that is generated when a home button 2602 is executed.

FIG. 27 is a schema of the resulting window 2701 and associated home GUI 2700 that is generated when a home button 2602 is executed. Window 2702 titled news is generated to show news related to the network, or advertisements may also be posted in this window. A window 2703 is provided to allow for information relating to the party running the network may also be posted. A button 2704 is implemented to allow for information relating to network policies to be displayed. A frequently asked questions button (FAQ) 2705 is implemented that allows a user to seek answers to various frequently asked questions regarding the player application and associated network with which the player application interacts. An about-us button 2706 is implemented that, when executed, displays information relating to the network and person or persons running the network.

Figure 28:
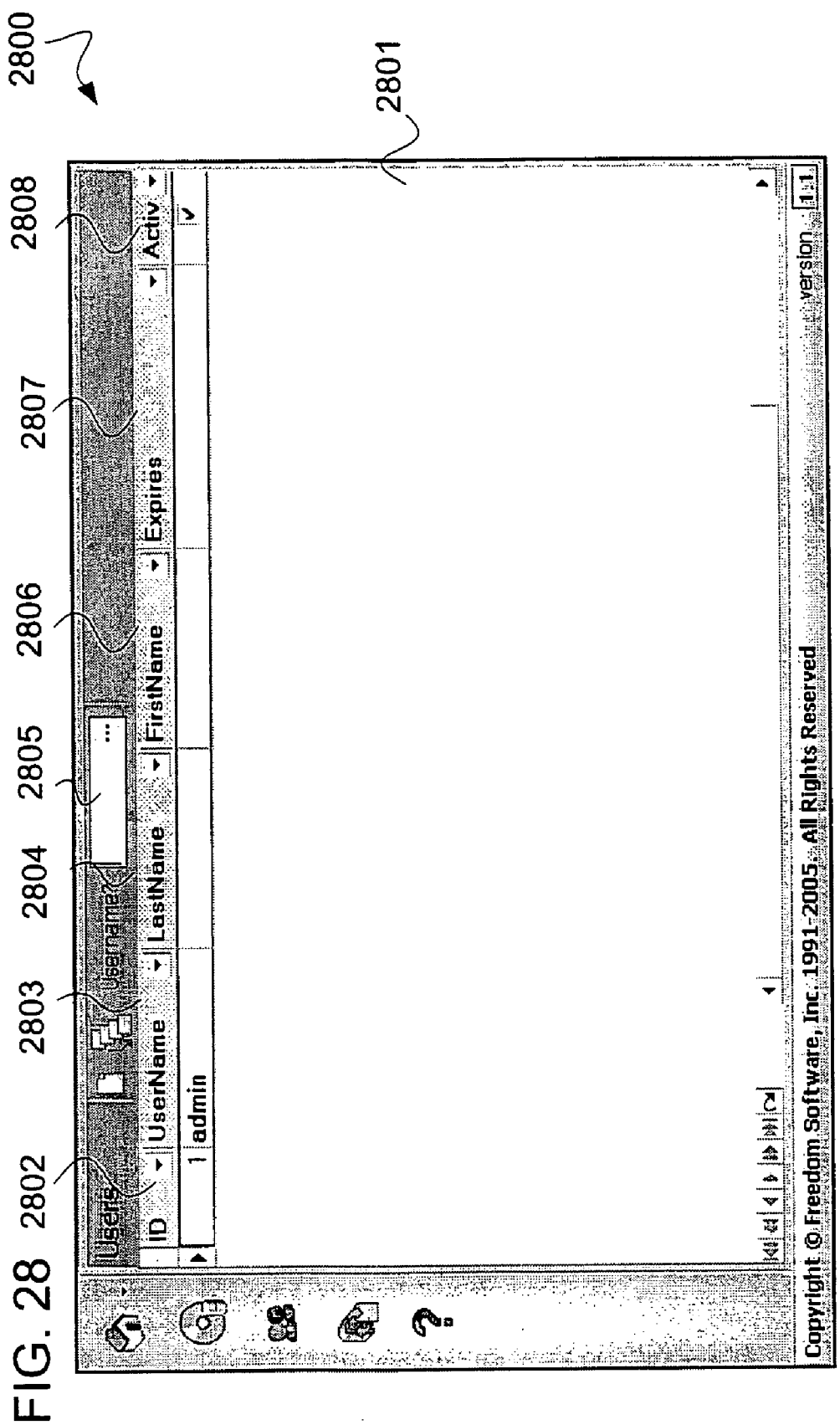
FIG. 28 is a schema of the resulting window 2801 and associated GUI 2800 that is generated when a user button 2604 is executed.

FIG. 28 is a schema of the resulting window 2801 and associated GUI 2800 that is generated when a user button 2604 is executed. Displayed are fields relating to UserId 2802, UserName 2803, LastName 2804 of the user, FirstName 2806 of the user, a field 2807 relating to when the users account expires, and field 2808 disclosing whether the user's account is active.

FIG. 29 is a schema of a GUI 2900 that is generated when an activity button 2605 is executed. This GUI 2900 is displayed as a window 2901 with various fields displaying data relating to user activity. Example fields include: an Id field 2902 disclosing the ID number of a user, a data field 2903 showing when the last time a user logged into the system was, a description field 2904 showing what that user did when they logged into the system (i.e., what application they used), and a UserName 2905 showing who the user was based upon privileges identity.

Figure 30:
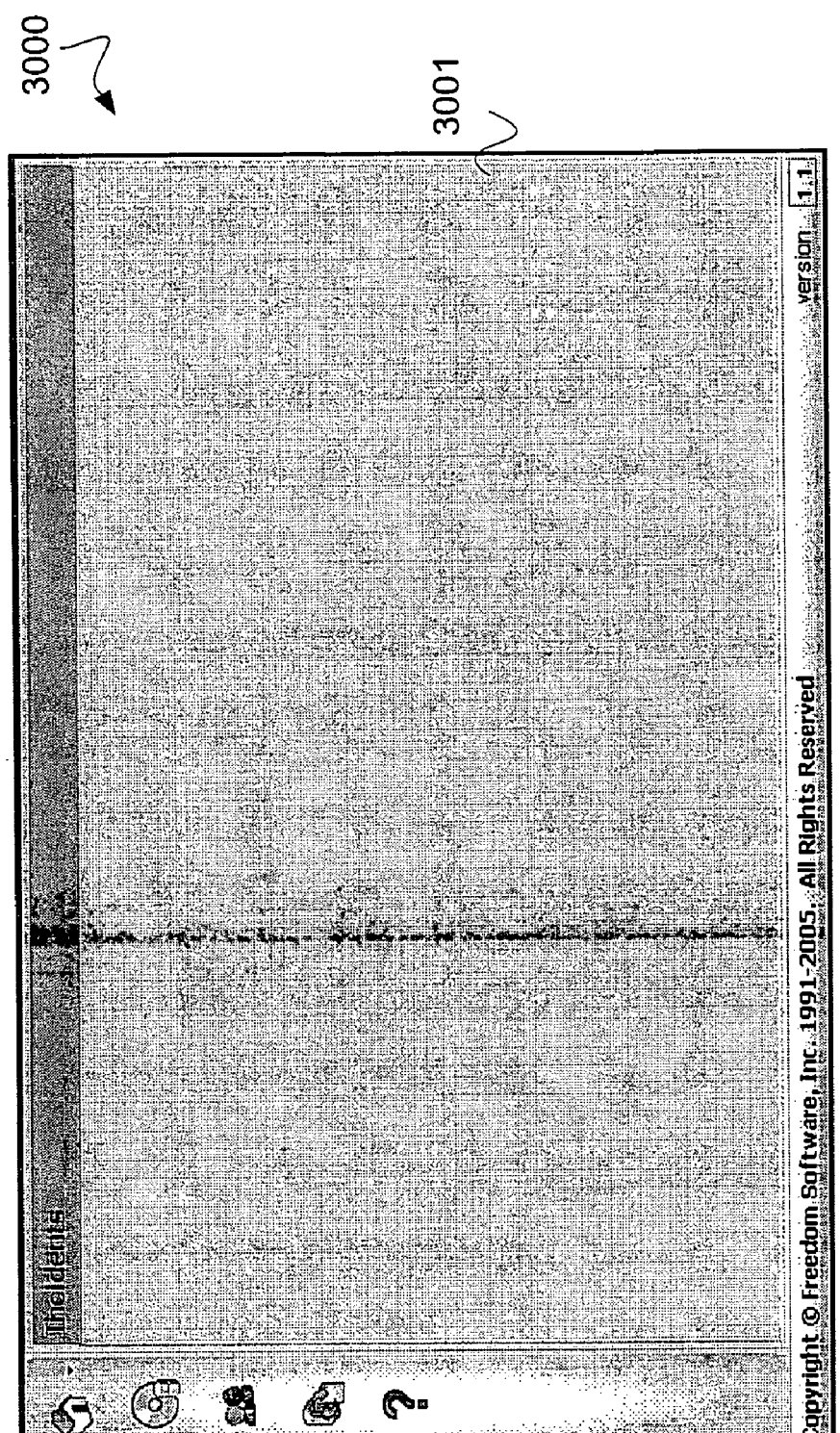
FIG. 30 is a schema a GUI 3000 displayed as a window 3001 that results from a user executing an incident button 2606.

FIG. 30 is a schema of a GUI 3001 displayed as a window 3001 that results from a user executing an incident button 2606. As described above this window will display incidents relating to network news relating to security issues, breaches and the like.

A Logic Level for the Client Application

In some embodiments, once decrypted the unencrypted shredded digital content is passed to the buffer of a player application. Once in this buffer, the digital content is then, in the case of music played, or in the case of visual content displayed. In some embodiments, at no time is the unencrypted shredded content available as a complete file.

In some embodiments, Content is requested by a client application from a server application. The process for making this request and supplying this Content is as follows. The identity of the client application is verified using one of the above described methods. Once the client is verified, the record for the requested Content is identified in the Header table using a FileID 401 value, and an output stream is initialized. This record is then inputted into the output stream. Additionally, the records possessing the corresponding FileID 401, 415 values contained in the Shred record are also identified and appended to the output stream. As disclosed above, for each Shred record there is a ChunkID 414 value used to establish the priority of the record in the overall piece of digital content. This ChunkID 414 value allows Content to be placed into the output stream in a random order relative to the order of priority in the original file or piece of digital content. Once these records are appended to the output stream, they are sent to the client application and specifically the buffer of the client application or device. These records are then sorted into a descending or ascending order based upon the ChunkID 414 value using some sorting algorithm known in the art. (See *Algorithms in C++ Parts: 1-4, 3rd Edition*, by Robert Sedgewick, Addison-Wesley, 1998.) Once sorted they are decrypted and played or viewed by the player application or device.

A Database Level for the Client Application

In some embodiments, the above disclosed Header and Shred Record data tables are implanted in the client application as an embedded database is used to store Content. In still other embodiments a separate database platform is utilized. The tables contained in these databases are typically written using SQL. Similarly, the search, retrieval and storage of data to these tables are typically also made using SQL. The manner in which Content is decrypted, reassembled and played or viewed is described above, but may be limited by the digital rights associated with a particular piece of Content. Specifically, in some embodiments, a client may or may not have the right to make copies, view, play, or execute any number of other rights associated with a particular piece of Content. These rights, as reflected in the data field of the Header record, determine what can be done with a particular piece of Content.

A System of Transmission Between a Server and Client

In some embodiments, the present invention utilizes the above referenced TCP/IP protocol stack. A system of data transmission between a server and client can be described as a series of roughly five layers described as a: physical layer, data link layer, network layer, transport layer and application layer (i.e., collectively the Transport Layers). (*See Open System Networking: TCP/IP and OSI*, by David M. Piscitello & A. Lyman Chapin, Addison-Wesley, 1993.) In some embodiments, the present server and client applications reside on the application layer of the TCP/IP protocol stack.

In some embodiments, the present application utilizes hyper-text-transfer protocol (HTTP) to transmit the Content between the server and client applications, whereas in other embodiments another protocol known in the art is utilized. In still other embodiments, another application utilizing a protocol standard such as ATM is used where, for example, a DSL is utilized for the transmission and receipt of Content.

In some embodiments, the only form of encryption protection is that provided by the initial Encryption Engine (e.g., 903, 2214, 2216), whereas in some embodiments, a secure-hyper-text transfer protocol (HTTPS) is used, a Kerberos-based network authentication protocol or some other method for protecting the transferred Content and authenticating the identity of the client requestor is used.

In some embodiments, a detection application or code module is implemented to prevent the loss of transmitted shredded, encrypted data due to a stream-ripping program. Stream-ripping programs are well known in the art and are programs implemented to capture streamed digital content, and rip or compress this content into a more generally used or accessible format. For example, some stream ripping programs will capture audio content formatted in as WAV file and convert it to a new file in an MP3 format. In some embodiments, this detector application will sniff or search an internet connection, prior to sending shredded, encrypted data along this connection, looking for stream ripping programs being used. If a stream-ripping program is detected, the detector program will disconnect and, in some embodiments, shut down the server and/or client applications.

In some embodiments, a server and client application possess the same embedded private key. In some embodiments, this private key value is assigned to both the server and client applications at compile time and an embedded private key is created. Once this embedded key is created, the client application or device is free to login to the server device and have its identity verified by virtue of its possession of the private key value. In some embodiments, once the client identity is verified, the client and server are free to exchange communications and in particular the client is free to request Content. Put another way, once the embedded key is verified, the private keys for each piece of Content are automatically tracked by the Encryption Engines for the server and client applications.

In some embodiments, each piece of Content is sent by the server application to the client application or device in an order that is random relative to how each piece of Content exists in the original file. Once requested, the Content is transported from the client to the server application via the Transport Layers. In some embodiments, the actual order in which the Content is sent can be varied such that it can be sent in a sequential or random order based upon the FileID 401 or ChunkID 414 values. As described above, once this Content is received by the client application, it is sorted, decrypted, and played by the client application or device.

In some embodiments, an extensible-markup language (XML) and associated schema is used to tag the encrypted data prior to transmission as is known in the art. (See *XML for the World Wide Web*, by Elizabeth Castro, Peachpit Press, 2000; *Data on the Web: From Relations to Semistructured Data and XML* $1^{ST}$ *Edition*, by Serge Abiteboul, Peter Buneman, & Dan Suciu, Morgan Kaufmann, 1999.) In this embodiment, the various schema types, whether built in or custom defined, will reflect the data structures and fields depicted above for the Header Data table and Shred Record Data table.

FIG. 31 depicts a schematic of a client-server relationship 3100. In this schematic, a client computer system 3105 requests a piece of digital content titled EXAMPLE.PDF 3102 via an Internet 3103. The server 3101, in turn, supplies three pieces of Content 3104 that make up EXAMPLE.PDF. These pieces of Content are supplied via an Internet 3103 to the requesting client computer system 3105.

In some embodiments, the application protocol is provided by the database system itself such that no intermediate application or application programming interface (API) is needed to connect the database and a client application. In such an embodiment, a native protocol driver exists to make direct calls to a server database using a specified protocol. In some embodiments, the database table itself is recognized as having an Internet protocol address. The use of native protocol drivers to replace intermediate applications or APIs in accessing databases is well known in the art. (See *Delphi/Kylix Database Development DataCLX for Windows and Linux* $1^{St}$ *Edition*, by Eric Harmon, Sams, 2001.) In still other embodiments, an API such as Java Database Connectivity (JDBC) is needed to communicate with a database application (i.e., the ODBC programming interface) and to link to the Transport Layers or other applications and ultimately the client application.

FIG. 32 is a schematic depicting an application-level view 3200 of the modules making database calls. In this embodiment, a requesting client application 3205 makes a request for a piece of digital content titled EXAMPLE.PDF 3206. The request is made via an Internet 3203. A native-protocol driver 3202 receives this request, accesses a server database 3201 and supplies the three pieces of Content 3204 that make up EXAMPLE.PDF 3206.

An Application of Digital Content Shredding, Encryption, and Storage within the Server-Client Paradigm In one example of an application of the present invention, a JPEG file is stored onto the physical storage media of a computer system such as a server. The Content Management Module then takes this JPEG file and shreds the JPEG file into multiple shreds of a predetermined size. In some embodiments, the drag and drop feature common to a GUI are employed to load the JPEG file into the Content Management Module. These drop-in-drag functions, if a GUI is to be used, are carried out using a keyboard 113 and/or mouse 112 input devices. Once shredded, the shredded pieces are encrypted with one of the aforementioned symmetric key algorithms and saved into the table of a database application. In some embodiments, this is an embedded database application, whereas in other embodiments this is a stand alone database application or platform. In some embodiments, privileges are set determining the ability of one to access, copy (i.e., setting the number of copies that can be made), distribute or use (i.e., restricting the types of devices and application that can use the Content) the shredded digital content (i.e., the digital rights are set or established). These privileges can be set before, during or after the shredded digital content is stored to the database table. Upon being saved into the table, any one of a number of actions can be performed on the Content. The Content can be exported back to into the system or to a client of the server as a complete file (i.e., as the original JPEG). The Content can be requested by a client, and based upon the privileges the Content can be played, copied, exported back into its original JPEG format, or distributed. Additionally, once the Content is generated, the original JPEG file may be discarded. In some embodiments, in situations where the Content is requested by a client device, the Content is transmitted via an Internet using the Transport Layers of TCP/IP in individual encrypted packets. In some embodiments, a WAN, LAN or Internet is used to transfer the requested Content. Once the Content is received by the client application the client is free to use the Content based upon the assigned privileges described above. In some embodiments, however, the Content will be stored into the tables of a database application.

In some embodiments, where a user seeks to re-assemble the Content into, for example a JPEG file the process is as follows regardless of whether the file is taken from a physical storage media or from a network or memory stream: First, a Header record is selected from the Header Data Table. Next, an output stream is initialized as is commonly known in the art. Then, the Content field of the Header Data record is copied to the output stream. An iterative or recursive method is then used to decrypt and append the Content field from each Shred Record table record to the output stream. Lastly, the output stream contents are copied to the destination object. In the case of a file the output is saved to a file of a user-determined name and location. In the case of a destination stream the output stream data is simply copied to the destination stream. In some embodiments, each Shred Record is indexed by a FileID 401 and/or ChunkID 414 values, and can be sorted based upon these values. Where these values are not available, the chunk records would have to be access and delivered to the output stream sequentially, using an iterative or recursive method.

Application Functionality Associated with the System

In some embodiments, a functionality suite is available to both server-side and client-side users. There are a variety of functions associated with this suite, including, but not limited to, a messaging module, a photo-management module, a work-processing module, a spreadsheet module, and an email module. Common to many of these modules are the ability to generate, use and manipulate the above described Content. These modules and associated functionality may be used by either the client or server applications. These various modules can be implemented into the system on an as-needed basis. These modules may be written in an object-oriented-computer language such that a component oriented or object-oriented programming technique can be implemented using, a Visual Component Library (VCL), Component Library for Cross Platform (CLX), Java Beans (JB), Java Enterprise Beans (EJB), or Component Object Model (COM) just to name a few. Typically these modules are linked to another program via various APIs and then compiled into one complete server and/or client application. The process for using modules in the building of client and server applications is well known in the art. (See *Component Based Software Engineering: Putting the Pieces Together*, by George T. Heineman and William T. Council, Addison-Wesley, 2001; *Delphi Component Design*, by Danny Thorpe, Addison-Wesley, 1996.)

In some embodiments, a messaging module is written that facilitates electronic communication between users by storing structured records within specific tables. The supported formats include any-combination of text, graphic, audio and/or video data. Each message contains sender and recipient identifiers, date/time info, subject line, and various other fields which may be unique to a particular compiled version of the server application. In some embodiments, additional functionality includes send, receive, reply and forward capabilities, file-attachment support, and message-delivery notification. The sender can request a notification receipt upon delivery of the message. In some embodiments, advanced message formatting with support for graphics and tables, supports all Rich Text formatting with an internal editor. In some embodiments, a spell-check is included with customizable dictionary. In still other embodiments, support for embedded multi-media content is available. In some embodiments, an attached microphone is available for users to embed voice annotations. In some embodiments, a web camera is available so as to allow users to embed video clips into a message. In some embodiments, individual message rights are determined by a sender. When a message is created the author can decide if the recipient can copy or print, and whether the message can be forwarded to other users.

In still other embodiments, the messaging module provides a private and secure channel for user-to-user communications. The system follows the model of e-mail, but uses encryption to ensure privacy. In some embodiments, this system differs from e-mail in that spamming is not possible. The user has complete control over the "In Box," and the server cannot be spoofed because the only way to generate messages is through an approved, verified client application. The following features are also present: Rich text formatted (RTF) messages allowing the user to utilize fonts, colors, and graphics within a message Voice/Video enhancement allows a recorded voice and/or video message to be embedded within-each message. In some embodiments, the system has a voice-and-video recorder built into the message screen. In some embodiments, by speaking into their microphone and/or using a webcam a user can record a verbal/video message in addition to the text. In some embodiments, the recordings are high quality WAV and/or ATI files, maximum length determined by an administrator. In some embodiments, a contact management system allows the user to maintain a list of other network users with whom they correspond. Once entered the contact may be easily selected as a message recipient. In some embodiments, group management allows any combination of contacts to be defined as a group. The group may be used to send messages to all members without having to select them individually. Group naming and membership are completely user-defined. In some embodiments, virus-exclusion technology makes the system incapable of infection or unauthorized script control. Added organizational fields further classify each message. In some embodiments, message management is provided in a grid which allows sorting, grouping by any column, and custom filtering. In some embodiments, user-controlled whitelist or blacklist methods allow or restrict access. In some embodiments, the content of the various exchanged messages is stored into one of the above databases as shredded content.

In some embodiments, a word-processing module is included. This module includes a full-scale text editor, with all of the common features that users expect. The editor is embedded into the application and does not rely upon any third-party controls or plug-ins. In some embodiments, the following features are included: text attribute formatting (i.e., font, alignment, shading, backgrounds, indents, tab stops, spacing, line and paragraph styles, numbering, bullets), and a what-you-see-is-what-you-get (WYSIWYG) display including a page layout view with multi page preview. In some embodiments, table creation with borders and styles is available, that include: insert, delete, column width, merge cells and split cells. In some embodiments, spell checking with dictionary support is provided. In some embodiments, optional industry specific dictionaries are supported, as are printer export to HTML, XML, or PDF. In some embodiments, the content of the documents and text therein is stored into one of the above databases as shredded content.

In some embodiments, a spreadsheet module is included (i.e., a Workbook). This module is also embedded into the application. In some embodiments, it provides file-level compatibility with a spreadsheet program such as Microsoft Excel™ (XLS). In some embodiments, a wealth of features provides the user with all the control expected from a full-featured spreadsheet. In some embodiments, the module can read and write spreadsheet files allowing the user to load, for example, XLS files and save data contained within them to other XLS files—while maintaining the current visual presentation (i.e., cell data formatting, cell styles, etc.). In some embodiments, single or multi-page built-in operators and functions supporting individual cell formatting are implemented. In some embodiments, customize cell border styles, background & foreground colors, brush & font attributes, vertical & horizontal alignment and text formatting is available. In some embodiments, cell-style control including edge styles and fill patterns is available. In some embodiments, cell management and merge/split cell functions are available. In some embodiments, data sorting is available that provides the ability to sort against one or more columns, rows and column moving/resizing Multi-level undo/redo WYSIWYG printing Server posting to allow rights-based sharing with other users is available. In some embodiments, the content of the various spreadsheets is stored into one of the above databases as shredded content.

In some embodiments, a bulletin board module is implemented that allows for news and information related to the user community to be posted and accessible to all using the system. In some embodiments, some of the functions associated with this module include public file posting for distribution of common files and assets, shared posting to allow distribution to specific users, with individual rights for each person, private posting to allow remote access to personal user items, the posting of informational pages may be maintained for each artist, album, user and server, integrated messaging allows communication between users, artists, publishers and sites, shared repositories allow users to upload Content to a shared location for play-only access by others, and shared play list support just to name a few. In some embodiments, the content of the various bulletin board postings is stored into one of the above databases as shredded content.

In some embodiments, a photo-management module is implemented. This module uses the above described database technology to allow users to manage photos in most popular formats. Each photo becomes part of a document with additional fields to organize and catalog the collection. Support for BMP, JPEG, and GIF formats is provided. In some embodiments, a powerful grid display showing photos and related data fields is available. In some embodiments, standard image manipulation tools for rotating, resizing and cropping are available. In some embodiments, a server posting to allow for rights-based sharing with other users is available. In some embodiments, easy universal device connection and transfer with USB or Firewire™ is provided. In some embodiments, the various photos are stored into one of the above databases as shredded content.

In some embodiments, the present invention provides a method for handling shredded and encrypted digital content that includes sending a request to a server computer system for a file that has been organized as one or more pieces of the shredded and encrypted digital content in a database associated with the server, receiving the content from the server into a client computer system, sorting the received content from the server in a buffer residing in the client computer system, decrypting the sorted received content using a decryption algorithm, and forwarding the decrypted sorted received content from the buffer to another application.

Some embodiments of the method further include assembling the one or more pieces of shredded and encrypted digital content in the client computer system.

In some embodiments of the method, the assembling includes executing the following actions so long as the end of a data table has not been reached and a file identifier value from a first database table equals a file identifier value from a second data base table: (reading a content field into a first buffer, running a decryption function on the first buffer and storing the resulting data into a second buffer, outputting the second buffer to an application or device, and accessing a next content field).

In some embodiments of the method, the assembling includes executing the following actions so long as the end of a data structure containing records has not been encountered: (initializing a memory location, reading a record containing data from a database into the initialized memory location, adding the initialized memory location to a second data structure, executing the following action, if a file identification value of the record stored in the memory location equals a file identification value of a next record: (initializing a second memory location, reading the next record into the second memory location, and adding the second memory location to the second data structure), and accessing a further next record).

Some embodiments of the method further include randomizing the order in which the shredded and encrypted digital content is to be transmitted, and transmitting in the randomized order one or more pieces of shredded and encrypted digital content.

In some embodiments of the method, the receiving of content occurs from an Internet via TCP/IP transport layers.

In some embodiments of the method, the receiving including receiving one or more pieces of shredded and encrypted digital content in a random order.

In some embodiments of the method, sorting includes sorting the shredded and encrypted digital content.

In some embodiments of the method, the decrypting includes using a symmetric decryption algorithm.

In some embodiments of the method, the decrypting includes using an asymmetric decryption algorithm.

In some embodiments of the method, the decryption includes using a hybrid-crypto algorithm.

In some embodiments of the method, the forwarding includes forwarding sorted and decrypted digital content to a player application.

In some embodiments of the method, the forwarding includes re-shredding and re-encrypting the digital content, and sending the re-shredded and re-encrypted digital content to a database.

In some embodiments of the method, the decrypting of received content is achieved using a private key that is an attribute of the received content, and wherein the received content is a binary large object.

In some embodiments of the method, during the process of assembling of the shredded and encrypted digital content, an entire file of the digital content is never stored in any buffer at one time.

In some embodiments, the present invention provides an apparatus for handling shredded and encrypted digital content that includes: means for sending a request to a server computer system for a file that has been organized as one or more pieces of the shredded and encrypted digital content in a database associated with the server, means for receiving the content from the server into a client computer system, means for sorting the received content from the server in a buffer residing in the client computer system, means for decrypting the sorted received content using a decryption algorithm, and means for forwarding the decrypted sorted received content from the buffer to another application.

In some embodiments, the present invention provides a system for handling shredded and encrypted digital content. This system includes a client computer having a transmitter that sends a request to a server for digital content that has been organized as one or more pieces of shredded and encrypted data and that is stored in a database associated with the server, a receiver that receives the shredded and encrypted digital content from the server into the client computer system, a sorter that sorts the received digital content, a decryptor that decrypts the sorted digital content using a decryption algorithm, a buffer, and an assembler that assembles the decrypted digital content into the buffer.

Some embodiments of the system further include an assembler that assembles the one or more pieces of shredded and encrypted digital content in the client computer system.

In some embodiments of the system, the assembler executes the following actions so long as the end of a data table has not been reached and a file identifier value from a first database table equals a file identifier value from a second data base table: (reading a content field into a first buffer, running a decryption function on the first buffer and storing the resulting data into a second buffer, outputting the second buffer to an application or device, and accessing a next content field).

In some embodiments of the system, the assembler executes the following actions so long as the end of a data structure containing records has not been encountered: (initializing a memory location, reading a record containing data from a database into the initialized memory location, adding the initialized memory location to a second data structure, executing the following action, if a file identification value of the record stored in the memory location equals a file identification value of a next record: (initializing a second memory location, reading the next record into the second memory location, and adding the second memory location to the second data structure), and accessing a further next record).

Some embodiments of the system further include a randomizer that randomizes an order in which the shredded and encrypted digital content is to be transmitted from the server to the client computer, wherein the transmitter transmits in the randomized order one or more pieces of shredded and encrypted digital content.

In some embodiments of the system, the receiver is operatively coupled to an Internet via TCP/IP transport layers.

In some embodiments of the system, the receiver receives one or more pieces of shredded and encrypted digital content in a random order determined by the server.

In some embodiments of the system, the sorter sorts the shredded and encrypted digital content to recover an original order of the data.

In some embodiments of the system, the decryptor uses a symmetric decryption algorithm.

In some embodiments of the system, the decryptor uses an asymmetric decryption algorithm.

In some embodiments of the system, the decryptor uses a hybrid-crypto algorithm.

Some embodiments of the system further include a forwarder that forwards sorted and decrypted digital content to a player application.

In some embodiments of the system further include a forwarder that re-shreds and re-encrypts the digital content, and sends the re-shredded and re-encrypted digital content to a database.

In some embodiments of the system, the decryptor uses a private key that is an attribute of the received content, and wherein the received content is a binary large object.

In some embodiments of the system, an entire decrypted file of the digital content is never stored in any buffer at one time.

Some embodiments of the invention include computer-readable media having executable instructions stored thereon for causing a suitable programmed central processing unit to handle shredded and encrypted digital content by performing a method that includes: sending a request to a server computer system for digital content that has been organized as one or more pieces of the shredded and encrypted digital content in a database associated with the server, receiving the content from the server into a client computer system, sorting the received content from the server in a buffer residing in the client computer system, decrypting the sorted received content using a decryption algorithm, and forwarding the decrypted sorted received content from the buffer to another application.

Some embodiments of the media further include instructions that facilitate assembling the one or more pieces of shredded and encrypted digital content in a buffer, wherein the assembling includes: executing the following actions so long as the end of a data table has not been reached and a file identifier value from a first database table equals a file identifier value from a second data base table: (reading a content field into a first buffer, running a decryption function on the first buffer and storing the resulting data into a second buffer, outputting the second buffer to an application or device, and accessing a next content field).

Some embodiments of the media further include instructions that facilitate assembling the one or more pieces of shredded and encrypted digital content in a buffer, wherein the assembling includes: executing the following actions so long as the end of a data structure containing records has not been encountered: (initializing a memory location, reading a record containing data from a database into the initialized memory location, adding the initialized memory location to a second data structure, executing the following action, if a file identification value of the record stored in the memory location equals a file identification value of a next record: (initializing a second memory location, reading the next record into the second memory location, adding the second memory location to the second data structure, and accessing a further next record)).

Some embodiments of the media further include instructions that facilitate assembling the one or more pieces of shredded and encrypted digital content in a buffer, wherein the assembling includes: executing the following actions so long as the end of a data structure containing records has not been encountered: (accessing a next record containing data from a database, initializing a memory location, reading the record containing data from a database into the initialized memory location, adding the initialized memory location to a second data structure, and executing the following action, if a file identification value of the record stored in the memory location has the same file identification value of a next record: (initializing a second memory location, reading the next record into the second memory location, and adding the second memory location to the second data structure)).

Some embodiments of the media further include instructions to facilitate: transmitting one or more pieces of shredded and encrypted digital content, and randomizing the order in which the shredded and encrypted digital content is sent.

Some embodiments of the media further include instructions to facilitate the receiving of content from an Internet via TCP/IP transport layers.

Some embodiments of the media further include decrypting instructions that implement a symmetric decryption algorithm.

Some embodiments of the media further include decrypting instructions that implement an asymmetric decryption algorithm.

Some embodiments of the media further include decrypting instructions that implement a hybrid-crypto algorithm.

Some embodiments of the media further include instructions to facilitate including forwarding the shredded and decrypted digital content to a player application.

Some embodiments of the media further include instructions to facilitate forwarding instructions including:
　re-shredding and encrypting the digital content, and
　sending the digital content to a database.

Some embodiments of the media further include assembling instructions whereby the one or more pieces of the shredded and encrypted digital content is never stored as one complete file in the buffer.

Some embodiments of the media further include instructions wherein the decrypting of digital content is achieved using a private key that is an attribute of the digital content, and the digital content is a binary large object.

Some embodiments of the invention include a method for handling shredded and encrypted digital content, wherein the method includes obtaining a dataset that includes digital content, shredding the dataset into a plurality of shreds, encrypting each of the shreds using one of a plurality of encryption keys and storing each encrypted shred into a database, receiving a request from a client for the digital content that has been organized as a plurality of pieces of the shredded and encrypted digital content in the database, and transmitting the content from the database to the client.

In some embodiments of the method, the shredding includes assigning a value to a chunk size, and executing the following actions so long as an end-of-file condition has not been satisfied: reading a portion of the data set corresponding to the chunk size.

In some embodiments of the method, the shredding includes: executing the following actions so long as an end-of-file condition has not been satisfied: (incrementing a value representing a number of chunks generated, assigning a random value to a chunk size using a randomizer function, executing the following action so long as the chunk size is greater than the file size: (assigning a new random value to the chunk size using a randomizer function, subtracting the chunk size value from the file size value to obtain a resulting value, assigning the resulting value to the file size value, and reading a portion of the data set corresponding to the chunk size into a buffer)).

In some embodiments of the method, the encrypting includes: executing the following actions so long as an end-of-file condition has not been satisfied: (obtaining a shred, encrypting the shred to obtain an encrypted shred, storing the encrypted shred into a database table as part of a record, and assigning a numerical identifier value to the record).

In some embodiments of the method, the encrypting includes: executing the following actions so long as the end of a file has not been met: (obtaining a first shred, encrypting the first shred to obtain a first encrypted shred, obtaining a second-shred, combining the first encrypted shred with the second shred to obtain a combined shred, and encrypting the combined shred).

In some embodiments of the method, the assembling of the one or more pieces of shredded and encrypted digital content is into a buffer of a computer system.

In some embodiments of the method, the assembling includes: executing the following actions so long as the end of a data structure containing records has not been encountered: (getting a next record containing data from a database, initializing a memory location, reading the record containing data from the database into the initialized memory location, adding the initialized memory location to a second data structure, executing the following action, if a file identification value of the record stored in the memory location has the same file identification value of a next record: (initializing a second memory location, reading the next record into the second memory location, and adding the second memory location to the second data structure)).

In some embodiments of the method, the transmitting includes: executing the following actions so long as the end of a list has not been met: (getting a next record, generating a new buffer equal or greater than in size to a new record plus an old buffer, assigning the content from the old buffer to a new buffer, assigning the content from the new record to the new buffer).

In some embodiments, the present invention includes computer-readable media having stored thereon a first data structure comprising two or more of the following:
　(a descriptor that includes a unique value used to determine a record identity within a table,
　a descriptor including a join value,
　a descriptor that includes the number of chunks in each record,
　a descriptor representing a predetermined size for each chunk, and
　a descriptor that includes actual shredded and encrypted content derived based on the descriptor that includes the predetermined size for each chunk).

In some embodiments, the present invention includes computer-readable media having stored thereon a second data structure comprising two or more of the following:
　(a descriptor that includes a value representing a name of a content publisher,
　a descriptor that includes a value representing a URL of an originating server,
　a descriptor that includes a value representing a name of the originating server,
　a descriptor that includes a value representing whether or not content may be edited,
　a descriptor that includes a value representing whether a content item may be copied,
　a descriptor that includes a value representing whether a content item may be viewed,
　a descriptor that includes a value representing whether a content item may be forwarded to another user,
　a descriptor that includes a value representing whether a content can be shared with others for read-only usage,
　a descriptor that includes a value representing whether a content item may be placed on removable physical media,
　a descriptor that includes a value representing the number of times a content item can be recorded to removable media,
　a descriptor that includes a value representing whether a content item may be moved onto a portable device,
　a descriptor that includes a value representing whether a content item is on-loan, a descriptor that includes a value representing whether a content item is restricted until purchase, a descriptor that includes a value representing when a demonstration usage expires, and a descriptor that includes a value representing whether a user must login before accessing a content item).

In some embodiments, the present invention includes computer-readable media having stored thereon a first data structure comprising two or more of the following:

(a descriptor that includes a value representing unique file identifier, a descriptor that includes a value representing a file name and extension, a descriptor that includes a value representing date and time when a record was created, a descriptor that includes a value representing a total size of the file, a descriptor that includes a value representing the name of a target file, a descriptor that includes a value representing a file extension, a descriptor that includes a value representing a number of chunks required to completely shred the target file, a descriptor that includes the number of chunks within a record, a descriptor that includes a predetermined size for each chunk, and a descriptor that includes data having actual shredded and encrypted content derived based on the descriptor that includes the predetermined size for each chunk and the descriptor indicating the file size).

In some embodiments, the present invention includes computer-readable media having executable file-transfer instructions stored thereon for causing a suitable programmed central processing unit to handle shredded and encrypted digital content by performing a method that includes: generating in a graphical user interface an application window having a window frame and a plurality of stiles to define a plurality of panes within the frame, displaying in a first one of the panes a user selectable index of a plurality of physical media, displaying in a second one of the panes first selected physical media from the user selectable index, and displaying in a third one of the panes second selected information for a database.

In some embodiments, the present invention includes computer-readable media having executable media-player application code stored thereon for causing a suitable programmed central processing unit to handle shredded and encrypted digital content by performing a method comprising: generating in a graphical user interface an application window having a window frame and a plurality of stiles to define a plurality of panes within the frame, displaying in a first one of the panes user selectable specific track information, displaying in a second one of the panes user generated track list information, and displaying in a third one of the panes specific track information.

In some embodiments, the present invention includes computer-readable media having executable server application code stored thereon for causing a suitable programmed central processing unit to handle shredded and encrypted digital content by performing a method comprising: generating in a graphical user interface an application window having a window frame and a plurality of stiles to define a plurality of panes within the frame, displaying in a first one of the panes two or more of the following simultaneously: (a user-selectable general settings button, a user-selectable protocols and network settings button, a user-selectable alias-management button, a user-selectable user-management button, a start button, a new session check box, refresh rate text box with an incrementing value, a server name text box, a stop button, a padlock icon, and a running icon).

In some embodiments, the present invention provides a method for handling shredded and encrypted digital content comprising: manipulating digital content in the form of text with a word processing module, manipulating digital content in the form of numeric values and text with a spreadsheet module, manipulating digital content in the form of photos with a photo management module, manipulating digital content in the form of messages between users with a messaging module, and manipulating digital content to be posted for use by multiple users with a bulletin board module.

In some embodiments, the manipulating text with a word processing module includes: displaying the text with a WYSIWYG type display, writing the text, editing the text, checking the text with a spell checker, and storing the text into a database as shredded and encrypted digital content.

In some embodiments, the manipulating numeric and text values with a spreadsheet module includes: displaying the numeric and text values with a WYSIWYG type display, performing various arithmetic calculations using the numeric values, displaying the results of these various arithmetic calculations on the display, and storing the numeric and text values into a database as shredded and encrypted digital content.

In some embodiments, the manipulating photos with a photo management module includes: displaying one or more photos in an array, rotating the photos, resizing the photos, and cropping the photos, and storing the photos into a database as shredded and encrypted digital content.

In some embodiments, the manipulating messages between users with a messaging module includes: sending messages from a first user, and receiving messages by second user.

In some embodiments, the sending of messages is in the form of text, graphic, audio, video, audio-video data.

In some embodiments, the manipulating digital content to be posted for use by multiple users with a bulletin board module comprises: posting messages to a computer bulletin board, and grouping these messages according to the content of the messages.

In some embodiments, the manipulating digital content to be posted for use by multiple users with a bulletin board module comprises modifying fonts, color, or graphics of the message posted on the bulletin board.

In some embodiments, the manipulating digital content to be posted for use by multiple users with a bulletin board module comprises posting audio digital content.

In some embodiments, the manipulating digital content to be posted for use by multiple users with a bulletin board module comprises posting audio-video digital content.

In some embodiments, the manipulating digital content to be posted for use by multiple users with a bulletin board module comprises posting video digital content.

In some embodiments, the present invention provides computer-readable media having executable instructions stored thereon for causing a suitable programmed central processor unit to perform a method comprising: manipulating shredded and encrypted digital content in the form of text with a word processing module, manipulating shredded and encrypted digital content in the form of numeric values and text with a spreadsheet module, manipulating shredded and encrypted digital content in the form of photos with a photo management module, manipulating shredded and encrypted digital content in the form of messages between users with a messaging module, and manipulating shredded and encrypted digital content to be posted for use by multiple users with a bulletin board module.

Some embodiments further include instructions for a word processing module to manipulate shredded and encrypted digital content in the form of text through: displaying the text with a WYSIWYG type display, writing the text, editing the text, and checking the text with a spell checker, and storing the text into a database as shredded and encrypted digital content.

Some embodiments further include instructions for a spreadsheet module to manipulate shredded and encrypted digital content in the form of numeric and text values through: displaying the numeric and text values with a WYSIWYG type display, performing various arithmetic calculations using the numeric values, displaying the results of these various arithmetic calculations on the display, and storing the numeric and text values into a database as shredded and encrypted digital content.

Some embodiments further include instructions for a photo management module to manipulate shredded and encrypted digital content in the form of photos through: displaying one or more photos in an array, rotating the photos, resizing the photos, cropping the photos, and storing the photos into a database as shredded and encrypted digital content.

Some embodiments further include instructions for a messaging module to manipulate shredded and encrypted digital content in the form of text, graphic, audio, video or audio/video data.

Some embodiments further include instructions for a messaging module to manipulate shredded and encrypted digital content in the form of text, graphic, audio, video or audio/video data through: sending messages from a first user, and receiving messages by second user.

Some embodiments further include instructions for a bulletin board module to manipulate shredded and encrypted digital content in the form of text through: posting messages to a computer bulletin board, and grouping the messages according to the content of the messages.

Some embodiments further include instructions for a bulletin board module to manipulate shredded and encrypted digital content in the form of text comprises modifying the text fonts, color, or graphics.

Some embodiments further include instructions for a bulletin board module to manipulate shredded and encrypted digital content in the form of audio digital content posted to a computer bulletin board.

Some embodiments further include instructions for a bulletin board module to manipulate shredded and encrypted digital content in the form of audio-video digital content posted to a computer bulletin board.

Some embodiments further include instructions for a bulletin board module to manipulate shredded and encrypted digital content in the form of video digital content posted to a computer bulletin board.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method for handling an expressive work of digital content that has been divided into a plurality of shreds, wherein each shred is a subset of the digital content, the subset having a predetermined size, and wherein each shred has been encrypted to form a piece of shredded and encrypted digital content, wherein the pieces of shredded and encrypted digital content are organized into a plurality of records that hold the shredded and encrypted digital content in a database associated with a server computer system, the method comprising:

sending a request to the server computer system for the digital content that has been organized into the plurality of records in the database associated with the server;

based on a response from the server, receiving the plurality of records that hold the shredded and encrypted digital content from the server into a client computer system;

decrypting the received plurality of records that hold the shredded and encrypted digital content using a decryption algorithm to form a decrypted version of the expressive work; and wherein each of the plurality of records includes at least one first data structure that includes:

(a descriptor that includes a unique value used to determine a record identity within a table;

a descriptor including a join value;

a descriptor that includes the number of chunks in each record;

a descriptor representing a predetermined size for each chunk; and a descriptor that includes actual shredded and encrypted content derived based on the descriptor that includes the predetermined size for each chunk).

2. The method of claim 1, the decrypting further comprising assembling the plurality of records that hold the shredded and encrypted digital content in the client computer system, wherein the decrypting and assembling includes:

executing the following actions so long as the end of a second database table has not been reached and a file identifier value from a first database table equals a file identifier value from the second data base table:

reading a content field of shredded and encrypted digital content from a record in the second database table into a first buffer;

running a decryption function on the first buffer and storing the resulting data into a second buffer;

outputting the second buffer; and proceeding to a next record in the second database table.

3. The method of claim 1, the decrypting further comprising assembling the one or more pieces of shredded and encrypted digital content in the client computer system, wherein the decrypting and assembling includes:

executing the following actions so long as the end of a data structure containing records has not been encountered:

initializing a memory location;

reading a record containing data from a database into the initialized memory location;

adding the initialized memory location to a second data structure;

executing the following action, if a file identification value of the record stored in the memory location equals a file identification value of a next record:

initializing a second memory location, reading the next record into the second memory location;

adding the second memory location to the second data structure; and accessing a further next record.

4. The method of claim 1, wherein the receiving includes receiving the plurality of records in a non-sequential order, the method further comprising:

providing a non-sequential order in which the plurality of records that hold the shredded and encrypted digital content is to be transmitted;

transmitting in the non-sequential order one or more pieces of the plurality of records that hold the shredded and encrypted digital content; and sorting the plurality of records that hold the shredded and encrypted digital content in the client computer system.

5. The method of claim 4, wherein the forwarding includes forwarding sorted and decrypted digital content to a player application.

6. The method of claim 1, wherein the forwarding includes:

re-shredding and re-encrypting the decrypted received digital content; and sending the re-shredded and re-encrypted digital content to a database.

7. The method of claim 1, wherein the decrypting of received content is achieved using a private key that is an attribute of the received content, and wherein the received content includes at least one binary large object.

8. The method of claim 1, wherein each of the plurality of records further includes at least one second data structure that includes:

(a descriptor that includes a value representing a name of a content publisher;

a descriptor that includes a value representing a URL of a originating server;

a descriptor that includes a value representing a name of the originating server;

a descriptor that includes a value representing whether or not content may be edited;

a descriptor that includes a value representing whether a content item may be copied;

a descriptor that includes a value representing whether a content item may be viewed;

a descriptor that includes a value representing whether a content item may be forwarded to another user;

a descriptor that includes a value representing whether a content can be shared with others for read-only usage;

a descriptor that includes a value representing whether a content item may be placed on removable physical media;

a descriptor that includes a value representing the number of times a content item can be recorded to removable media;

a descriptor that includes a value representing whether a content item may be moved onto a portable device;

a descriptor that includes a value representing whether a content item is on-loan;

a descriptor that includes a value representing whether a content item is restricted until purchase;

a descriptor that includes a value representing when a demonstration usage expires; and a descriptor that includes a value representing whether a user must login before accessing a content item).

9. The method of claim 1, wherein each of the plurality of records further includes at least one third data structure that includes:

(a descriptor that includes a value representing unique file identifier;

a descriptor that includes a value representing a file name and extension;

a descriptor that includes a value representing date and time when a record was created;

a descriptor that includes a value representing a total size of the file;

a descriptor that includes a value representing the name of a target file;

a descriptor that includes a value representing a file extension;

a descriptor that includes a value representing a number of chunks required to completely shred the target file;

a descriptor that includes the number of chunks within a record;

a descriptor that includes a predetermined size for each chunk; and a descriptor that includes data having actual shredded and encrypted content derived based on the descriptor that includes the predetermined size for each chunk and the descriptor indicating the file size).

10. A system for handling an expressive work of digital content that has been divided into a plurality of shreds, wherein each shred is a subset of the digital content, the subset having a predetermined size, and wherein each shred has been encrypted to form a piece of shredded and encrypted digital content, wherein the pieces of shredded and encrypted digital content are organized into a plurality of records that hold the shredded and encrypted digital content in a database associated with a server computer system, the system comprising:

a client computer system that includes:

a transmitter that sends a request to the server for the digital content that has been organized into the plurality of records in the database associated with the server;

a receiver that receives the plurality of records that hold the shredded and encrypted digital content from the server into the client computer system;

a decryptor that decrypts the received plurality of records that hold the shredded and encrypted digital content using a decryption algorithm to form a decrypted version of the expressive work; and wherein each of the plurality of records includes at least one first data structure that includes:

(a descriptor that includes a unique value used to determine a record identity within a table;

a descriptor including a join value;

a descriptor that includes the number of chunks in each record;

a descriptor representing a predetermined size for each chunk; and a descriptor that includes actual shredded and encrypted content derived based on the descriptor that includes the predetermined size for each chunk).

11. The system of claim 10, the decryptor further including an assembler that assembles the one or more pieces of shredded and encrypted digital content in the client computer system, wherein the assembler executes the following actions so long as the end of a data a second database table has not been reached and a file identifier value from a first database table equals a file identifier value from the second data base table:

(reading a content field of shredded and encrypted digital content from a record in the second database table into a first buffer;
running a decryption function on the first buffer and storing the resulting data into a second buffer;
outputting the second buffer; and
proceeding to a next record in the second database table).

12. The system of claim 10, the decryptor further including an assembler that assembles the one or more pieces of shredded and encrypted digital content in the client computer system, wherein the assembler executes the following actions so long as the end of a data structure containing records has not been encountered:

(initializing a memory location;
reading a record containing data from a database into the initialized memory location;
adding the initialized memory location to a second data structure;
executing the following action, if a file identification value of the record stored in the memory location equals a file identification value of a next record:
(While (file-identification value of the record stored into the second data structure and the file-identification value of the next record are the same and not end-of-data-structure)
(initializing a second memory location,
reading the next record into the second memory location,
adding the second memory location to the second data structure)); and
accessing a further next record)).

13. The system of claim 10, further including a sequencer that provides a non-sequential order in which the shredded and encrypted digital content is to be transmitted from the server to the client computer, wherein the transmitter transmits in the non-sequential order one or more pieces of a softer, wherein when the plurality of records that hold the shredded and encrypted digital content are received in the non-sequential order, then the softer sorts the records.

14. The system of claim 10, wherein each of the plurality of records further includes at least one second data structure that includes:

(a descriptor that includes a value representing a name of a content publisher;
a descriptor that includes a value representing a URL of a originating server;
a descriptor that includes a value representing a name of the originating server;
a descriptor that includes a value representing whether or not content may be edited;
a descriptor that includes a value representing whether a content item may be copied;
a descriptor that includes a value representing whether a content item may be viewed;
a descriptor that includes a value representing whether a content item may be forwarded to another user;
a descriptor that includes a value representing whether a content can be shared with others for read-only usage;
a descriptor that includes a value representing whether a content item may be placed on removable physical media;
a descriptor that includes a value representing the number of times a content item can be recorded to removable media;
a descriptor that includes a value representing whether a content item may be moved onto a portable device;
a descriptor that includes a value representing whether a content item is on-loan;
a descriptor that includes a value representing whether a content item is restricted until purchase;
a descriptor that includes a value representing when a demonstration usage expires; and
a descriptor that includes a value representing whether a user must login before accessing a content item).

15. The system of claim 10, wherein each of the plurality of records further includes at least one third data structure that includes:

(a descriptor that includes a value representing unique file identifier;
a descriptor that includes a value representing a file name and extension;
a descriptor that includes a value representing date and time when a record was created;
a descriptor that includes a value representing a total size of the file;
a descriptor that includes a value representing the name of a target file;
a descriptor that includes a value representing a file extension;
a descriptor that includes a value representing a number of chunks required to completely shred the target file;
a descriptor that includes the number of chunks within a record;
a descriptor that includes a predetermined size for each chunk; and
a descriptor that includes data having actual shredded and encrypted content derived based on the descriptor that includes the predetermined size for each chunk and the descriptor indicating the file size).

16. Computer-readable media having executable instructions stored thereon for causing a suitable programmed central processing unit perform a method to handle an expressive work of digital content that has been divided into a plurality of shreds, wherein each shred is a subset of the digital content, and wherein each shred has been encrypted to form a piece of shredded and encrypted digital content, wherein the pieces of shredded and encrypted digital content are organized into a plurality of records that hold the shredded and encrypted digital content in a database associated with a server computer system, the method comprising:

sending a request to the server computer system for the digital content that has been organized into the plurality of records in the database associated with the server;
based on a response from the server, receiving the plurality of records that hold the shredded and encrypted digital content from the server into a client computer system;
decrypting the received plurality of records that hold the shredded and encrypted digital content using a decryption algorithm to form a decrypted version of the expressive work; and
wherein each of the plurality of records includes at least one first data structure that includes:
(a descriptor that includes a unique value used to determine a record identity within a table;
a descriptor including a join value;
a descriptor that includes the number of chunks in each record;
a descriptor representing a predetermined size for each chunk; and a descriptor that includes actual shredded and encrypted content derived based on the descriptor that includes the predetermined size for each chunk).

17. The computer-readable media of claim 16, further comprising instructions that facilitate assembling the one or more pieces of shredded and encrypted digital content in a buffer, wherein the decrypting and assembling includes:

executing the following actions so long as the end of a second database table has not been reached and a file identifier value from a first database table equals a file identifier value from the second data base table:
(reading a content field of shredded and encrypted digital content from a record in the second database table into a first buffer;
running a decryption function on the first buffer and storing the resulting data into a second buffer;
outputting the second buffer; and
proceeding to a next record in the second database table).

18. The computer-readable media of claim 16, further comprising instructions that facilitate assembling the one or more pieces of shredded and encrypted digital content in a buffer, wherein the decrypting and assembling includes:

executing the following actions so long as the end of a data structure containing records has not been encountered:
(initializing a memory location;
reading a record containing data from a database into the initialized memory location;
adding the initialized memory location to a second data structure;
executing the following action, if a file identification value of the record stored in the memory location equals a file identification value of a next record:
(initializing a second memory location,
reading the next record into the second memory location,
adding the second memory location to the second data structure; and
accessing a further next record)).

19. The computer-readable media of claim 16, further comprising instructions that facilitate assembling the one or more pieces of shredded and encrypted digital content in a buffer, wherein the assembling includes: executing the following actions so long as the end of a data structure containing records has not been encountered:

(accessing a next record containing data from a database;
initializing a memory location;
reading the record containing data from a database into the initialized memory location;
adding the initialized memory location to a second data structure; and
executing the following action, if a file identification value of the record stored in the memory location has the same file identification value of a next record:
(initializing a second memory location,
reading the next record into the second memory location, and
adding the second memory location to the second data structure)).

20. The computer-readable media of claim 16, further comprising instructions to facilitate:
providing a non-sequential order in which the plurality of records that hold the shredded and encrypted digital content is to be transmitted;
transmitting in the non-sequential order the plurality of records that hold the shredded and encrypted digital content; and
sorting the plurality of records that hold the shredded and encrypted digital content.

21. The computer-readable media of claim 16, further comprising instructions to facilitate forwarding digital content including:
re-shredding and re-encrypting the digital content; and
sending the re-shredded and re-encrypted digital content to a database.

22. The computer-readable media of claim 16, further comprising instructions wherein the decrypting of digital content is achieved using a private key that is an attribute of the digital content, and the digital content is a binary large object.

23. The computer-readable media of claim 10, wherein each of the plurality of records further includes at least one second data structure that includes:

(a descriptor that includes a value representing a name of a content publisher;
a descriptor that includes a value representing a URL of a originating server;
a descriptor that includes a value representing a name of the originating server;
a descriptor that includes a value representing whether or not content may be edited;
a descriptor that includes a value representing whether a content item may be copied;
a descriptor that includes a value representing whether a content item may be viewed;
a descriptor that includes a value representing whether a content item may be forwarded to another user;
a descriptor that includes a value representing whether a content can be shared with others for read-only usage;
a descriptor that includes a value representing whether a content item may be placed on removable physical media;
a descriptor that includes a value representing the number of times a content item can be recorded to removable media;
a descriptor that includes a value representing whether a content item may be moved onto a portable device;
a descriptor that includes a value representing whether a content item is on-loan;
a descriptor that includes a value representing whether a content item is restricted until purchase;
a descriptor that includes a value representing when a demonstration usage expires; and
a descriptor that includes a value representing whether a user must login before accessing a content item).

24. The computer-readable media of claim 10, wherein each of the plurality of records further includes at least one third data structure that includes:

(a descriptor that includes a value representing unique file identifier;
a descriptor that includes a value representing a file name and extension;
a descriptor that includes a value representing date and time when a record was created;
a descriptor that includes a value representing a total size of the file;
a descriptor that includes a value representing the name of a target file;
a descriptor that includes a value representing a file extension;

a descriptor that includes a value representing a number of chunks required to completely shred the target file;

a descriptor that includes the number of chunks within a record;

a descriptor that includes a predetermined size for each chunk; and a descriptor that includes data having actual shredded and encrypted content derived based on the descriptor that includes the predetermined size for each chunk and the descriptor indicating the file size).

25. A system for handling digital content that has been divided into a plurality of shreds, wherein each shred is a subset of the digital content, and wherein each shred has been encrypted to form a piece of shredded and encrypted digital content, wherein the pieces of shredded and encrypted digital content are organized into a plurality of records that hold the shredded and encrypted digital content in a database associated with a server computer system, the system comprising:

means for decrypting and processing a first data structure, wherein the first data structure includes:

(a descriptor that includes a unique value used to determine a record identity within a table;

a descriptor including a join value;

a descriptor that includes the number of chunks in each record;

a descriptor representing a predetermined size for each chunk; and a descriptor that includes actual shredded and encrypted content derived based on the descriptor that includes the predetermined size for each chunk).

26. The system of claim 25, further comprising:

means for processing a second data structure, wherein the second data structure includes:

(a descriptor that includes a value representing a name of a content publisher;

a descriptor that includes a value representing a URL of a originating server;

a descriptor that includes a value representing a name of the originating server;

a descriptor that includes a value representing whether or not content may be edited;

a descriptor that includes a value representing whether a content item may be copied;

a descriptor that includes a value representing whether a content item may be viewed;

a descriptor that includes a value representing whether a content item may be forwarded to another user;

a descriptor that includes a value representing whether a content can be shared with others for read-only usage;

a descriptor that includes a value representing whether a content item may be placed on removable physical media;

a descriptor that includes a value representing the number of times a content item can be recorded to removable media;

a descriptor that includes a value representing whether a content item may be moved onto a portable device;

a descriptor that includes a value representing whether a content item is on-loan;

a descriptor that includes a value representing whether a content item is restricted until purchase;

a descriptor that includes a value representing when a demonstration usage expires; and a descriptor that includes a value representing whether a user must login before accessing a content item); and means for processing a third data structure, wherein the third data structure includes:

(a descriptor that includes a value representing unique file identifier;

a descriptor that includes a value representing a file name and extension;

a descriptor that includes a value representing date and time when a record was created;

a descriptor that includes a value representing a total size of the file;

a descriptor that includes a value representing the name of a target file;

a descriptor that includes a value representing a file extension;

a descriptor that includes a value representing a number of chunks required to completely shred the target file;

a descriptor that includes the number of chunks within a record;

a descriptor that includes a predetermined size for each chunk; and a descriptor that includes data having actual shredded and encrypted content derived based on the descriptor that includes the predetermined size for each chunk and the descriptor indicating the file size).

* * * * *